United States Patent
Goto et al.

(10) Patent No.: US 10,535,844 B2
(45) Date of Patent: Jan. 14, 2020

(54) POWER STORAGE DEVICE, BATTERY MANAGEMENT UNIT, AND ELECTRONIC DEVICE

(71) Applicant: SEMICONDUCTOR ENERGY LABORATORY CO., LTD., Atsugi-shi, Kanagawa-ken (JP)

(72) Inventors: Junya Goto, Kanagawa (JP); Ai Nakagawa, Kanagawa (JP); Yuika Sato, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 228 days.

(21) Appl. No.: 15/438,960

(22) Filed: Feb. 22, 2017

(65) Prior Publication Data
US 2017/0250383 A1  Aug. 31, 2017

(30) Foreign Application Priority Data
Feb. 26, 2016 (JP) .................................. 2016-035832

(51) Int. Cl.
| H01M 2/02 | (2006.01) |
| H01M 10/42 | (2006.01) |
| H01M 2/08 | (2006.01) |
| H01G 11/80 | (2013.01) |
| H01M 10/0525 | (2010.01) |
| H01G 11/82 | (2013.01) |
| H01M 2/10 | (2006.01) |
| H01G 11/74 | (2013.01) |

(52) U.S. Cl.
CPC .......... *H01M 2/0275* (2013.01); *H01G 11/80* (2013.01); *H01G 11/82* (2013.01); *H01M 2/0207* (2013.01); *H01M 2/08* (2013.01); *H01M 2/1022* (2013.01); *H01M 10/0525* (2013.01); *H01M 10/425* (2013.01); *H01G 11/74* (2013.01); *H01M 2010/4271* (2013.01); *Y02E 60/13* (2013.01); *Y02T 10/7022* (2013.01)

(58) Field of Classification Search
CPC ............. H01M 2/0275; H01M 2/1022; H01M 2/0207; H01M 10/425; H01M 10/0525; H01M 2/08; H01M 2010/4271; H01G 11/82; H01G 11/80; H01G 11/74; Y02E 60/13
See application file for complete search history.

(56) References Cited

U.S. PATENT DOCUMENTS

| 2009/0080144 | A1* | 3/2009 | Matumoto ............. H01G 9/012 361/528 |
| 2013/0101884 | A1 | 4/2013 | Ueda |
| 2015/0022957 | A1 | 1/2015 | Hiroki et al. |
| 2015/0111088 | A1 | 4/2015 | Hiroki et al. |
| 2015/0140396 | A1 | 5/2015 | Yamazaki |
| 2015/0140397 | A1 | 5/2015 | Tajima et al. |
| 2015/0147626 | A1 | 5/2015 | Tajima et al. |
| 2015/0155528 | A1* | 6/2015 | Takahashi ............ H01M 2/0202 429/163 |
| 2015/0155530 | A1 | 6/2015 | Takahashi et al. |
| 2015/0162590 | A1 | 6/2015 | Takahashi et al. |
| 2015/0243962 | A1* | 8/2015 | Hiroki ...................... H01M 4/02 429/233 |
| 2015/0318725 | A1* | 11/2015 | Brockman ............. H02J 7/0047 340/636.1 |
| 2015/0333359 | A1 | 11/2015 | Takahashi et al. |
| 2015/0333360 | A1* | 11/2015 | Tajima .............. H01M 10/0436 429/7 |
| 2015/0340664 | A1 | 11/2015 | Takahashi et al. |
| 2015/0349375 | A1* | 12/2015 | Takahashi .............. H01G 9/048 429/7 |
| 2016/0013469 | A1 | 1/2016 | Tajima et al. |
| 2016/0043363 | A1 | 2/2016 | Tajima et al. |
| 2016/0073519 | A1 | 3/2016 | Hiroki |
| 2016/0094079 | A1 | 3/2016 | Hiroki et al. |
| 2016/0109852 | A1 | 4/2016 | Kuwabara et al. |
| 2016/0118640 | A1 | 4/2016 | Miyake |
| 2016/0156012 | A1 | 6/2016 | Takahashi et al. |
| 2016/0156071 | A1 | 6/2016 | Yamakaji et al. |
| 2016/0157372 | A1 | 6/2016 | Hiroki |
| 2016/0204437 | A1 | 7/2016 | Tajima et al. |
| 2016/0218327 | A1 | 7/2016 | Takahashi et al. |
| 2016/0218387 | A1 | 7/2016 | Tajima |
| 2016/0226055 | A1 | 8/2016 | Miyake |
| 2016/0233469 | A1 | 8/2016 | Kimura |
| 2016/0240325 | A1 | 8/2016 | Tajima et al. |
| 2016/0240823 | A1 | 8/2016 | Miyake |
| 2016/0254500 | A1 | 9/2016 | Kawata et al. |

(Continued)

FOREIGN PATENT DOCUMENTS

| JP | 2011-216209 A | 10/2011 |
| JP | 2015-038868 A | 2/2015 |

*Primary Examiner* — Muhammad S Siddiquee
(74) *Attorney, Agent, or Firm* — Nixon Peabody, LLP; Jeffrey L. Costellia

(57) ABSTRACT

A repeatedly bendable power storage device is provided. A highly reliable power storage device is provided. A long-life power storage device is provided. A repeatedly bendable electronic device is provided. A flexible electronic device is provided. The power storage device includes a positive electrode, a negative electrode, and an exterior body wrapping the positive electrode and the negative electrode. The exterior body includes a metal layer and a resin layer. The thickness of the metal layer in at least part of an outer edge of the exterior body is smaller than that in a region other than the outer edge. The exterior body has a plurality of slits in the outer edge.

20 Claims, 45 Drawing Sheets

(56) References Cited

U.S. PATENT DOCUMENTS

| | | |
|---|---|---|
| 2016/0315296 A1 | 10/2016 | Kimura et al. |
| 2016/0322612 A1 | 11/2016 | Takahashi et al. |
| 2016/0329533 A1 | 11/2016 | Tajima |
| 2016/0343999 A1 | 11/2016 | Yonemura et al. |
| 2016/0372717 A1 | 12/2016 | Noda |
| 2017/0033326 A1 | 2/2017 | Goto et al. |
| 2017/0033327 A1 | 2/2017 | Tajima |
| 2017/0117511 A1 | 4/2017 | Takahashi et al. |

\* cited by examiner

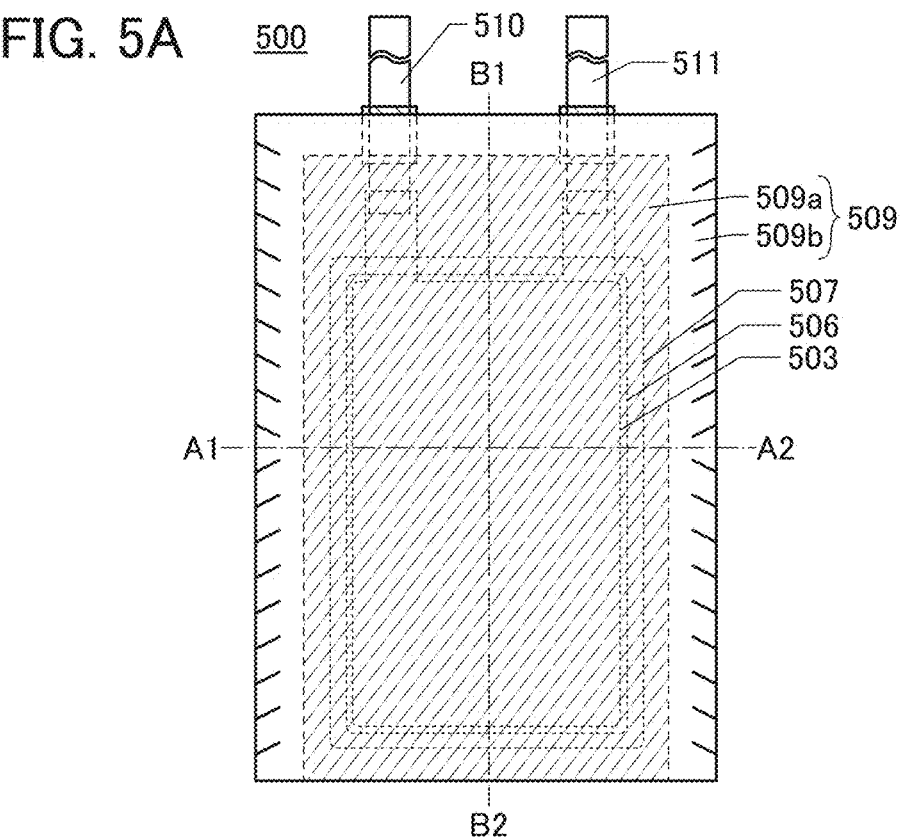
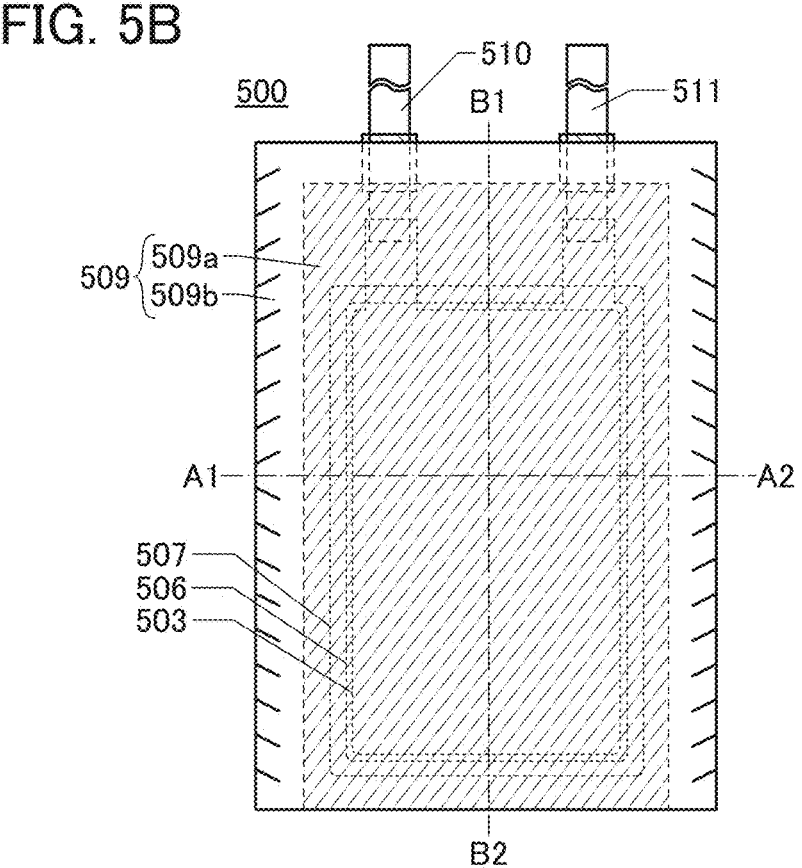

509b ⎫
509a ⎬ 509
      ⎭

261

POWER STORAGE DEVICE, BATTERY MANAGEMENT UNIT, AND ELECTRONIC DEVICE

BACKGROUND OF THE INVENTION

1. Field of the Invention

The present invention relates to an object, a method, or a manufacturing method. The present invention also relates to a process, a machine, manufacture, or a composition of matter. In particular, one embodiment of the present invention relates to a semiconductor device, a display device, a light-emitting device, a power storage device, a memory device, a driving method thereof, a manufacturing method thereof, or an evaluation method thereof. In particular, one embodiment of the present invention relates to a power storage device, a manufacturing method thereof, and an evaluation method thereof.

Note that in this specification, the power storage device is a collective term describing elements and devices that have a power storage function.

2. Description of the Related Art

In recent years, secondary batteries such as lithium-ion secondary batteries, lithium-ion capacitors, and air cells have been actively developed. In particular, demand for lithium-ion secondary batteries with high output and high energy density has rapidly grown with the development of the semiconductor industry, for electronic devices, for example, portable information terminals such as cell phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society. Patent Document 1 discloses an example of incorporating a power storage device in an electronic device.

Electronic devices used while being worn on human bodies have recently been proposed and are referred to as wearable displays and the like. To improve the convenience, it is necessary that such electronic devices can be repeatedly attached to and detached from human bodies.

REFERENCE

Patent Document

[Patent Document 1] Japanese Published Patent Application No. 2015-38868

SUMMARY OF THE INVENTION

Entry of impurities into a power storage device degrades the characteristics of the power storage device. For example, discharge capacity decreases in some cases due to impurities such as water entering a nonaqueous electrolytic solution. The entry of impurities into the power storage device is sometimes caused when, for example, components in the air go into a region surrounded by an exterior body of the power storage device due to poor airtightness of the exterior body.

When electronic devices worn on human bodies are repeatedly attached and detached, power storage devices incorporated therein also might be repeatedly bent. The repeated bending of the power storage devices causes deterioration of their exterior bodies, possibly allowing entry of impurities such as moisture into a region surrounded by the exterior body. Knowing the concentration of moisture and the like entering the region surrounded by the exterior body is important in improving the reliability of the power storage device.

An object of one embodiment of the present invention is to provide a repeatedly bendable power storage device. Another object of one embodiment of the present invention is to provide a highly reliable power storage device. Another object of one embodiment of the present invention is to provide a long-life power storage device. Another object of one embodiment of the present invention is to provide a repeatedly bendable electronic device. Another object of one embodiment of the present invention is to provide a flexible electronic device.

Another object of one embodiment of the present invention is to provide a flexible film. Another object of one embodiment of the present invention is to provide a repeatedly bendable film.

Another object of one embodiment of the present invention is to provide a power storage device with a novel structure. Another object of one embodiment of the present invention is to provide a novel power storage device, an electronic device including a novel power storage device, or the like.

Note that the description of these objects does not exclude the existence of other objects. In one embodiment of the present invention, there is no need to achieve all the objects. Other objects will be apparent from and can be derived from the description of the specification, the drawings, the claims, and the like.

One embodiment of the present invention is a power storage device including a positive electrode, a negative electrode, and an exterior body wrapping the positive electrode and the negative electrode. The exterior body includes a metal layer and a resin layer. The thickness of the metal layer in at least part of an outer edge of the exterior body is smaller than that in part of a region other than the outer edge. The exterior body has a plurality of slits in the outer edge.

In the power storage device of one embodiment of the present invention, the exterior body is preferably sealed in the outer edge.

Another embodiment of the present invention is a power storage device including a positive electrode, a negative electrode, and an exterior body wrapping the positive electrode and the negative electrode. The exterior body includes a first region and a second region. The second region is in contact with at least part of an outer edge of the exterior body. The exterior body includes a metal layer and a resin layer. The thickness of the metal layer in the first region is larger than that in the second region. The exterior body has a plurality of slits in the second region. In the above structure, the second region preferably has a band-like shape, and the major axis of each of the slits is preferably substantially perpendicular to the major axis of the band. Also in the above structure, the second region preferably has a band-like shape, and the angle between the major axis of each slit and the major axis of the band is preferably greater than or equal to 45° and less than 90°.

In the power storage device of one embodiment of the present invention, the distance between adjacent slits is preferably greater than or equal to 2 mm and less than or equal to 3 cm.

Another embodiment of the present invention is a power storage device including a positive electrode, a negative electrode, and an exterior body wrapping the positive electrode and the negative electrode. The exterior body includes a first region and a second region. The second region is in contact with at least part of an outer edge of the exterior body. The exterior body includes a metal layer. The thickness of the metal layer in the first region is larger than that in the second region. The exterior body has a first slit and a second slit, which is closer to the center of the power storage device than the first slit. The angle between the major axis of the first slit and the major axis of a band-like shape is represented as a° whereas the angle between the major axis of the second slit and the major axis of the band shape is represented as b°, and a>b is satisfied.

Another embodiment of the present invention is a power storage device including a positive electrode, a negative electrode, and an exterior body wrapping the positive electrode and the negative electrode. The exterior body includes a metal layer and a resin layer. The thickness of the metal layer in part of an outer edge of the exterior body is smaller than that in part of a region other than the outer edge. The exterior body has a first slit and a second slit, which is closer to the center of the power storage device than the first slit. The angle between the major axis of the first slit and the major axis of a band shape is represented as a° whereas the angle between the major axis of the second slit and the major axis of the band shape is represented as b°, and a<b is satisfied.

Another embodiment of the present invention is a power storage device including a positive electrode, a negative electrode, and an exterior body wrapping the positive electrode and the negative electrode. The exterior body includes a metal layer. The thickness of the metal layer in part of an outer edge of the exterior body is smaller than that in part of a region other than the outer edge. The exterior body has two or more holes in the outer edge. In the above structure, the two or more holes are preferably arranged linearly. Also in the above structure, the major diameter of each hole is preferably greater than or equal to 0.1 mm and less than or equal to 3 mm.

Preferably, the power storage device of one embodiment of the present invention can be repeatedly bent.

Another embodiment of the present invention is a battery management unit including the power storage device described in any one of the above, and a transistor. In the above structure, the transistor preferably includes an oxide semiconductor.

Another embodiment of the present invention is an electronic device including the power storage device described in any one of the above.

Another embodiment of the present invention is an electronic device including the power storage device described in any one of the above, and a display portion.

According to one embodiment of the present invention, a repeatedly bendable power storage device can be provided. According to another embodiment of the present invention, a highly reliable power storage device can be provided. According to another embodiment of the present invention, a long-life power storage device can be provided. According to another embodiment of the present invention, a repeatedly bendable electronic device can be provided. According to another embodiment of the present invention, a flexible electronic device can be provided.

According to one embodiment of the present invention, a flexible film can be provided. According to another embodiment of the present invention, a repeatedly bendable film can be provided.

According to one embodiment of the present invention, a power storage device with a novel structure can be provided. According to another embodiment of the present invention, a novel power storage device, an electronic device including a novel power storage device, or the like can be provided.

Note that the description of these effects does not exclude the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 5A and 5B illustrate top surfaces of a power storage device;

DETAILED DESCRIPTION OF THE INVENTION

Figure 1A:
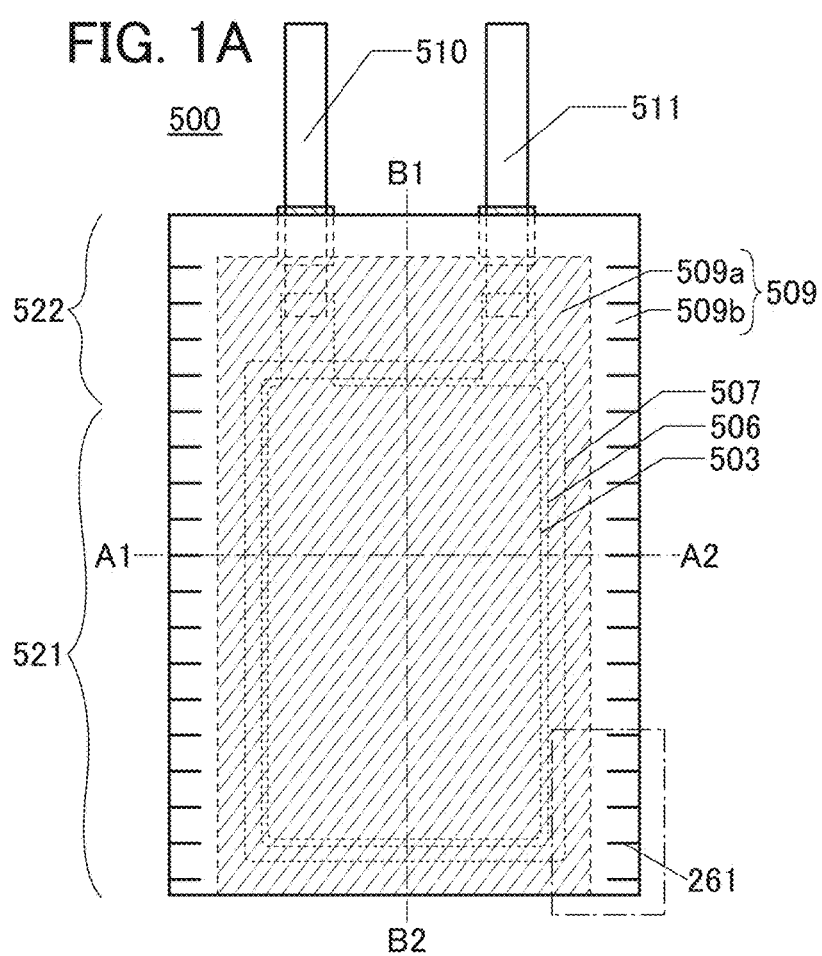
FIGS. 1A to 1D illustrate top surfaces of a power storage device.

Embodiments of the present invention will be described below in detail with reference to the drawings. Note that the present invention is not limited to the following description, and it will be readily appreciated by those skilled in the art that the modes and details can be changed in various different ways. Accordingly, the present invention should not be interpreted as being limited to the content of the embodiments below.

Note that in drawings used in this specification, the sizes, thicknesses, and the like of components such as films, layers, substrates, and regions are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, and the like. Therefore, for example, description can be made even when "first" is replaced with "second" or "third", as appropriate. In addition, the ordinal numbers in this specification and the like are not necessarily the same as those that specify one embodiment of the present invention.

Note that in structures of the present invention described in this specification and the like, the same portions or portions having similar functions are denoted by common reference numerals in different drawings, and the description thereof is not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as an electrode; in this case, the electrode refers to at least one of the positive electrode and the negative electrode.

Here, a charge rate and a discharge rate of a power storage device is described. For example, in the case of charging a secondary battery with a capacity X [Ah] at a constant current, a charge rate of 1 C means the current value I [A] with which charging is ended in exactly 1 h, and a charge rate of 0.2 C means I/5 [A] (i.e., the current value with which charging is ended in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h).

Embodiment 1

In this embodiment, power storage devices of embodiments of the present invention and exterior bodies of the power storage devices will be described.

An example of the power storage device is a secondary battery using an electrochemical reaction, e.g., a lithium ion battery. Examples of the power storage device include electrochemical capacitors such as an electric double-layer capacitor and a redox capacitor, an air battery, and a fuel battery.

Preferably, the power storage device of one embodiment of the present invention can be repeatedly charged and discharged.

In charging and discharging of a power storage device, an electrolytic solution might be decomposed at the reaction potential of an electrode. Decomposition reactions of an electrolytic solution are irreversible in many cases and thus sometimes reduce the charge and discharge efficiency of the power storage device. When the charge and discharge efficiency is reduced, the power storage device suffers reduction in discharge capacity.

In addition, as charging and discharging are repeated, discharge capacity gradually decreases because of the decomposition reaction of an electrolytic solution in some cases.

The use of a nonaqueous electrolytic solution as an electrolytic solution of a power storage device can widen the range of the potential at which the power storage device operates. For example, decomposition of the electrolytic solution can be inhibited in a wider range of potentials, which increases the discharge capacity of the power storage device. An exterior body of one embodiment of the present invention will be described below.

Entry of impurities into a region surrounded by an exterior body of a power storage device degrades the characteristics of the power storage device. For example, discharge capacity decreases in some cases due to impurities such as water entering a nonaqueous electrolytic solution. The entry of impurities into the power storage device is sometimes caused when, for example, components in the air go into the region surrounded by the exterior body of the power storage device due to poor airtightness of the exterior body.

Here, the concentration of moisture in the region surrounded by the exterior body of the power storage device is preferably 300 ppm or less, further preferably 100 ppm or less, still further preferably 50 ppm or less, and yet still further preferably 20 ppm or less per weight of the electrolytic solution in the region surrounded by the exterior body of the power storage device.

In the power storage device, the amount of moisture in the region surrounded by the exterior body can be measured with a Karl Fischer moisture meter or the like.

The exterior body preferably includes a material that is less permeable to impurities. It is particularly preferable that the exterior body include a material with a low moisture permeability such as a metal.

A film (sometimes referred to as a sheet or a foil) is preferably used as the exterior body of the power storage device of one embodiment of the present invention.

The exterior body of one embodiment of the present invention preferably includes at least one kind of metal selected from aluminum, copper, tin, niobium, titanium, nickel, manganese, iron, molybdenum, tungsten, tantalum, chromium, and the like. The exterior body may include an alloy of any of these metals (e.g., stainless steel). Furthermore, the exterior body preferably includes a metal layer containing any of the metals or the alloy. Here, aluminum, copper, tin, niobium, titanium, and the like have a low Young's modulus and are easy to process in some cases. Aluminum is particularly preferable as a metal contained in the exterior body because it is inexpensive and is easy to process.

The thickness of the metal layer is, for example, greater than or equal to 5 μm and less than or equal to 200 μm, greater than or equal to 10 μm and less than or equal to 100 μm, or greater than or equal to 15 μm and less than or equal to 50 μm.

Alternatively, the exterior body of one embodiment of the present invention may include a carbon sheet. Examples of the carbon sheet include films containing graphite, carbon fiber, active carbon, graphene, a graphene compound, and the like.

Alternatively, the exterior body of one embodiment of the present invention preferably contains a resin. The resin may be in a film form. As the resin, for example, polyethylene, polypropylene, a polycarbonate, an ionomer, or a polyamide can be used.

To prevent a short circuit between the electrode and the exterior body of the power storage device, the electrical conductivity of the surface of the exterior body is preferably low. Therefore, a surface of the exterior body preferably has a resin layer or the like. For example, a film in which resin layers are provided on both surfaces of a metal layer can be used as the exterior body.

For example, the exterior body of one embodiment of the present invention may be a film that contains the above metal or the above alloy and is provided with a resin layer on the front and/or the back.

For example, a single-layer film selected from a metal film (e.g., an aluminum film, a stainless steel film, and a copper film), a plastic film made of an organic material, a hybrid material film including an organic material (e.g., an organic resin or fiber) and an inorganic material (e.g., ceramic), a carbon-containing inorganic film (e.g., a carbon film or a graphite film), and the like; or a stacked-layer film including two or more of the above films is used as the exterior body.

When a metal film is used, the metal film preferably has the following three-layer structure to insulate the surfaces, for example: the inner surface of the metal film is covered with a material of polypropylene, polyethylene, a polycarbonate, an ionomer, a polyamide, or the like, and the outer surface of the metal film is provided with a layer of an insulating synthetic resin such as a polyamide-based resin or a polyester-based resin. For the resin layer, alternatively, a polyethylene terephthalate (PET) resin or the like may be used. The above metal film may be covered with a stacked-layer film consisting of two or more layers. For example, the inner surface may be covered with a material such as polypropylene, and the outer surface may be covered with a stacked-layer film of a polyamide-based resin, a polyethylene terephthalate (PET) resin, and the like. Here, the resin layer has a thickness, for example, greater than or equal to 10 μm and less than or equal to 200 μm or greater than or equal to 15 μm and less than or equal to 100 μm.

The power storage device of one embodiment of the present invention can change its shape as a device incorporating the power storage device changes its shape.

The power storage device of one embodiment of the present invention is bendable. Such a bendable power storage device can be incorporated in devices that will change their shapes, including wearable devices and other electronic devices. Since the wearable device changes its shape when attached to or worn on a human body or the like, the wearable device can fit more snugly.

Preferably, electronic devices like wearable devices can be repeatedly attached to and detached from a human body. Accordingly, it is preferable that the power storage device of one embodiment of the present invention can be repeatedly bent.

When the power storage device is bent, the exterior body changes its shape. The change in shape of the exterior body sometimes induces a crack on part of the exterior body, thinning of a stretched part of the exterior body, or the like. In that case, the exterior body becomes more permeable to impurities. As a result, impurities in the air such as moisture easily enter a region surrounded by the exterior body.

The permeability to impurities of the exterior body in the power storage device of one embodiment of the present invention does not readily increase even when the power storage device is repeatedly bent.

Here, repeatedly bending means, for example, alternating between a state with a large radius of curvature and a state with a small radius of curvature. As a power storage device is bent with a smaller radius of curvature, the shape of an exterior body changes more to cause a crack or the like more easily.

When the power storage device is bent, the exterior body undergoes a local and significant change in shape in some cases. A crack sometimes occurs more easily in the exterior body that has changed its shape significantly.

<Power Storage Device>

Figure 8A:
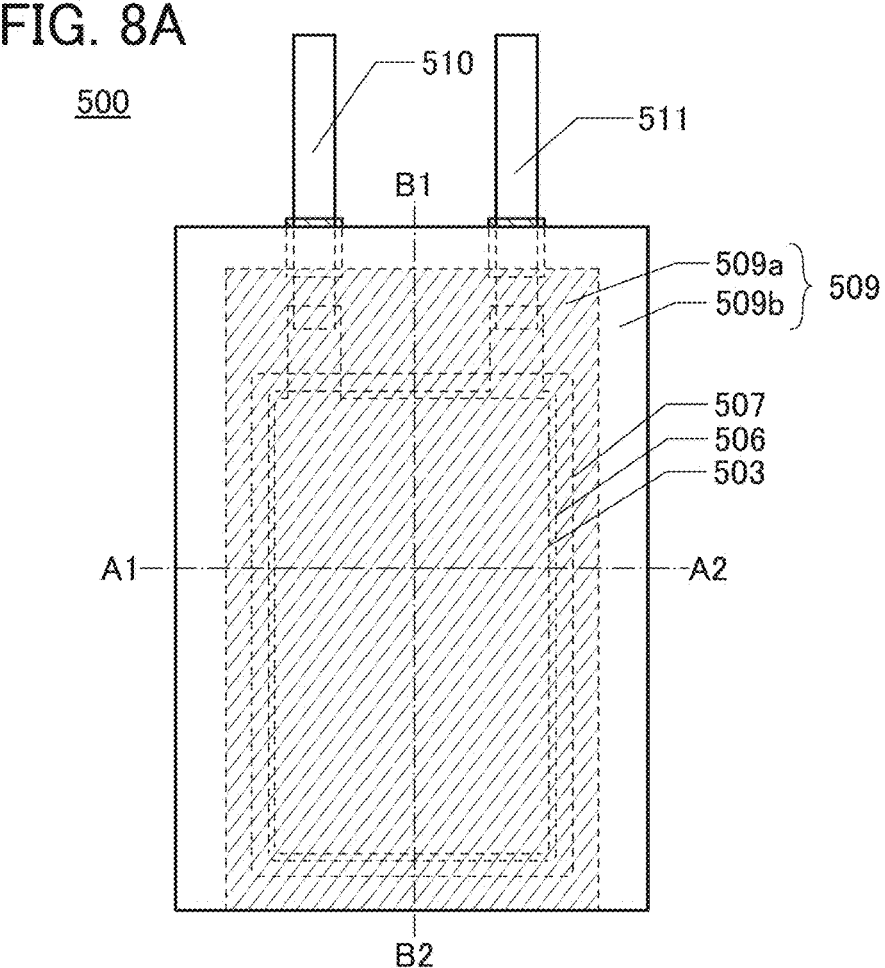
FIGS. 8A to 8C are a top view of and cross-sectional views of a power storage device.
Figure 8B:
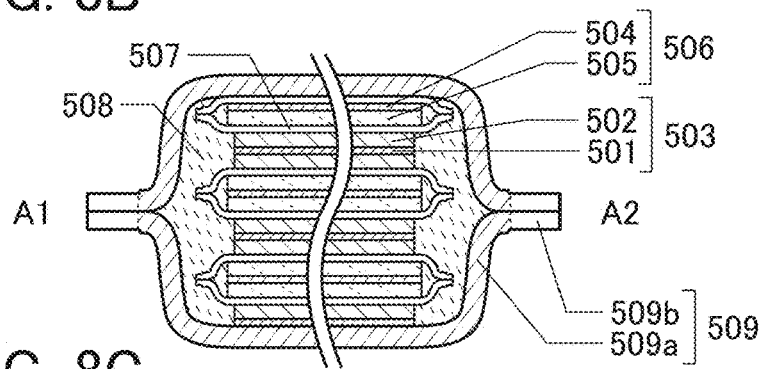
Figure 8C:
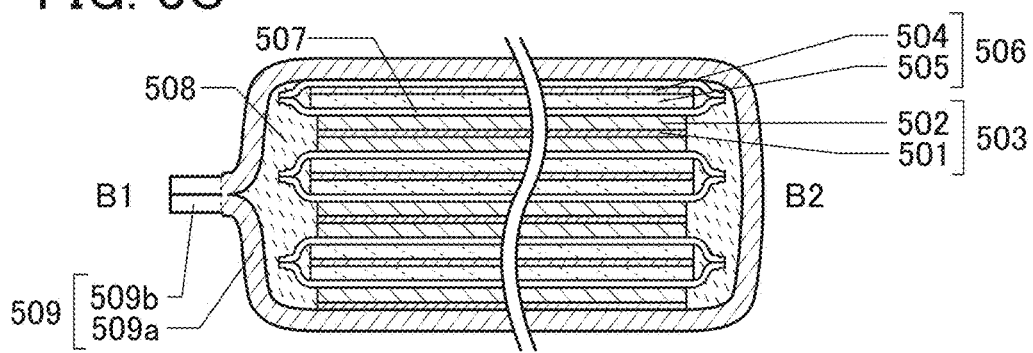

FIGS. 8A to 8C illustrate a specific structure of a power storage device. FIG. 8A illustrates a mode of a thin storage battery as an example of a power storage device 500.

As illustrated in FIG. 8A, the power storage device 500 includes a positive electrode 503, a negative electrode 506, a separator 507, and an exterior body 509. The power storage device 500 may include a positive electrode lead 510 and a negative electrode lead 511. The positive electrode lead 510 is welded to the positive electrode 503 whereas the negative electrode lead 511 is welded to the negative electrode 506.

The exterior body 509 includes a region 509a and a region 509b. The region 509b is obtained by, for example, bonding outer regions of the exterior body 509 together by thermocompression bonding. The region 509b is referred to as a seal portion in some cases. The seal portion, i.e., the region 509b corresponds to an outer edge of the exterior body. In the example illustrated in FIG. 8A, the exterior body 509 includes seal regions on three sides. That is, the region 509b is on the three sides of the exterior body 509 in FIG. 8A. Furthermore, in the top view of the exterior body illustrated in FIG. 8A, the region 509b is in contact with the outside of the region 509a. In FIG. 8A, the positive electrode lead 510 and the negative electrode lead 511 are taken out from the same side of the exterior body 509.

The sealing structure of the power storage device may be as follows: one rectangular film is folded in half such that two end portions overlap with each other and is sealed on three sides with an adhesive layer, or two films are stacked and sealed on four sides, which are the edges of the film, with an adhesive layer.

The adhesive layer can be formed using a thermoplastic film material, a thermosetting adhesive, an anaerobic adhesive, a photo-curable adhesive such as a UV curable adhesive, or a reactive curable adhesive. As the material of the adhesive, an epoxy resin, an acrylic resin, a silicone resin, a phenol resin, or the like can be used.

The exterior body preferably includes a metal layer and a resin layer. The resin layer in the region 509b includes a part thinner than the resin layer in the region 509a. The metal layer in the region 509b preferably includes a part thinner than the metal layer in the region 509a.

FIG. 8B illustrates an example of a cross-sectional view along dashed-dotted line A1-A2 in FIG. 8A, and FIG. 8C illustrates an example of a cross-sectional view along dashed-dotted line B1-B2 in FIG. 8A. FIGS. 8B and 8C illustrate cross-sectional structures of the power storage device 500 formed using three pairs of the positive electrode 503 and the negative electrode 506.

As illustrated in FIGS. 8A to 8C, the power storage device 500 includes the positive electrode 503, the negative electrode 506, the separator 507, an electrolytic solution 508, and the exterior body 509. The separator 507 is positioned between the positive electrode 503 and the negative electrode 506. A space in the exterior body 509 is filled with the electrolytic solution 508.

In the power storage device 500, the positive electrode 503 and the negative electrode 506 are positioned inside the exterior body 509. The positive electrode 503 and the negative electrode 506 are preferably wrapped in the exterior body 509. The exterior body 509 preferably has a bag-like shape.

The positive electrode 503 includes a positive electrode active material layer 502 and a positive electrode current collector 501. The negative electrode 506 includes a negative electrode active material layer 505 and a negative electrode current collector 504. The active material layer may be formed on one surface or opposite surfaces of the current collector. The separator 507 is positioned between the positive electrode current collector 501 and the negative electrode current collector 504.

A battery cell may include one or more positive electrodes and one or more negative electrodes. For example, the battery cell can have a layered structure including a plurality of positive electrodes and a plurality of negative electrodes. FIGS. 8A to 8C illustrate an example including five pairs of positive and negative electrode active material layers facing each other. It is needless to say that the number of pairs of the active material layers is not limited to five, and may be more than five or less than five. A larger number of active material layers offer a higher-capacity storage battery. In contrast, a smaller number of active material layers offer a thinner, more flexible storage battery.

FIG. 1A illustrates a top view of a power storage device of one embodiment of the present invention. The power storage device 500 in FIG. 1A is different from that in FIG. 8A in that the region 509b has slits 261. In the power storage device of one embodiment of the present invention, the region 509b preferably has a plurality of slits.

The slits 261 may be, for example, cuts, splits, or rifts.

Each of the slits 261 has, for example, a linear shape. The linear shape may consist of, for example, a straight line, a curved line, or a combination of straight and curved lines. Examples of the curved line include a spiral and an arc.

In FIG. 1A, the region 509b has a band-like shape. In FIG. 1A, the major axis of each of the slits 261 is substantially perpendicular to the major axis of the band. The major axis of each slit 261 is not necessarily perpendicular to the major axis of the band. For example, the angle between the major axis of each slit 261 and the major axis of the band may be greater than or equal to 45° and less than 90°.

The distance between adjacent slits 261 may be greater than or equal to 2 mm and less than or equal to 3 cm.

Figure 1B:
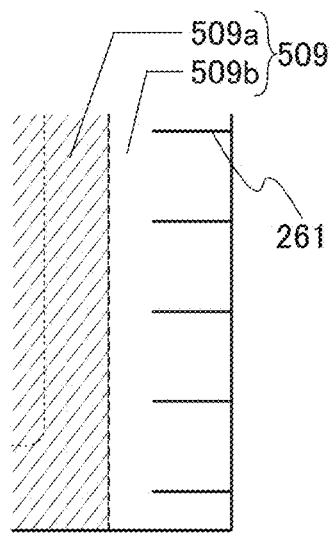

FIG. 1B is an enlarged view of a region surrounded by a dashed-dotted line in FIG. 1A. The region 509b includes a plurality of linear slits 261.

Enlarged views of the region 509b are illustrated in FIGS. 1C and 1D and FIGS. 2A to 2D.

Figure 1C:
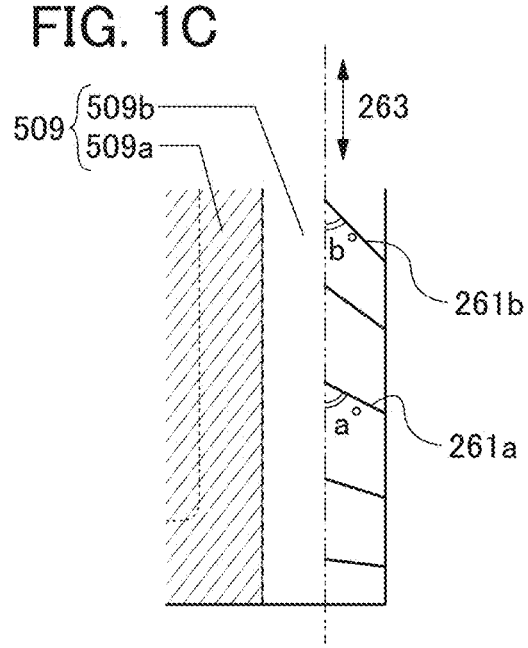
Figure 1D:
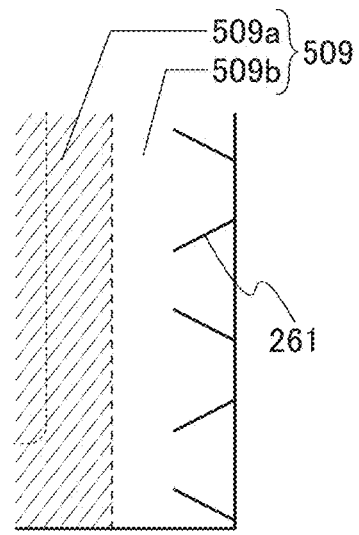

As illustrated in FIGS. 1C and 1D, the plurality of slits 261 may have the respective major axes in different directions. For example, in the case where the power storage device 500 is bent, the slits 261 in areas with different curvatures may be oriented in different directions.

Among the plurality of slits 261, a first slit 261a and a second slit 261b are focused on in FIG. 1C. Reference numeral 263 in FIG. 1C denotes the major-axis direction of the region 509b. The angle between the major axis of the slit 261a and the major axis of the region 509b is represented as a° whereas the angle between the major axis of the slit 261b and the major axis of the region 509b is represented as b° (a° and b° are each an acute angle). In FIG. 1C, a<b is satisfied. In FIG. 1D, adjacent slits are substantially symmetric with respect to a line parallel to dashed-dotted line A1-A2 shown in FIG. 1A.

Figure 2A:
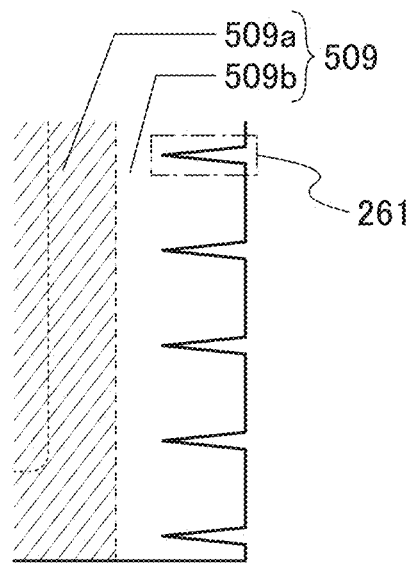
FIGS. 2A to 2D illustrate top surfaces of a power storage device.
Figure 2B:
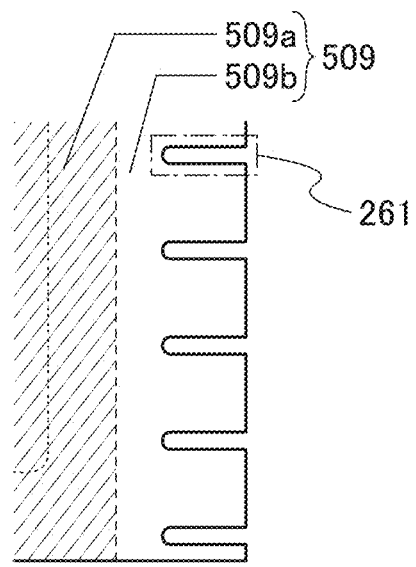
Figure 2C:
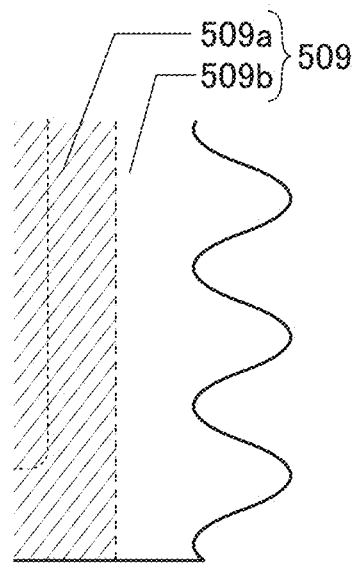

The slits 261 may each have a wedge shape as illustrated in FIG. 2A. Alternatively, an end portion of each slit 261 may have an arc shape as illustrated in FIG. 2B. Further alternatively, an end portion of the exterior body 509 may have a wave shape as illustrated in FIG. 2C. The end portion of the exterior body 509 may be, for example, a curved line, a wave line, an arc, or a shape with a plurality of inflection points.

Figure 2D:
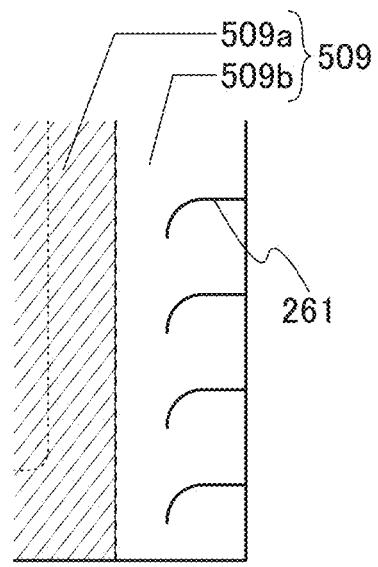

FIG. 2D illustrates an example of a curved slit. The slits 261 in FIG. 2D each have an end portion with an arc shape.

Figure 3A:
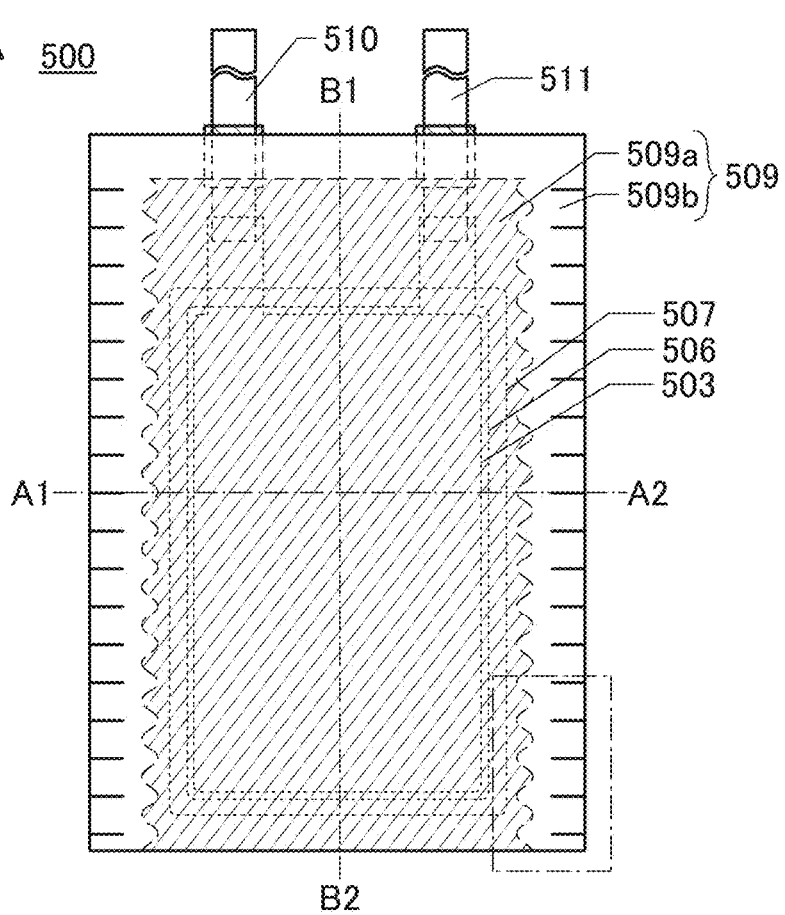
FIGS. 3A to 3C illustrate top surfaces of a power storage device.
Figure 3B:
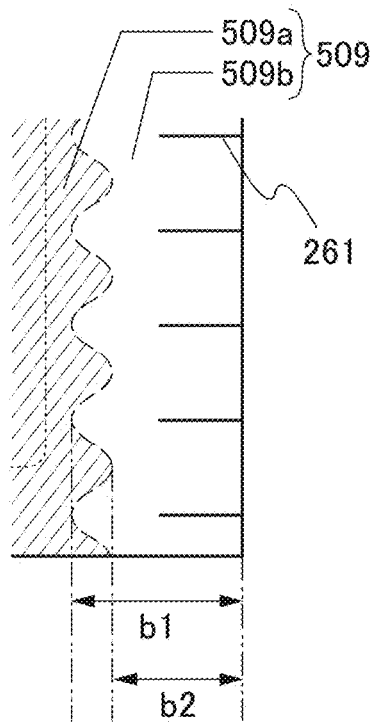

The power storage device 500 illustrated in FIG. 3A includes the exterior body 509. The exterior body 509 includes the region 509a and the region 509b. In FIG. 3A, the boundary between the region 509a and the region 509b has a wave shape. The boundary between the region 509a and the region 509b may be, for example, a curved line, a wave line, an arc, or a shape with a plurality of inflection points. When the boundary between the region 509a and the region 509b has such a shape, the power storage device 500 can be sometimes bent with less stress applied to the exterior body 509 due to the modification of the power storage device 500. FIG. 3B is an enlarged view of a region surrounded by a dashed-dotted line in FIG. 3A. The width of the region 509b in the vicinity of a region with the slit 261 is represented as b1 whereas the width of the region 509b in a region between adjacent slits 261 is represented as b2. In FIG. 3A, the width b1 is greater than the width b2.

Figure 3C:
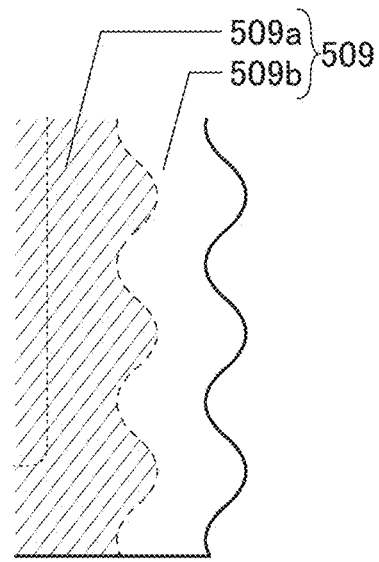

FIG. 3C is an enlarged view of the region 509b, which shows an example of combining the case where the boundary between the region 509a and the region 509b has a wave shape and the case where the end portion of the exterior body 509 has a wave shape. In the example shown in FIG. 3C, the peaks and valleys of the wavy boundary between the region 509a and the region 509b are substantially aligned with the peaks and valleys of the wavy end portion of the exterior body 509.

The center of gravity of the power storage device is referred to as the center of the power storage device in some cases. In some other cases, the center of a top view of the power storage device is referred to as the center of the power storage device.

Figure 4A:
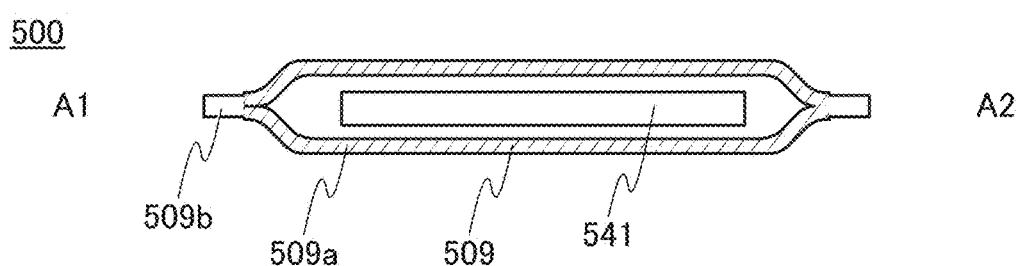
FIGS. 4A to 4C illustrate cross sections of a power storage device.
Figure 4B:
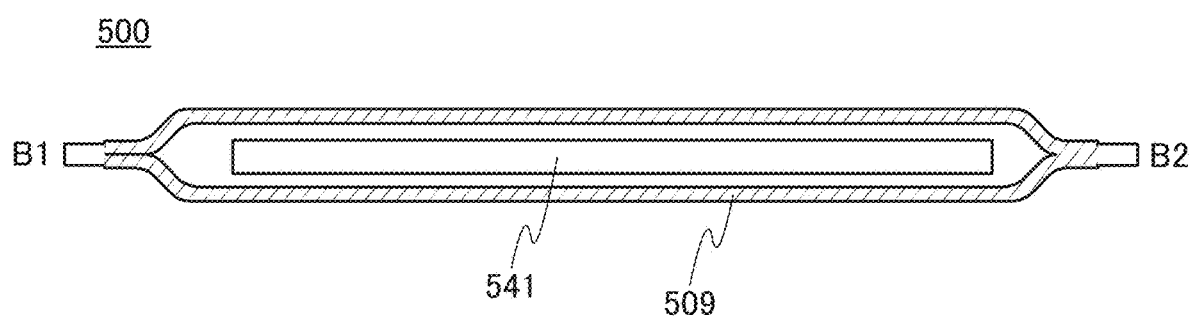

The power storage device of one embodiment of the present invention can be, for example, repeatedly bent. FIGS. 4A and 4B are simplified cross-sectional views of the power storage device 500 of one embodiment of the present invention along dashed-dotted line A1-A2 and dashed-dotted line B1-B2, respectively. The exterior body 509 includes the region 509a and the region 509b, and a stack body 541 is wrapped in the exterior body 509. The stack body 541 includes the positive electrode 503, the negative electrode 506, and the separator 507.

Figure 4C:
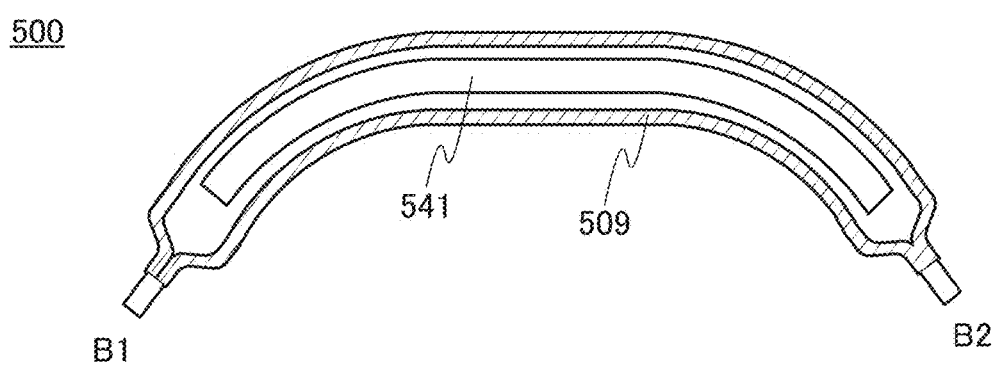

An example of bending the power storage device 500 is described. FIG. 4C illustrates a cross section of the power storage device 500 that has been bent from the state illustrated in FIG. 4B.

The power storage device 500 of one embodiment of the present invention includes the region 509b with the plurality of slits 261, so that a crack and the like can be prevented from causing in the exterior body 509.

The plurality of slits 261 may be arranged, for example, in a radial pattern.

FIGS. 5A and 5B are top views of the power storage device 500. In FIGS. 5A and 5B, the slits 261 above dashed-dotted line A1-A2 and the slits 261 below dashed-dotted line A1-A2 are substantially symmetric with respect to dashed-dotted line A1-A2.

Alternatively, the region 509b may include two or more holes, dotted holes, or spotted holes. The dotted holes may be arranged linearly, for example.

The major diameter of each hole is, for example, greater than or equal to 0.1 mm and less than or equal to 3 mm. The plurality of dotted holes may have different diameters. The major diameter refers to, for example, the maximum width of the hole in some cases.

Figure 6A:
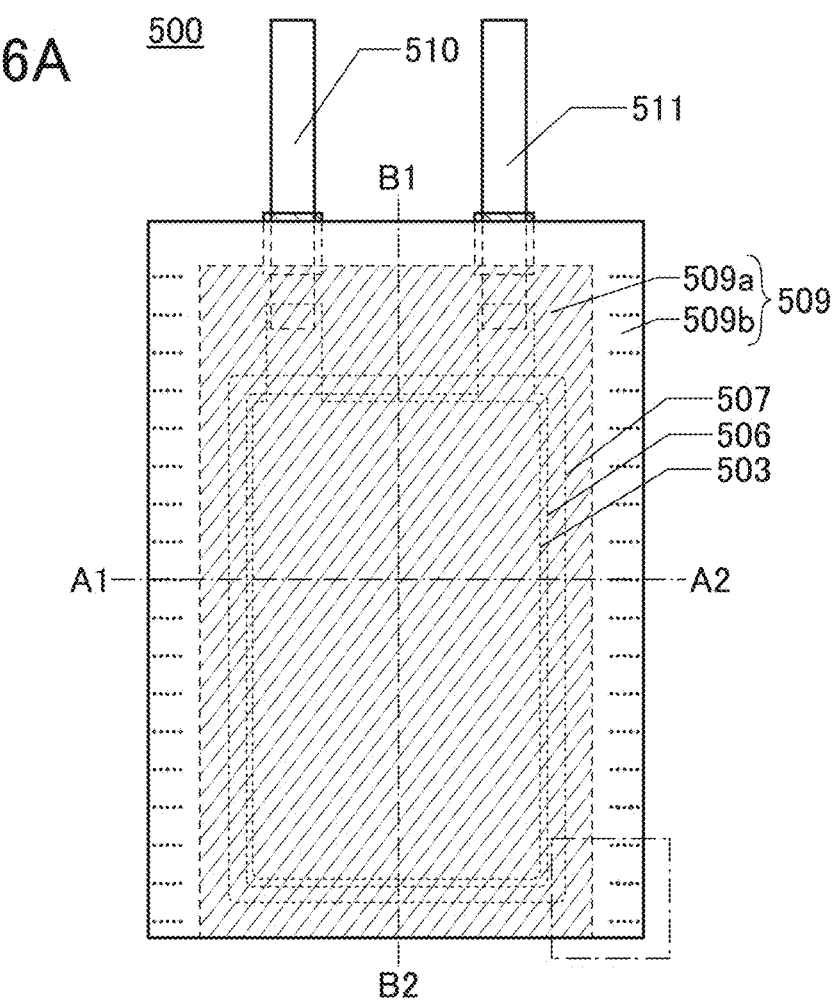
FIGS. 6A and 6B illustrate top surfaces of a power storage device.
Figure 6B:
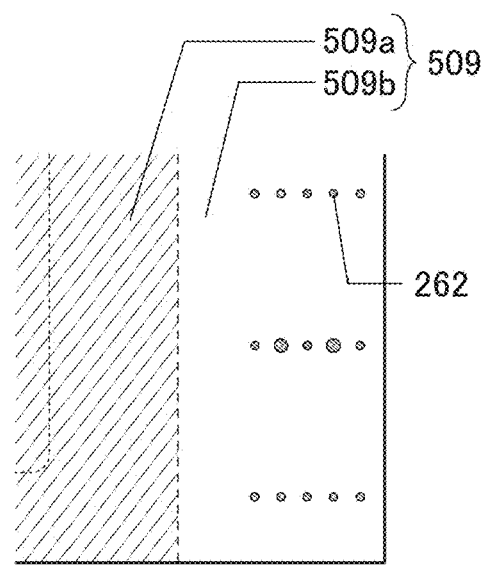

The power storage device 500 illustrated in FIG. 6A includes the exterior body 509. The exterior body 509 includes the region 509a and the region 509b. FIG. 6B is an enlarged view of a region surrounded by a dashed-dotted line in FIG. 6A. As illustrated in FIG. 6B, the power storage device 500 includes a plurality of holes 262 in the region 509b, and the holes 262 each have a dotted shape and are arranged linearly. The shape of each hole seen from above may be a circle, an ellipse, a rectangle, a rhombus, a polygon, or the like.

Figure 7:
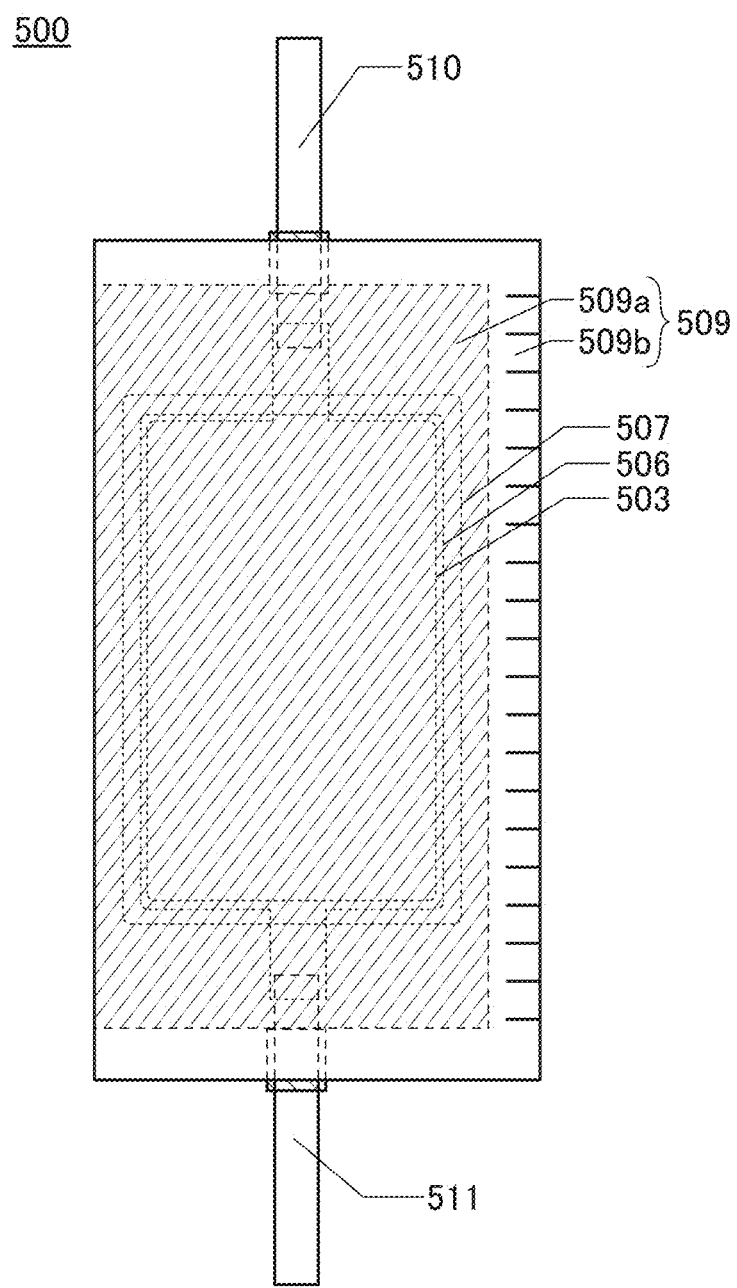
FIG. 7 illustrates a top surface of a power storage device.

As illustrated in FIG. 7, the positive electrode lead 510 and the negative electrode lead 511 may be taken out from the opposite sides of the exterior body 509.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, and a fluorine-based polymer gel.

Alternatively, when one or more kinds of ionic liquids (room temperature molten salts) which have features of non-flammability and non-volatility is used as a solvent of the electrolytic solution, a power storage device can be prevented from exploding or catching fire even when the power storage device internally shorts out or the internal temperature increases owing to overcharging or the like. An ionic liquid contains a cation and an anion. The ionic liquid contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as a supporting electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gelled electrolyte obtained in such a manner that a polymer is swelled with an electrolytic solution may be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, since the battery can be entirely solidified, there is no possibility of liquid leakage to increase the safety of the battery dramatically.

As the separator 507, for example, paper; nonwoven fabric; glass fiber; ceramics; or synthetic fiber using nylon (polyamide), vinylon (polyvinyl alcohol-based fiber), polyester, acrylic, polyolefin, or polyurethane can be used.

Details about the positive electrode 503 and the negative electrode 506 will be described in the following embodiment.

In the above structure, the exterior body 509 of the power storage battery can change its form such that the smallest curvature radius is greater than or equal to 3 mm and less than or equal to 30 mm, preferably greater than or equal to 3 mm and less than or equal to 10 mm. One or two films are used as the exterior body of the power storage battery. In the case where the power storage battery has a layered structure, the power storage battery that is bent has a cross section sandwiched by two curves of the films serving as the exterior body.

Figure 9A:
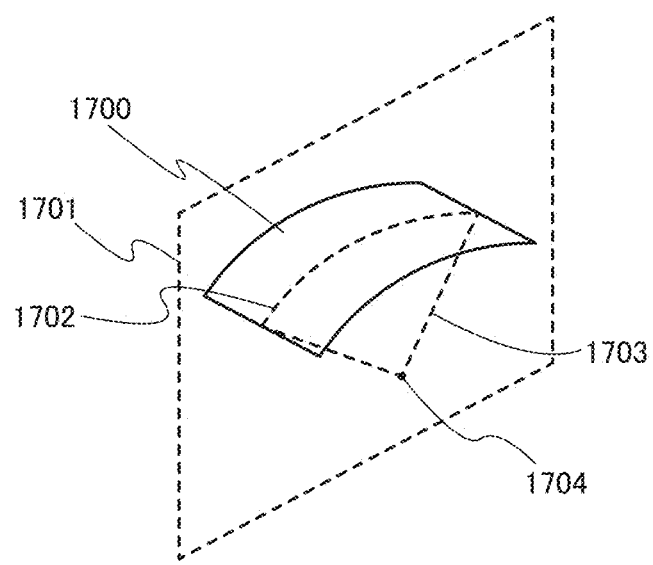
FIGS. 9A to 9C illustrate a radius of curvature of a surface.
Figure 9B:
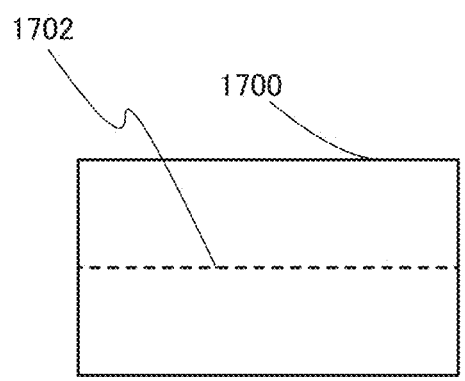
Figure 9C:
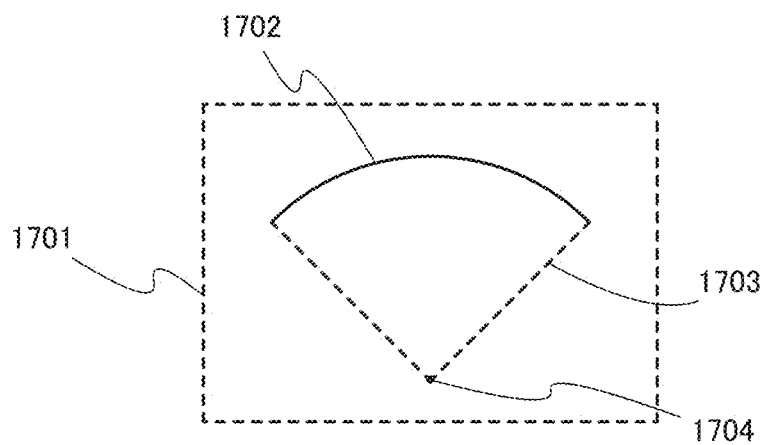

Description will be given of the radius of curvature of a surface with reference to FIGS. 9A to 9C. In FIG. 9A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 9B is a top view of the curved surface 1700. FIG. 9C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 10A:
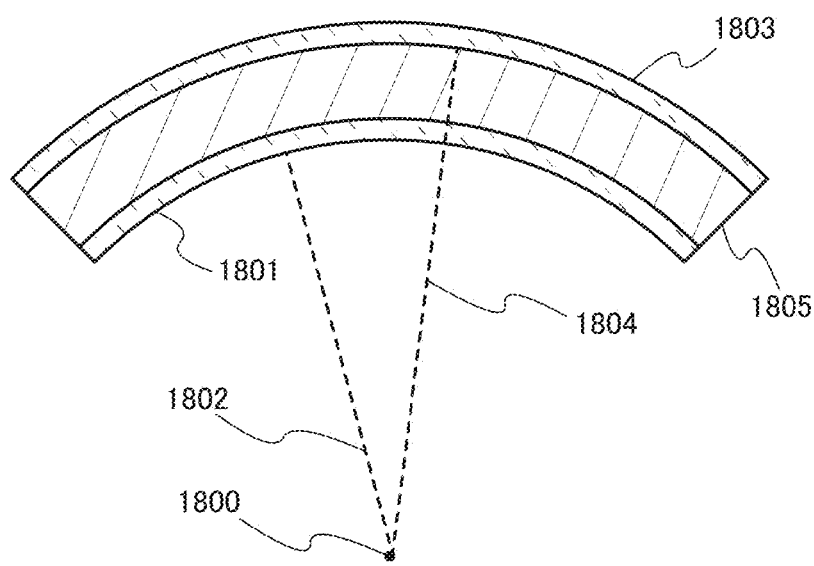
FIGS. 10A to 10D illustrate a radius of curvature of a film.
Figure 10B:
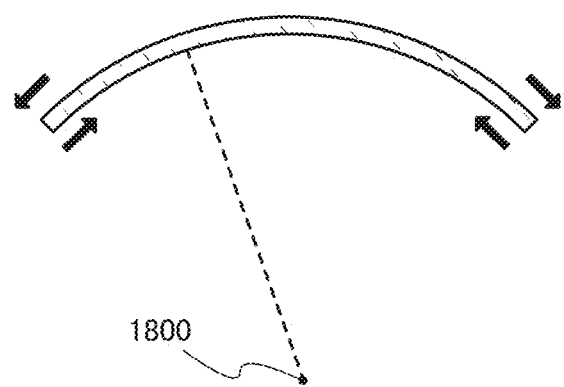

In the case of bending a secondary battery in which a component 1805 including electrodes and an electrolytic solution is sandwiched between two films as exterior bodies, a radius 1802 of curvature of a film 1801 close to a center 1800 of curvature of the secondary battery is smaller than a radius 1804 of curvature of a film 1803 far from the center 1800 of curvature (FIG. 10A). When the secondary battery is bent to have an arc-shaped cross section, compressive stress is applied to a surface of the film on the side closer to the center 1800 of curvature and tensile stress is applied to a surface of the film on the side farther from the center 1800 of curvature (FIG. 10B). However, by forming slits in the seal portion of the exterior bodies, the influence of a strain can be reduced to be acceptable even when compressive stress and tensile stress are applied. For this reason, the secondary battery can change its form such that the exterior body on the side closer to the center of curvature has the smallest curvature radius greater than or equal to 3 mm and less than or equal to 30 mm, preferably greater than or equal to 3 mm and less than or equal to 10 mm.

Figure 10C:
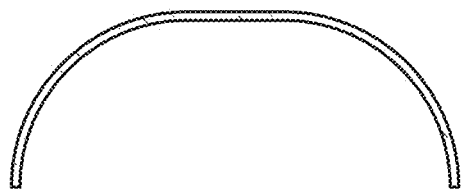
Figure 10D:
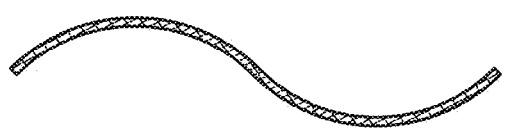

Note that the cross-sectional shape of the secondary battery is not limited to a simple arc shape, and the cross section can be partly arc-shaped; for example, a shape illustrated in FIG. 10C, a wavy shape illustrated in FIG. 10D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has the smallest curvature radius, for example, greater than or equal to 3 mm and less than or equal to 30 mm, preferably greater than or equal to 3 mm and less than or equal to 10 mm.

<Manufacturing Method>

Figure 11A:
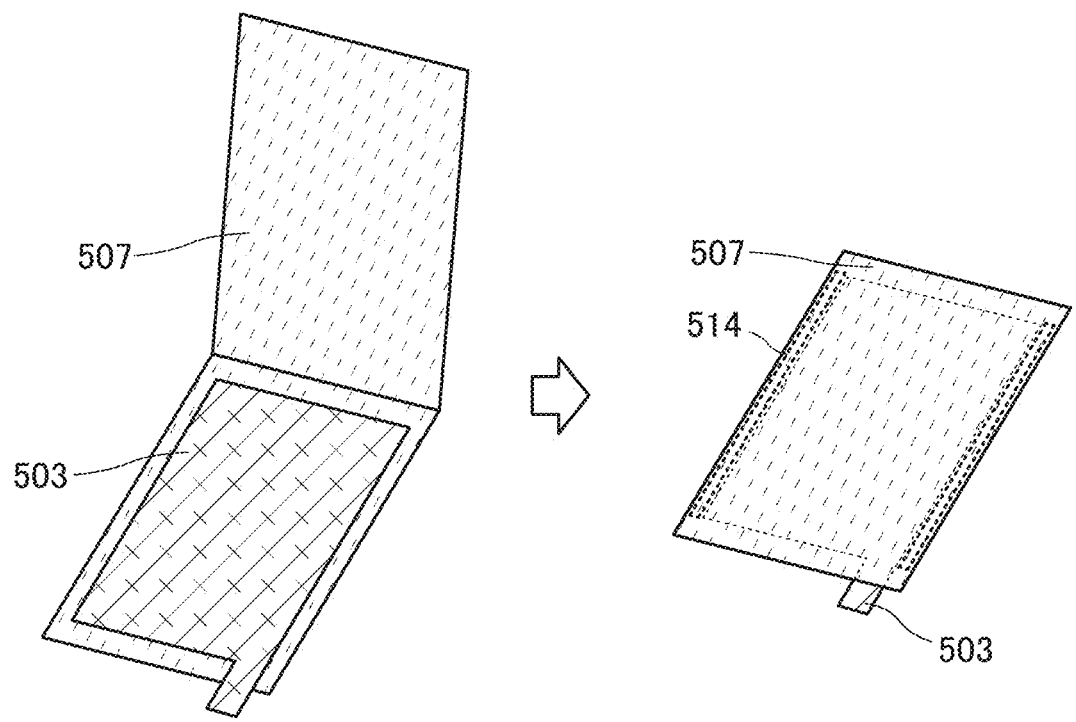
FIGS. 11A and 11B illustrate a method for manufacturing a power storage device.
Figure 11B:
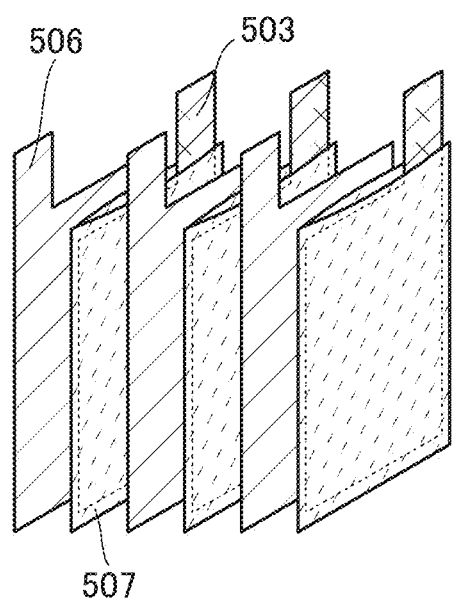

The separator 507 is preferably formed to have a bag-like shape to wrap one of the positive electrode 503 and the negative electrode 506. For example, as illustrated in FIG. 11A, the separator 507 is folded in two so that the positive electrode 503 is sandwiched, and sealed with a seal portion 514 in a region outside the region overlapping with the positive electrode 503; thus, the positive electrode 503 can be reliably supported inside the separator 507. Then, as illustrated in FIG. 11B, the positive electrodes 503 wrapped by the separators 507 and the negative electrodes 506 are alternately stacked and provided in the exterior body 509, whereby the power storage device 500, which is a thin storage battery, can be formed.

Figure 12A:
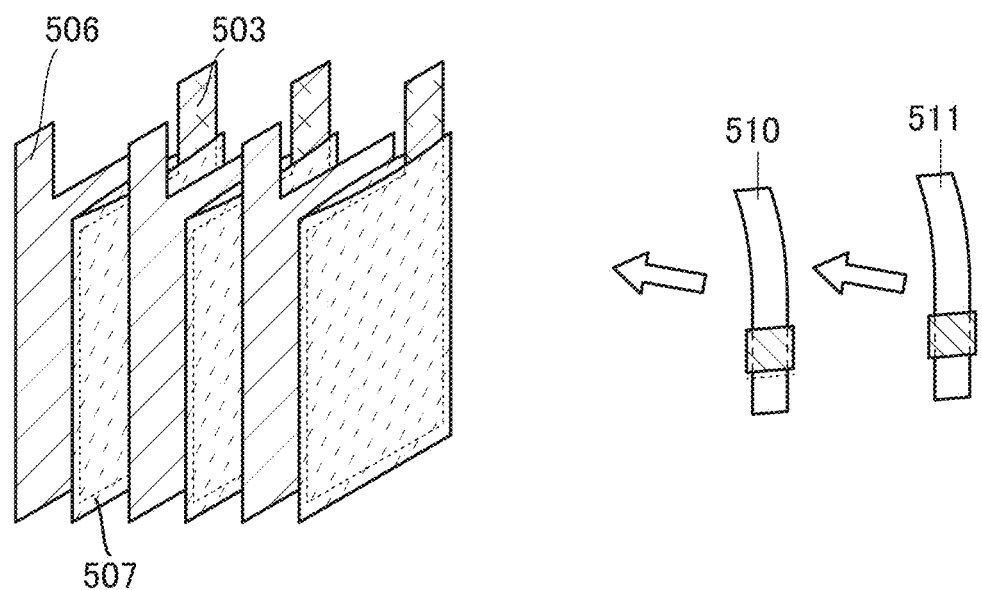
FIGS. 12A and 12B illustrate a method for manufacturing a power storage device.
Figure 12B:
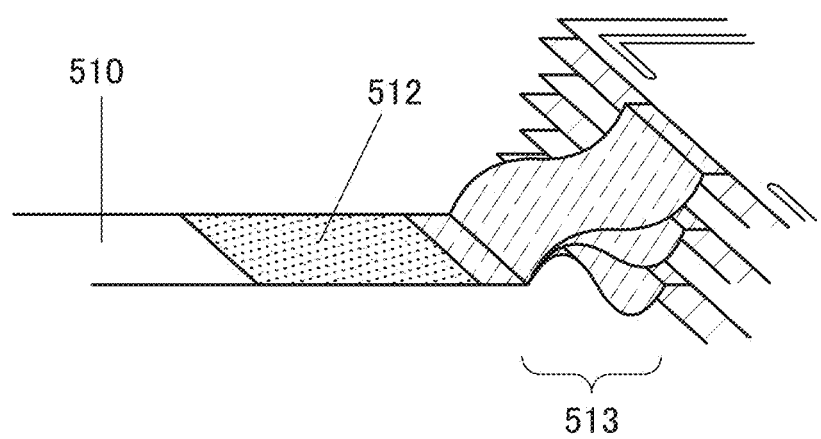

FIGS. 12A and 12B illustrate an example where current collectors are welded to a lead electrode. As illustrated in FIG. 12A, the positive electrodes 503 each wrapped by the separator 507 and the negative electrodes 506 are alternately stacked. Then, the positive electrode current collectors of the positive electrodes 503 are welded to the positive electrode lead 510, and the negative electrode current collectors of the negative electrodes 506 are welded to the negative electrode lead 511. FIG. 12B illustrates an example in which the positive electrode current collectors 501 are welded to the positive electrode lead 510. The positive electrode current collectors 501 are welded to the positive electrode lead 510 in a welding region 512 by ultrasonic welding or the like. The positive electrode current collector 501 includes a bent portion 513 as illustrated in FIG. 12B, which relieves stress due to external force applied after the fabrication of the power storage device 500, and improves the reliability of the power storage device 500. Here, a region of the positive electrode current collector or the negative electrode current collector on which welding is performed is referred to as a tab region in some cases.

Figure 13A:
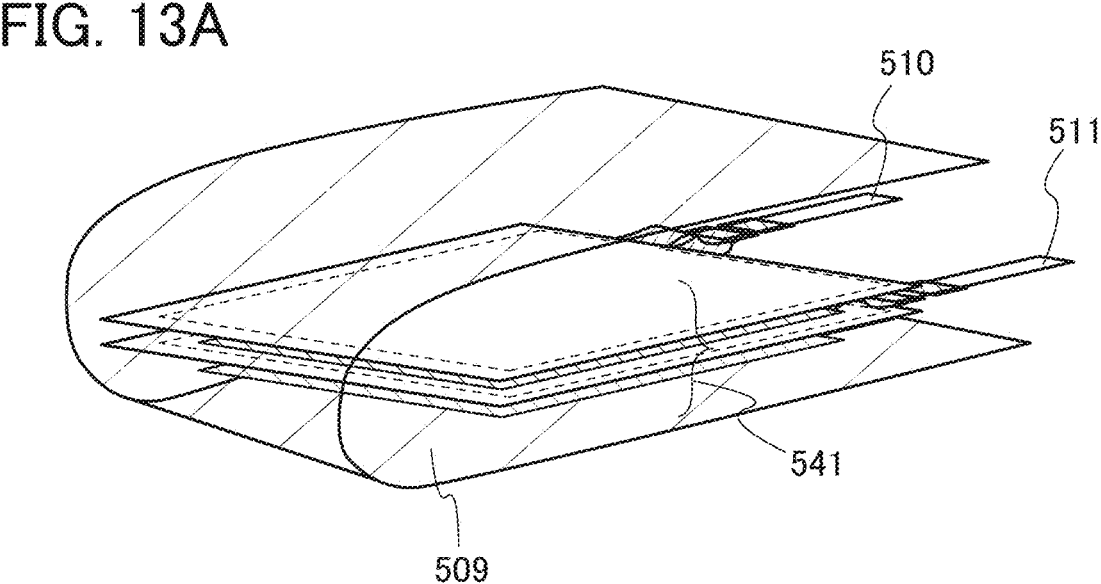
FIGS. 13A and 13B illustrate a method for manufacturing a power storage device.
Figure 13B:
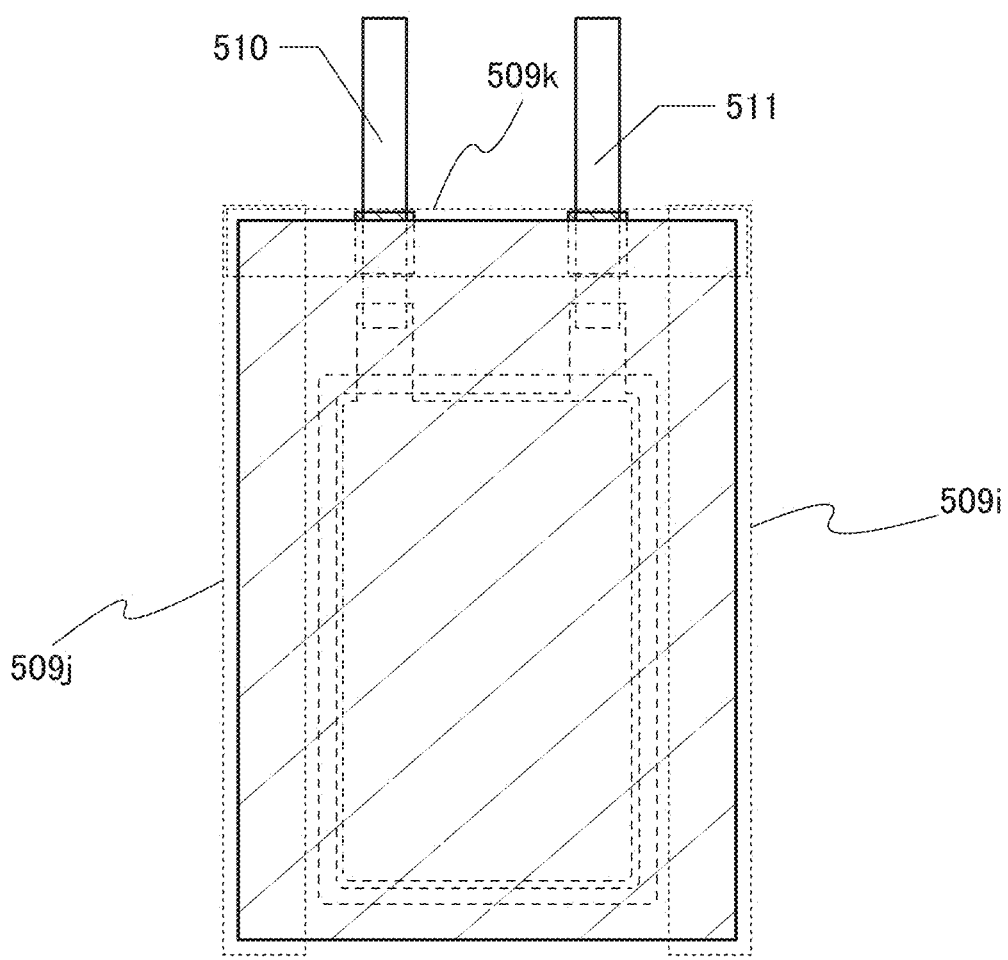

FIGS. 13A and 13B are a perspective view and a top view each illustrating a manufacturing method of the power storage device 500. As illustrated in FIG. 13A, a stack body 541, in which the positive electrode welded to the positive electrode lead 510 and the negative electrode welded to the negative electrode lead 511 are stacked, is wrapped in the exterior body 509. As illustrated in FIG. 13B, the exterior body 509 includes a seal portion 509$i$, a seal portion 509$j$, and a seal portion 509$k$. In the fabrication of the power storage device 500, for example, the seal portion 509$k$ is sealed, the seal portion 509$i$ is sealed, an electrolytic solution is injected through a region to be the seal portion 509$j$, and then, the seal portion 509$j$ is sealed. The three seal portions 509$i$ to 509$k$ are collectively referred to as the region 509$b$.

Next, slits or holes are provided in the region 509$b$. The slits and the like may be provided by, for example, cutting the region 509$b$ in the exterior body 509 with a knife. Alternatively, the slits and the like may be provided by laser processing or the like.

<Example of Slit>

Figure 43A:
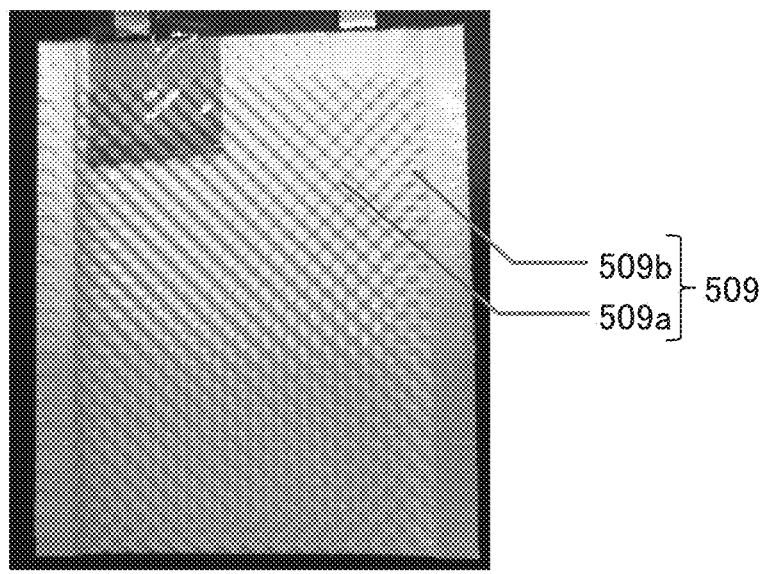
FIGS. 43A and 43B are photographs of a power storage device.
Figure 43B:
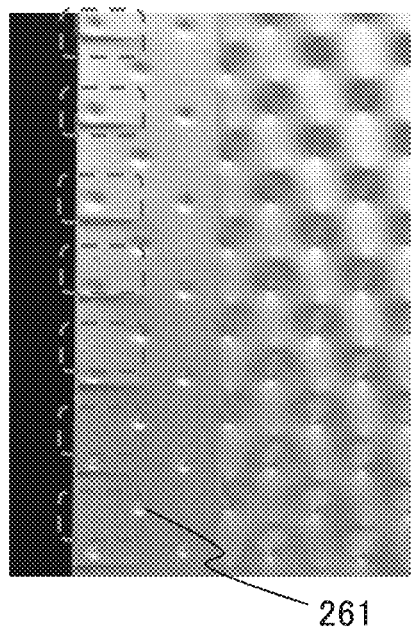
Figure 44:
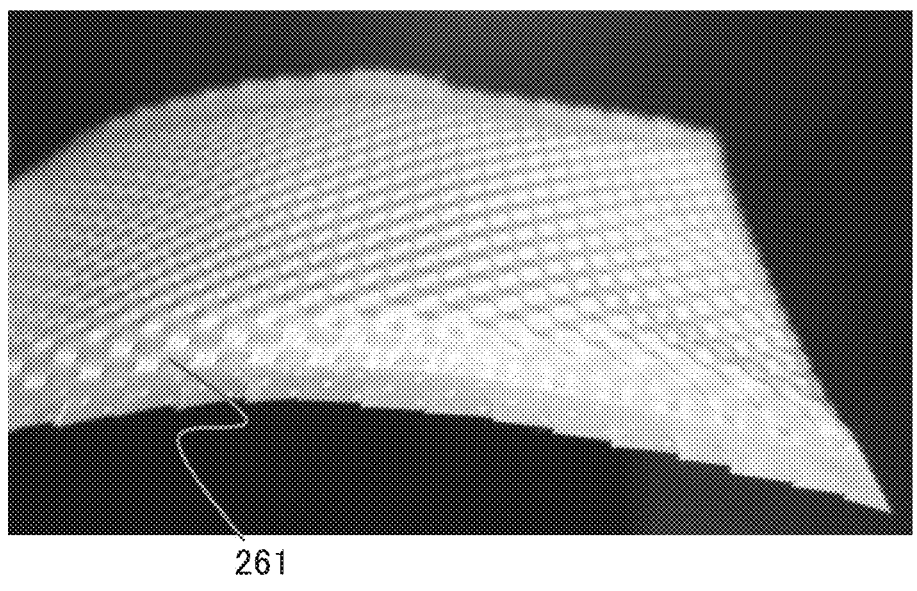
FIG. 44 is a photograph of a power storage device.

FIGS. 43A and 43B and FIG. 44 illustrate examples of the power storage device 500 which includes slits in the seal portion of the exterior body 509. Note that the exterior body 509 has projections and depressions (also referred to as embossing).

FIG. 43A is a photograph observed from the top of the power storage device 500; FIG. 43B, a photograph of an enlarged part of FIG. 43A; and FIG. 44, a photograph observed from a side of the power storage device 500. Seen from above, the exterior body has a horizontal length of 60 mm and a vertical length of 75 mm, the seal portions on the left and right each have a width of 5 mm to 6 mm, and the seal portion on the top, from which the lead electrode is taken out, has a width of 5 mm to 5.5 mm. Slits are provided in the seal region of the exterior body with scissors. The slits are substantially perpendicular to the side of the exterior body and each extend approximately 2 mm from the end portion. The distance between adjacent slits is approximately 3 mm.

<Example of Stack>

Next, a variety of examples of the stack of the positive electrode, the negative electrode, and the separator will be described.

Figure 14A:
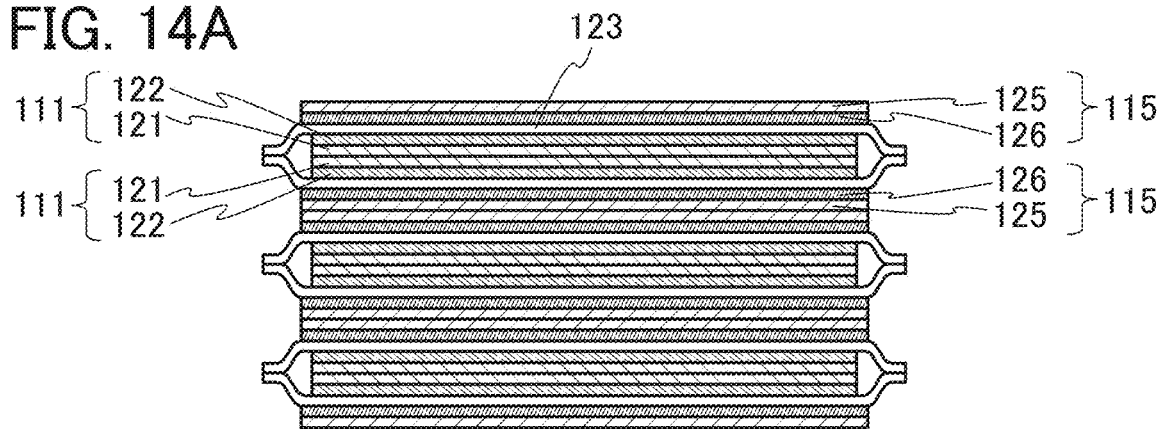
FIGS. 14A to 14C illustrate cross sections of a power storage device.

FIG. 14A illustrates an example where six positive electrodes 111 and six negative electrodes 115 are stacked. One surface of a positive electrode current collector 121 included in the positive electrode 111 is provided with a positive electrode active material layer 122. One surface of a negative electrode current collector 125 included in the negative electrode 115 is provided with a negative electrode active material layer 126.

In the structure illustrated in FIG. 14A, the positive electrodes 111 and the negative electrodes 115 are stacked so that surfaces of the positive electrodes 111 on each of which the positive electrode active material layer 122 is not provided are in contact with each other and that surfaces of the negative electrodes 115 on each of which the negative electrode active material layer 126 is not provided are in contact with each other. When the positive electrodes 111 and the negative electrodes 115 are stacked in this manner, contact surfaces between metals can be formed; specifically, the surfaces of the positive electrodes 111 on each of which the positive electrode active material layer 122 is not provided can be in contact with each other, and the surfaces of the negative electrodes 115 on each of which the negative electrode active material layer 126 is not provided can be in contact with each other. The coefficient of friction of the contact surface between metals can be lower than that of a contact surface between the active material and the separator.

Therefore, when the power storage device is bent, the surfaces of the positive electrodes 111 on each of which the positive electrode active material layer 122 is not provided slide on each other, and the surfaces of the negative electrodes 115 on each of which the negative electrode active material layer 126 is not provided slide on each other; thus, the stress due to the difference between the inner diameter and the outer diameter of a bent portion can be relieved. Here, the inner diameter of the bent portion refers to, for example, the radius of curvature of the inner surface of the bent portion in the exterior body 509 of the power storage device 500 in the case where the power storage device 500 is bent. Therefore, the deterioration of the power storage device 500 can be inhibited. Furthermore, the power storage device 500 can have high reliability.

Figure 14B:
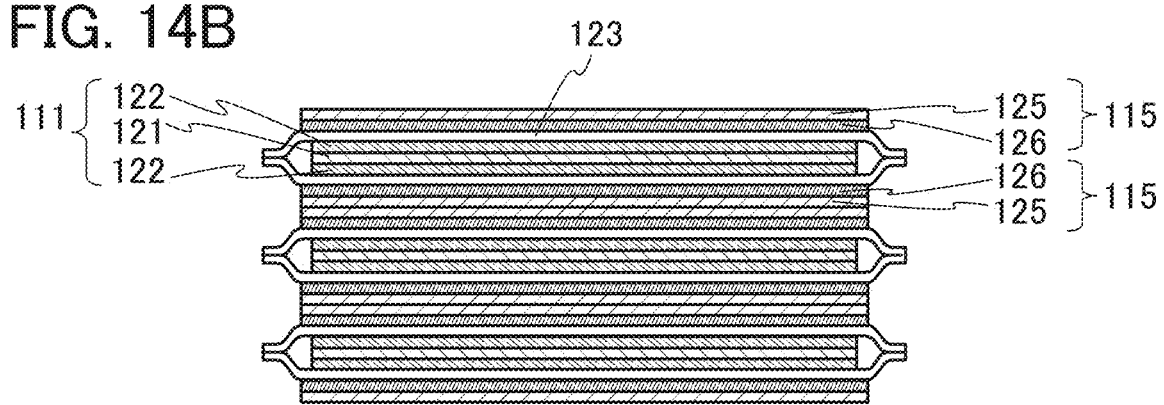

FIG. 14B illustrates an example of a stack of the positive electrodes 111 and the negative electrodes 115, which is different from that in FIG. 14A. The structure illustrated in FIG. 14B is different from that in FIG. 14A in that the positive electrode active material layers 122 are provided on both surfaces of the positive electrode current collector 121. When the positive electrode active material layers 122 are provided on both surfaces of the positive electrode current collector 121 as illustrated in FIG. 14B, the capacity per unit volume of the power storage device 500 can be increased.

Figure 14C:
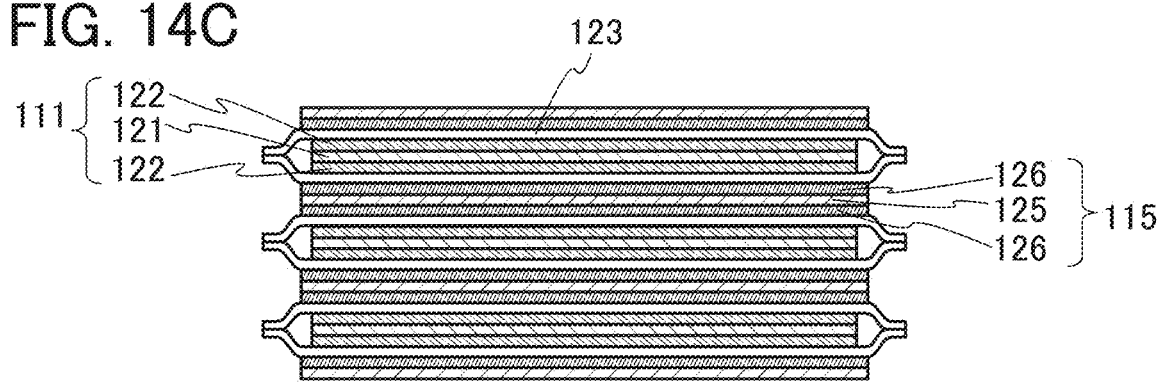

FIG. 14C illustrates an example of a stack of the positive electrodes 111 and the negative electrodes 115, which is different from that in FIG. 14B. The structure illustrated in FIG. 14C is different from that in FIG. 14B in that the negative electrode active material layers 126 are provided on both surfaces of the negative electrode current collector 125. When the negative electrode active material layers 126 are provided on both surfaces of the negative electrode current collector 125 as illustrated in FIG. 14C, the capacity per unit volume of the power storage device 500 can be further increased.

Figure 15A:
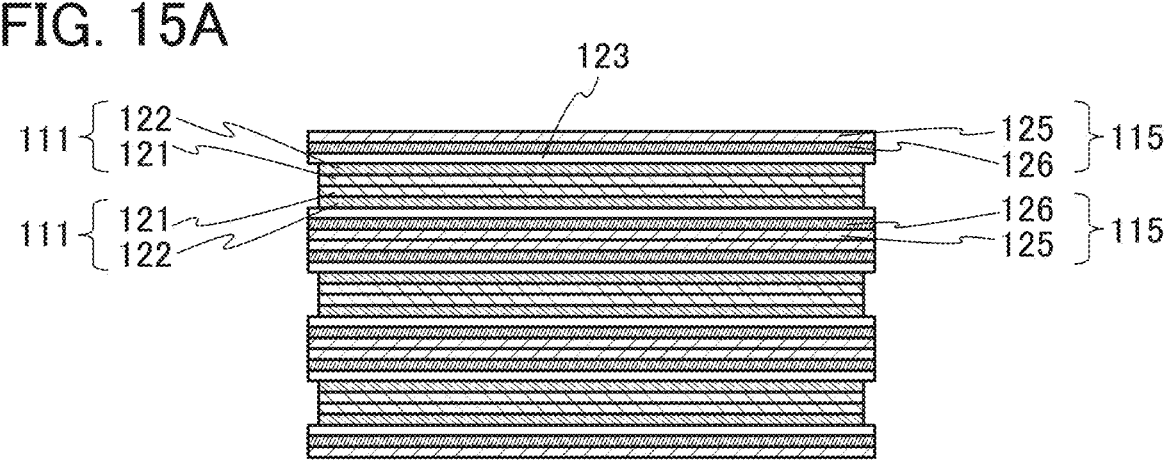
FIGS. 15A and 15B illustrate cross sections of a power storage device.

In the structures illustrated in FIGS. 14A to 14C and the like, the positive electrodes 111 are wrapped by the separator 123 with a bag-like shape; however, one embodiment of the present invention is not limited thereto. FIG. 15A illustrates an example in which the separator 123 has a structure different from that in FIG. 14A. The structure illustrated in FIG. 15A is different from that in FIG. 14A in that a sheet-like separator 123 is provided between every pair of the positive electrode active material layer 122 and the negative electrode active material layer 126. In the structure illustrated in FIG. 15A, six positive electrodes 111 and six negative electrodes 115 are stacked, and six separators 123 are provided.

Figure 15B:
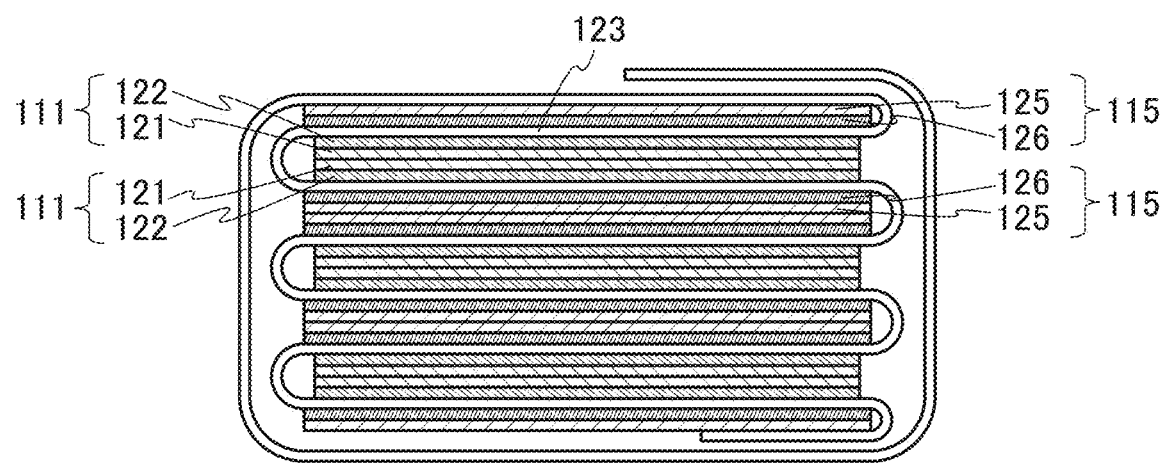

FIG. 15B illustrates an example in which the separator 123 different from that in FIG. 15A is provided. The structure illustrated in FIG. 15B is different from that in FIG. 15A in that one sheet of separator 123 is folded more than once to be interposed between every pair of the positive electrode active material layer 122 and the negative electrode active material layer 126. In other words, in the structure illustrated in FIG. 15B, the separators 123 in the respective layers which are illustrated in FIG. 15A are extended and connected together between the layers. In the structure illustrated in FIG. 15B, six positive electrodes 111 and six negative electrodes 115 are stacked and the separator 123 is folded, for example, five times or more. The separator 123 is not necessarily provided so as to be interposed between every pair of the positive electrode active material layer 122 and the negative electrode active material layer 126, and the plurality of positive electrodes 111 and the plurality of negative electrodes 115 may be bound together by extending the separator 123.

Figure 16A:
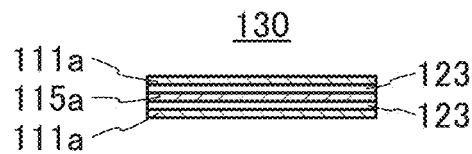
FIGS. 16A to 16C illustrate cross sections of a power storage device.
Figure 16B:
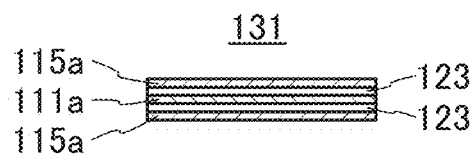
Figure 16C:
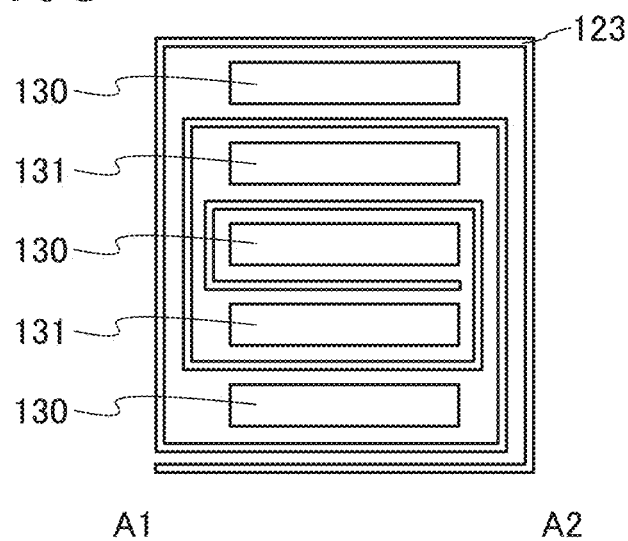

Note that the positive electrode, the negative electrode, and the separator may be stacked as illustrated in FIGS. 16A to 16C. FIG. 16A is a cross-sectional view of a first electrode assembly 130, and FIG. 16B is a cross-sectional view of a second electrode assembly 131. FIG. 16C is a cross-sectional view taken along dashed-dotted line A1-A2, which is shown in the top view such as FIG. 1A. In FIG. 16C, the first electrode assembly 130, the second electrode assembly 131, and the separator 123 are selectively illustrated for the sake of clarity.

As illustrated in FIG. 16C, the power storage device 500 includes a plurality of first electrode assemblies 130 and a plurality of second electrode assemblies 131.

As illustrated in FIG. 16A, in each of the first electrode assemblies 130, a positive electrode 111a including the positive electrode active material layers 122 on both surfaces of the positive electrode current collector 121, the separator 123, a negative electrode 115a including the negative electrode active material layers 126 on both surfaces of the negative electrode current collector 125, the separator 123, and the positive electrode 111a including the positive electrode active material layers 122 on both surfaces of the positive electrode current collector 121 are stacked in this order. As illustrated in FIG. 16B, in each of the second electrode assemblies 131, the negative electrode 115a including the negative electrode active material layers 126 on both surfaces of the negative electrode current collector 125, the separator 123, the positive electrode 111a including the positive electrode active material layers 122 on both surfaces of the positive electrode current collector 121, the separator 123, and the negative electrode 115a including the negative electrode active material layers 126 on both surfaces of the negative electrode current collector 125 are stacked in this order.

As illustrated in FIG. 16C, the plurality of first electrode assemblies 130 and the plurality of second electrode assemblies 131 are covered with the wound separator 123.

<Projections and Depressions>

The exterior body may have projections and depressions. For example, a film may be provided with projections. Examples of the film provided with projections include an embossed film and an accordion-folded film.

A metal film is easily embossed. Projections formed by embossing increase the surface area of the exterior body exposed to the outside air, for example, increase the ratio of the surface area to the area seen from above, so that heat can be dissipated effectively. In the projections formed on the front (or the back) of the film by embossing, an enclosed space whose inner volume is variable is formed with the film serving as part of a wall of a seal structure. This enclosed space can be said to be formed because the projections of the film have an accordion structure. Note that embossing, which is a kind of pressing, is not necessarily employed and any method that allows formation of a relief on part of the film may be employed.

Next, the cross-sectional shapes of projections will be described with reference to FIG. 17 and FIGS. 18A to 18F.

Figure 17:
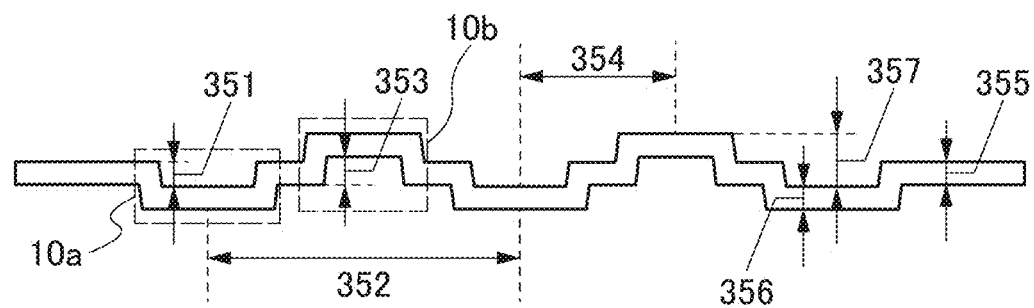
FIG. 17 illustrates a cross section of a film.
Figure 18A:
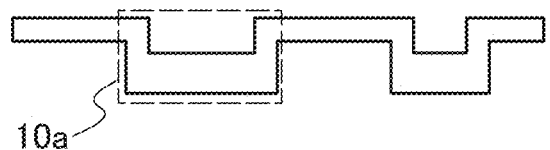
FIGS. 18A to 18F illustrate cross sections of a film.
Figure 18B:
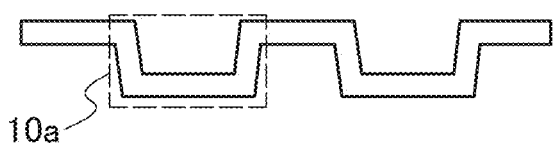
Figure 18C:
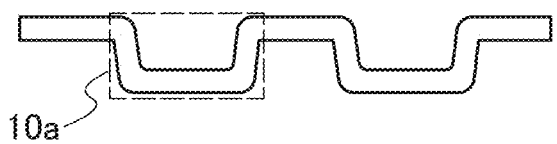
Figure 18D:
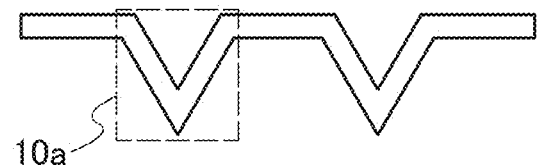
Figure 18E:
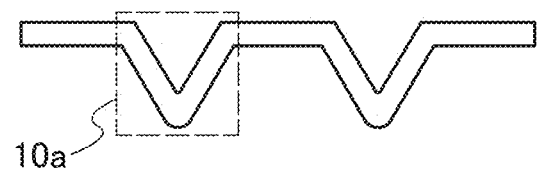
Figure 18F:
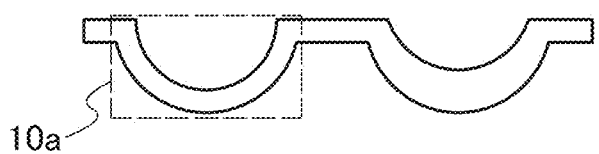
Figure 19A:
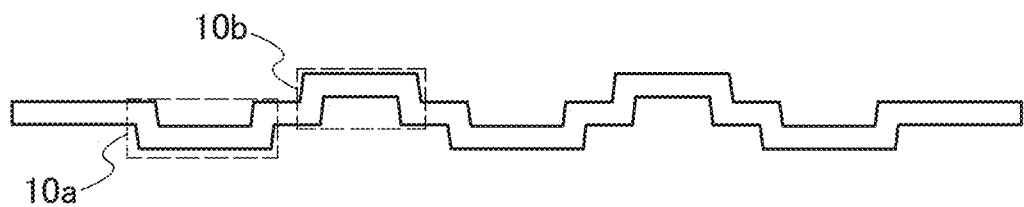
FIGS. 19A to 19D illustrate cross sections of a film.
Figure 19B:
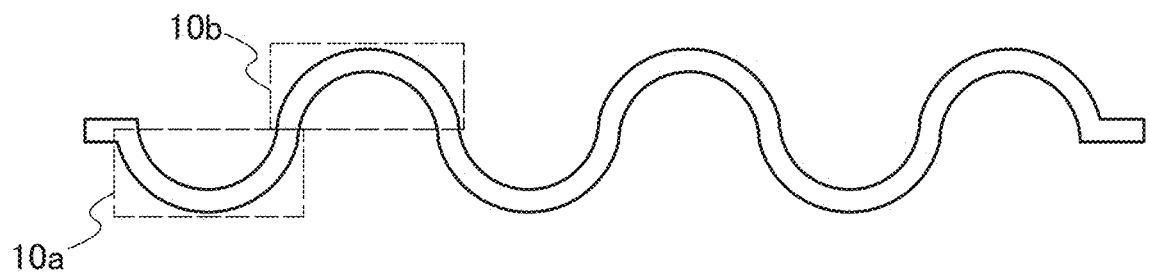
Figure 19C:
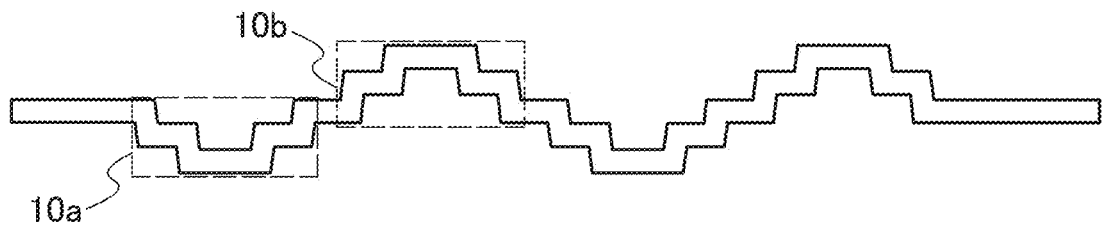
Figure 19D:
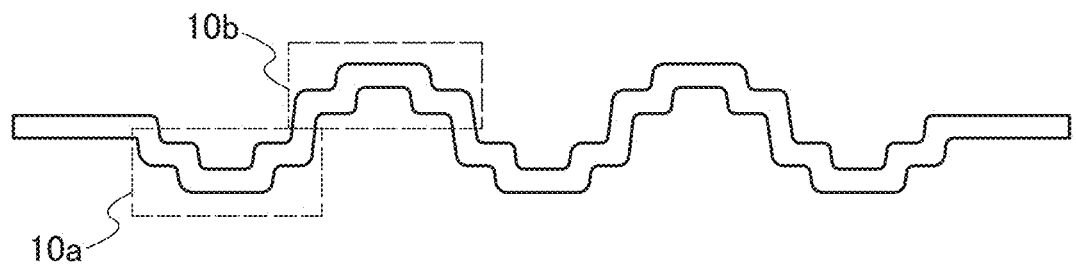

As illustrated in FIG. 17, a projection 10a whose top portion points in a first direction and a projection 10b whose top portion points in a second direction are alternately arranged in a film 10. Note that the first direction is on one surface whereas the second direction is on the other surface. The top portion in the first direction sometimes refers to the maximum point in the case where the first direction is the positive direction. Similarly, the top portion in the second direction sometimes refers to the maximum point in the case where the second direction is the positive direction.

The cross-sectional shape of each of the projection 10a and the projection 10b can be a hollow semicircular shape, a hollow semi-oval shape, a hollow polygonal shape, or a hollow irregular shape. In the case of a hollow polygonal shape, it is preferable that the polygon have more than six corners, in which case stress concentration at the corners can be reduced.

FIG. 17 shows a depth 351 of the projection 10a, a pitch 352 of the projection 10a, a depth 353 of the projection 10b, a distance 354 between the projection 10a and the projection 10b, a film thickness 355 of the film 10, and a bottom thickness 356 of the projection 10a. A height 357 is the difference between the maximum height and the minimum height of the film surface.

FIGS. 18A to 18F illustrate examples of the film 10 provided with the projection 10a.

FIGS. 19A to 19D illustrate examples of the film 10 provided with the projection 10a and the projection 10b.

Next, the top surface shapes of projections will be described with reference to FIGS. 20A to 23D.

Figure 20A:
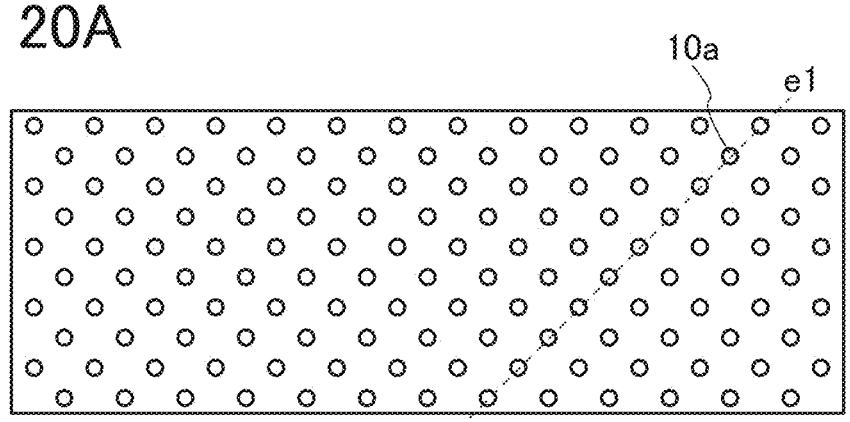
FIGS. 20A and 20B illustrate top surfaces of a film.

In a film illustrated in FIG. 20A, the projections 10a whose top portions are on one surface are arranged regularly. Here, dashed line e1 indicating the direction in which the projections 10a are arranged is slanted to the sides of the film.

Figure 20B:
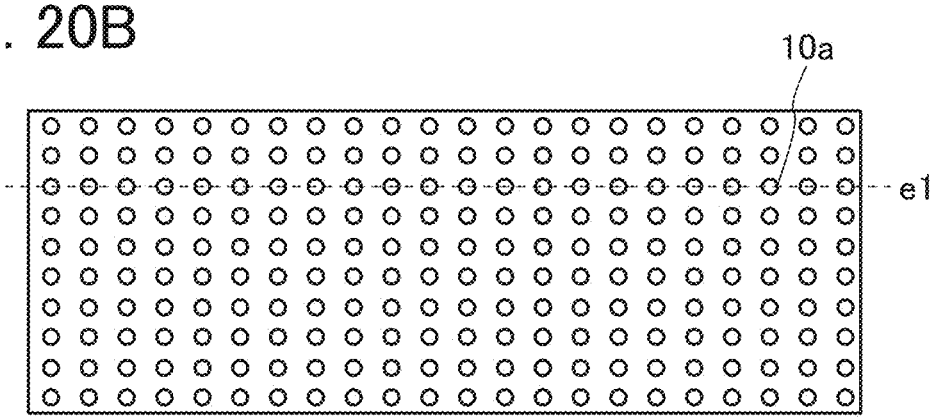

In a film illustrated in FIG. 20B, the projections 10a whose top portions are on one surface are arranged regularly. Here, dashed line e1 indicating the direction in which the projections 10a are arranged is parallel to the long side of the film.

Figure 21A:
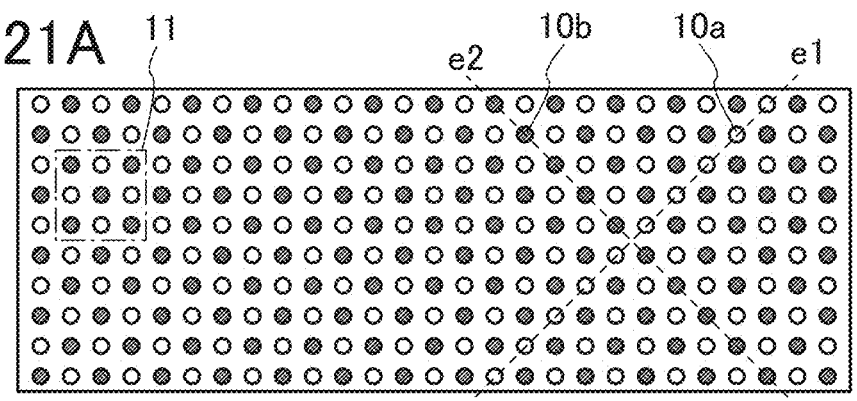
FIGS. 21A to 21D illustrate top surfaces of a film.

In a film illustrated in FIG. 21A, the projections 10a whose top portions are on one surface and the projections 10b whose top portions are on the other surface are arranged regularly. Here, dashed line e1 indicating the direction in which the projections 10a are arranged and dashed line e2 indicating the direction in which the projections 10b are arranged are slanted to the sides of the film. In addition, dashed line e1 and dashed line e2 cross each other.

Figure 21B:
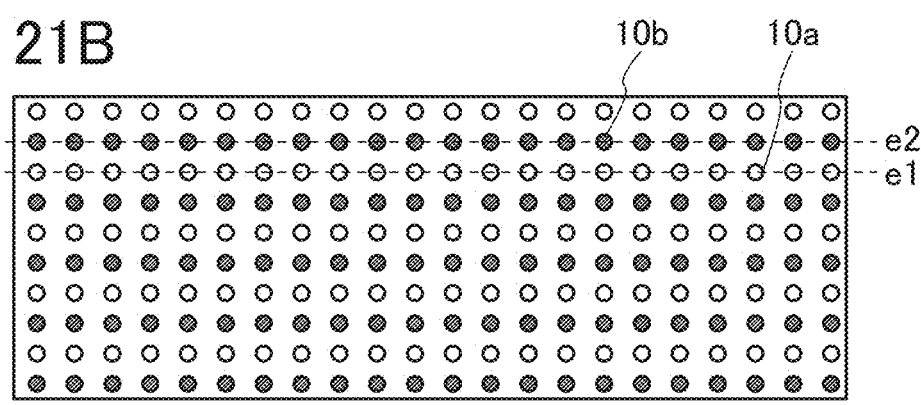

In a film illustrated in FIG. 21B, the projections 10a whose top portions are on one surface and the projections 10b whose top portions are on the other surface are arranged regularly. Here, dashed line e1 indicating the direction in which the projections 10a are arranged and dashed line e2 indicating the direction in which the projections 10b are arranged are parallel to the long side of the film.

Figure 21C:
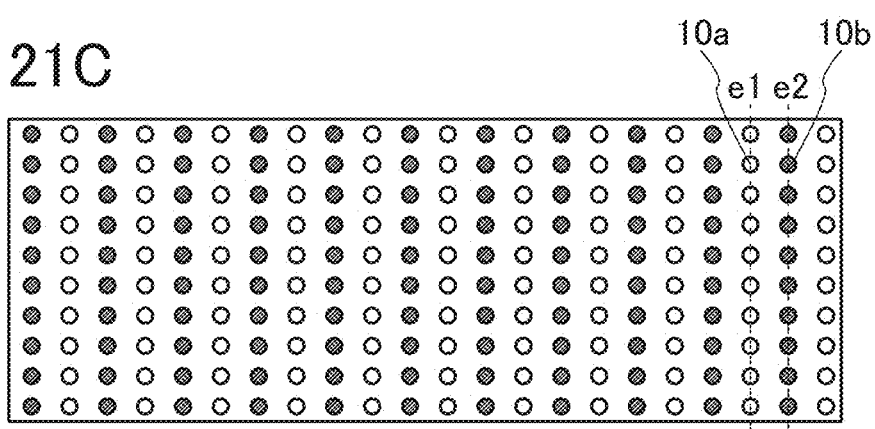

In a film illustrated in FIG. 21C, the projections 10a whose top portions are on one surface and the projections 10b whose top portions are on the other surface are arranged regularly. Here, dashed line e1 indicating the direction in which the projections 10a are arranged and dashed line e2 indicating the direction in which the projections 10b are arranged are parallel to the short side of the film.

Figure 21D:
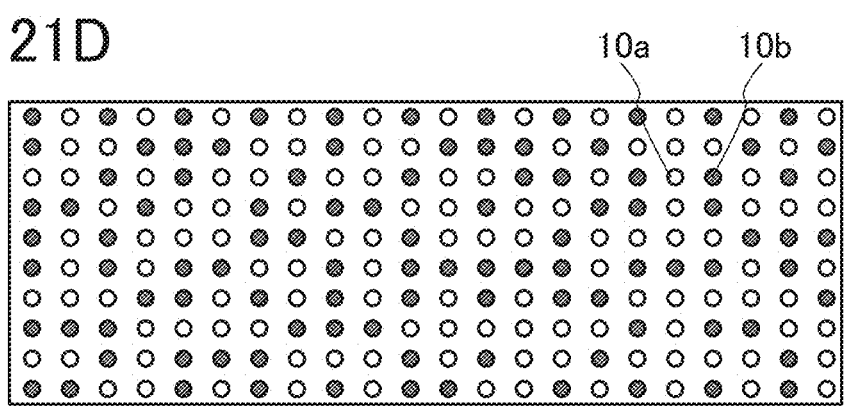

In a film illustrated in FIG. 21D, the projections 10a whose top portions are on one surface and the projections 10b whose top portions are on the other surface are arranged randomly.

Although the top surface shape of each projection illustrated in FIGS. 20A and 20B and FIGS. 21A to 21D is a circle, it may be other shapes such as a polygon and an irregular shape.

The projections 10a whose top portions are on one surface and the projections 10b whose top portions are on the other surface may have the same top surface shape as in the films illustrated in FIGS. 21A to 21D. Alternatively, the projections 10a whose top portions are on one surface and the projections 10b whose top portions are on the other surface may have different top surface shapes as illustrated in FIG. 22A.

Figure 22A:
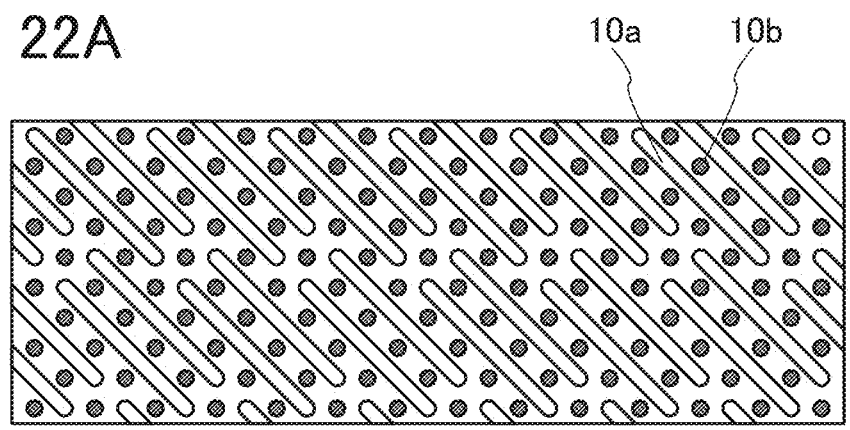
FIGS. 22A and 22B illustrate top surfaces of a film.

In a film illustrated in FIG. 22A, the projections 10a have linear top surface shapes and the projections 10b have circular top surface shapes. Note that the top surface shape of each projection 10a may be a straight-line shape, a curve shape, a wave shape, a zigzag shape, or an irregular shape, and the top surface shape of each projection 10b may be a polygon or an irregular shape.

Figure 22B:
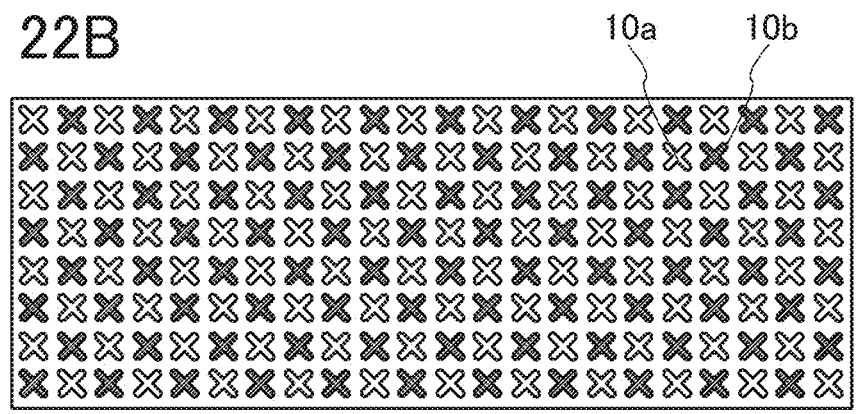

Alternatively, the top surface shapes of the projections 10a and 10b may be cross shapes as illustrated in FIG. 22B.

With the top surface shapes illustrated in FIGS. 20A to 22B, stress due to bending in at least two directions can be reduced.

FIGS. 23A to 23D illustrate examples of projections with a linear top surface shape. Note that the shapes illustrated in FIGS. 23A to 23D are referred to as accordion structures in some cases. Cross sections taken along dashed line e3 in FIGS. 23A to 23D can be any of the cross sections illustrated in FIGS. 17 to 19D.

Figure 23A:
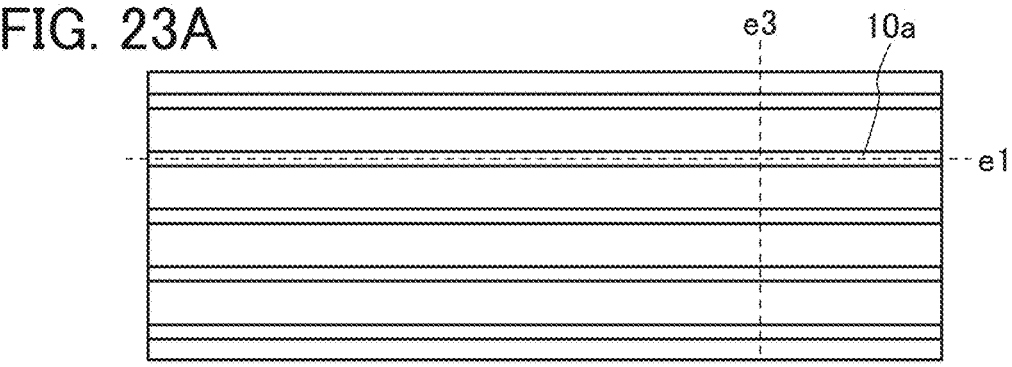
FIGS. 23A to 23D illustrate top surfaces of a film.
Figure 23B:
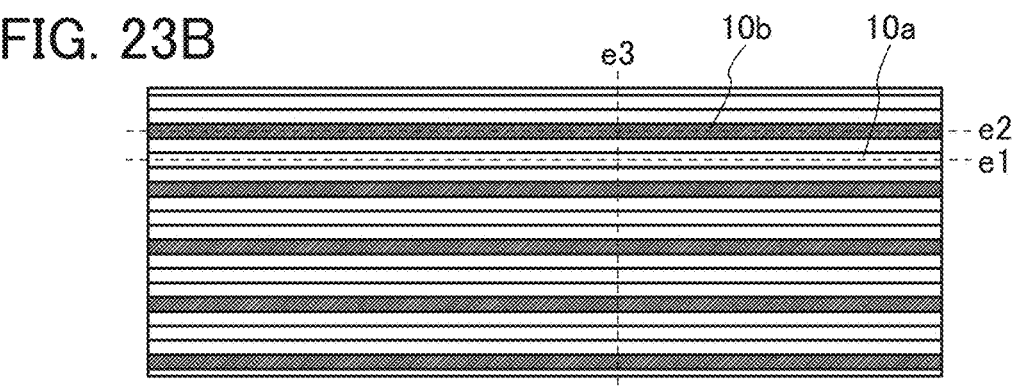

In a film illustrated in FIG. 23A, the linear projections 10a whose top portions are on one surface are arranged. Here, dashed line e1 indicating the direction of the linear projections 10a is parallel to the sides of the film. In a film illustrated in FIG. 23B, the linear projections 10a whose top portions are on one surface and the linear projections 10b whose top portions are on the other surface are arranged alternately. Here, dashed line e1 indicating the direction of the linear projections 10a and dashed line e2 indicating the direction of the linear projections 10b are parallel to the sides of the film.

Figure 23C:
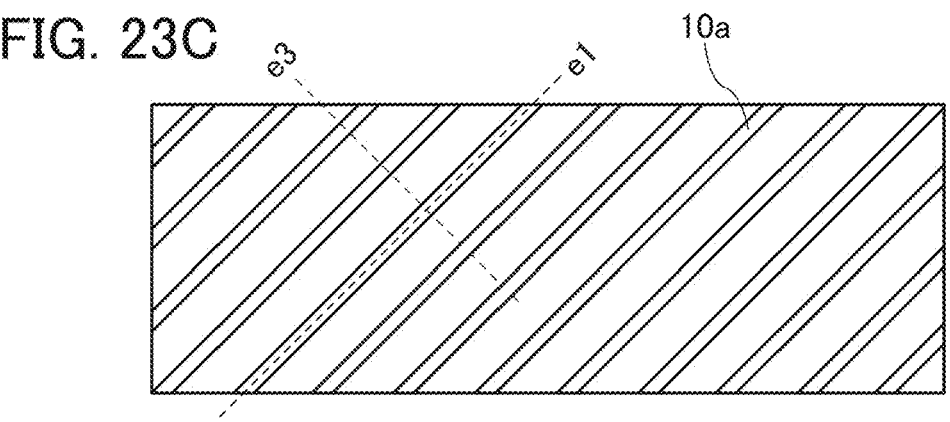
Figure 23D:
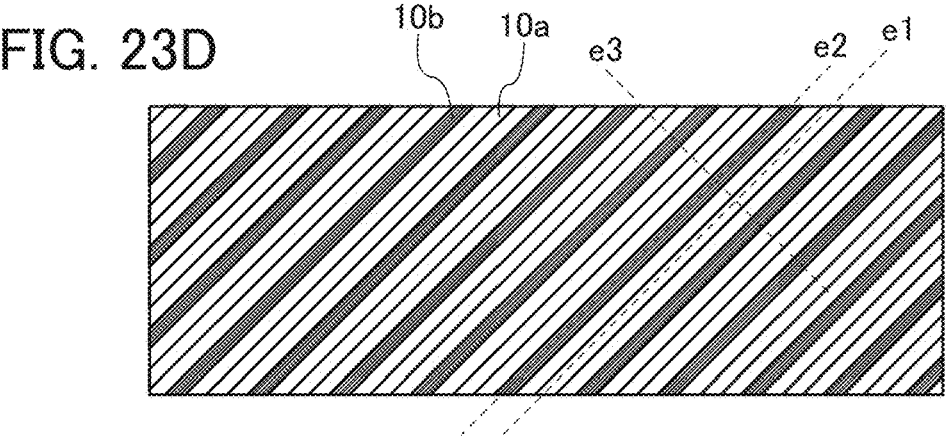

In a film illustrated in FIG. 23C, the linear projections 10a whose top portions are on one surface are arranged. Here, dashed line e1 indicating the direction of the linear projections 10a is slanted to the sides of the film. In a film illustrated in FIG. 23D, the linear projections 10a whose top portions are on one surface and the linear projections 10b whose top portions are on the other surface are arranged alternately. Here, dashed line e1 indicating the direction of the linear projections 10a and dashed line e2 indicating the direction of the linear projections 10b are slanted to the sides of the film.

The exterior body of one embodiment of the present invention includes a plurality of projections and the depth of the projection is preferably less than or equal to 1 mm, further preferably greater than or equal to 0.15 mm and less than 0.8 mm, and still further preferably greater than or equal to 0.3 mm and less than or equal to 0.7 mm.

The projections are preferably provided at a surface density, for example, greater than or equal to $0.02/mm^2$ and less than or equal to $2/mm^2$, further preferably greater than or equal to $0.05/mm^2$ and less than or equal to $1/mm^2$, and still further preferably greater than or equal to $0.1/mm^2$ and less than or equal to $0.5/mm^2$.

This embodiment can be implemented in appropriate combination with the other embodiments.

Embodiment 2

In this embodiment, electronic devices of one embodiment of the present invention will be described with reference to FIGS. 24A to 28D.

<Structural Example of Smartwatch>

Figure 24A:
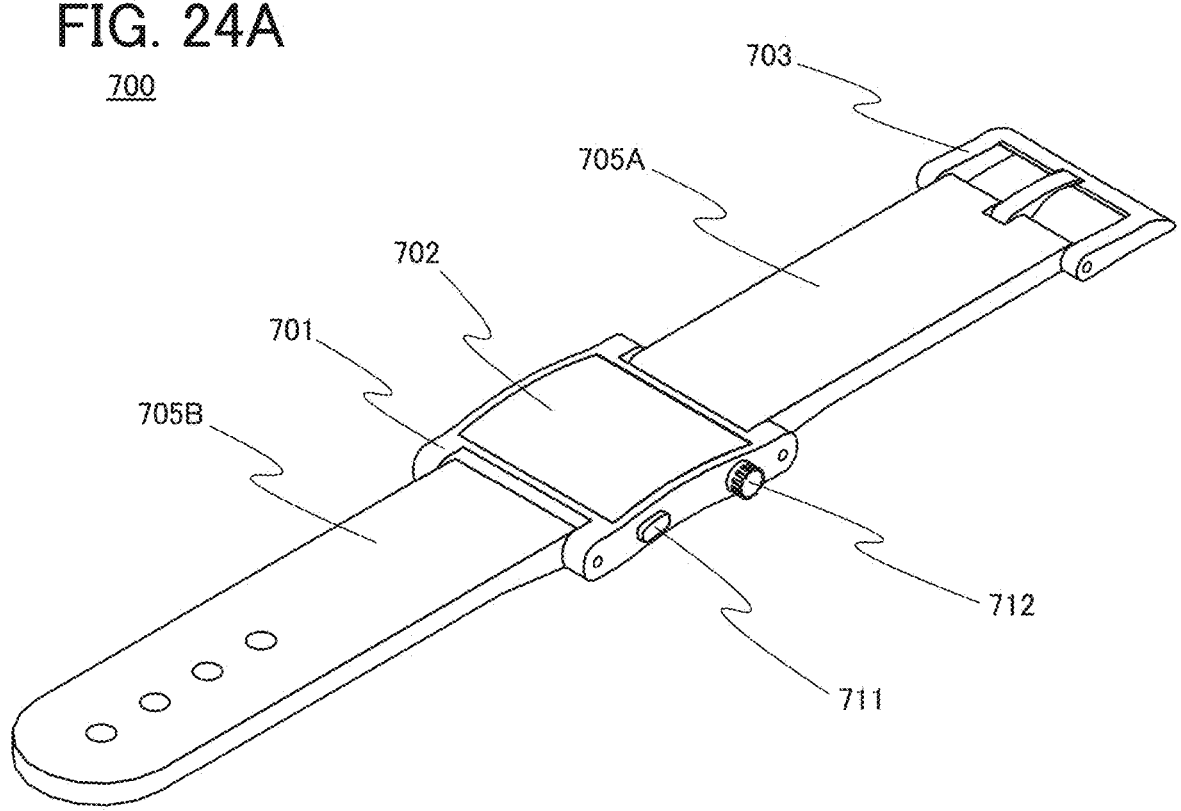
FIGS. 24A to 24C illustrate examples of an electronic device, a band, and a power storage device.

FIG. 24A is a perspective view of a watch-type portable information terminal (also called a smartwatch) 700. The portable information terminal 700 includes a housing 701, a display panel 702, a clasp 703, bands 705A and 705B, and operation buttons 711 and 712.

The display panel 702 mounted in the housing 701 doubling as a bezel includes a rectangular display region. The display region has a curved surface. The display panel 702 preferably has flexibility. Note that the display region may be non-rectangular.

The bands 705A and 705B are connected to the housing 701. The clasp 703 is connected to the band 705A. The band 705A and the housing 701 are connected such that a connection portion rotates via a pin. In a similar manner, the band 705B and the housing 701 are connected to each other and the band 705A and the clasp 703 are connected to each other.

Figure 24B:
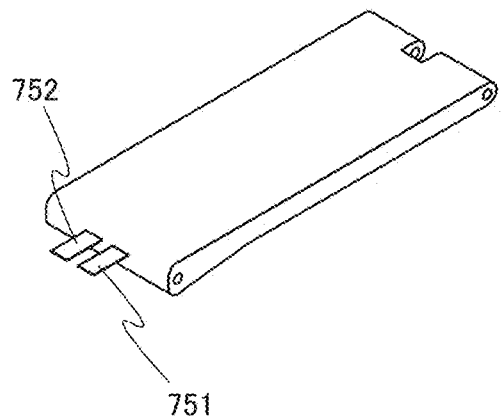
Figure 24C:
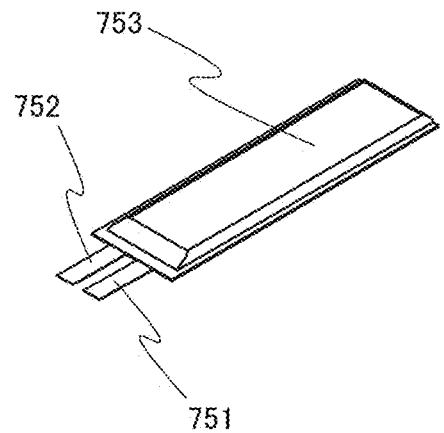

FIGS. 24B and 24C are perspective views of the band 705A and a power storage device 750, respectively. The band 705A includes the power storage device 750. As the power storage device 750, for example, the power storage device 500 described in Embodiment 1 can be used. The power storage device 750 is embedded in the band 705A, and the positive electrode lead 751 and the negative electrode lead 752 partly protrude from the band 705A (see FIG. 24B). The positive electrode lead 751 and the negative electrode lead 752 are electrically connected to the display panel 702. The surface of the power storage device 750 is covered with an exterior body 753 (see FIG. 24C). Note that the pin may function as an electrode. Specifically, through the pin that connects the band 705A and the housing 701, the positive electrode lead 751 and the display panel 702 may be electrically connected to each other and the negative electrode lead 752 and the display panel 702 may be electrically connected to each other. This simplifies the structure of the connection portion between the band 705A and the housing 701.

The power storage device 750 has flexibility.

The band 705A can be formed so as to incorporate the power storage device 750. For example, the power storage device 750 is set in a mold that the outside shape of the band 705A fits and a material of the band 705A is poured in the mold and cured, so that the band 705A illustrated in FIG. 24B can be formed.

In the case where a rubber material is used as the material for the band 705A, rubber is cured through heat treatment. For example, in the case where fluorine rubber is used as a rubber material, it is cured through heat treatment at 170° C. for 10 minutes. In the case where silicone rubber is used as a rubber material, it is cured through heat treatment at 150° C. for 10 minutes. The power storage device of one embodiment of the present invention has high heat resistance, which can inhibit breakage and degradation of charge and discharge characteristics due to heat treatment performed when the power storage device and the rubber material are integrally formed.

Examples of the material for the band 705A include fluorine rubber, silicone rubber, fluorosilicone rubber, and urethane rubber.

Note that energization of the power storage device 750, including aging, is preferably performed after the power storage device 750 is formed to be incorporated in the band 705A. In other words, heat treatment is preferably performed on the power storage device 500 described in Embodiment 1 before energization of the power storage device 500. The heat treatment is preferably performed at 150° C. to 190° C. for a period of time suitable for vulcanization of the rubber material, for example, at 170° C. for 10 minutes. This can inhibit degradation of the charge and discharge characteristics of the power storage device 500 due to heat treatment.

Note that the portable information terminal 700 in FIG. 24A can have a variety of functions such as a function of displaying a variety of data (e.g., a still image, a moving image, and a text image) on the display region, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display region.

The housing 701 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the portable information terminal 700 can be manufactured using a light-emitting element for the display panel 702.

Although FIGS. 24A to 24C illustrate the example where the power storage device 750 is incorporated in the band 705A, the power storage device 750 may be incorporated in the band 705B. The band 705B can be formed using a material similar to that for the band 705A.

The rubber material used for the band 705A preferably has high chemical resistance. Specifically, the rubber material preferably has low reactivity to an electrolytic solution contained in the power storage device 750.

When the band 705A is cracked or chipped despite of its high chemical resistance, a user of the portable information terminal 700 might touch the electrolytic solution that leaks from the power storage device 750. In the case where the portable information terminal 700 has a function of detecting leakage of the electrolytic solution, the user can stop the operation of the portable information terminal 700 and remove it as soon as the electrolytic solution leakage is detected. Consequently, the portable information terminal 700 can be highly safe.

<Structure Example of Power Storage Device>

Next, power storage devices having flexibility will be described with reference to FIGS. 25A to 29B. The power storage device of one embodiment of the present invention may have a bent shape. The power storage device of one embodiment of the present invention may be flexible and used while being bent and not bent.

Figure 25A:
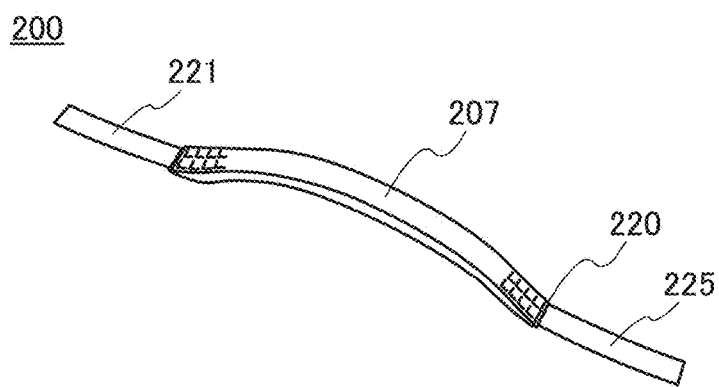
FIGS. 25A and 25B illustrate an example of a power storage device.
Figure 25B:
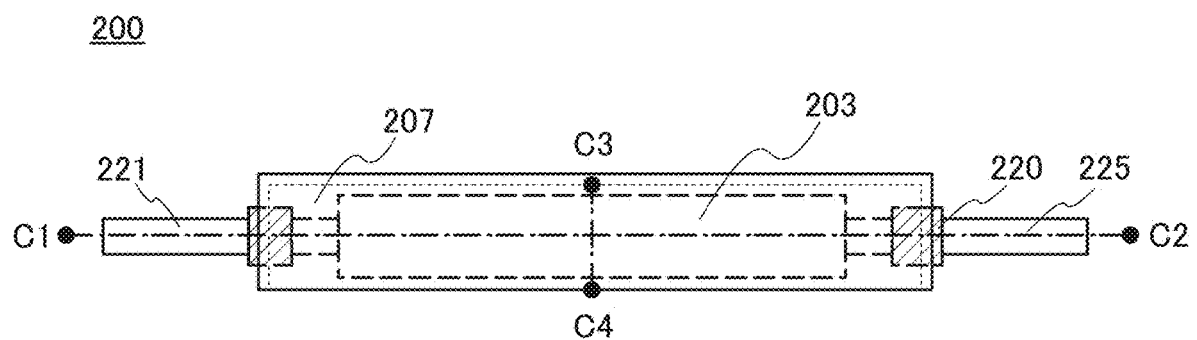

FIG. 25A is a perspective view of a secondary battery 200 and FIG. 25B is a top view of the secondary battery 200.

Figure 26A:
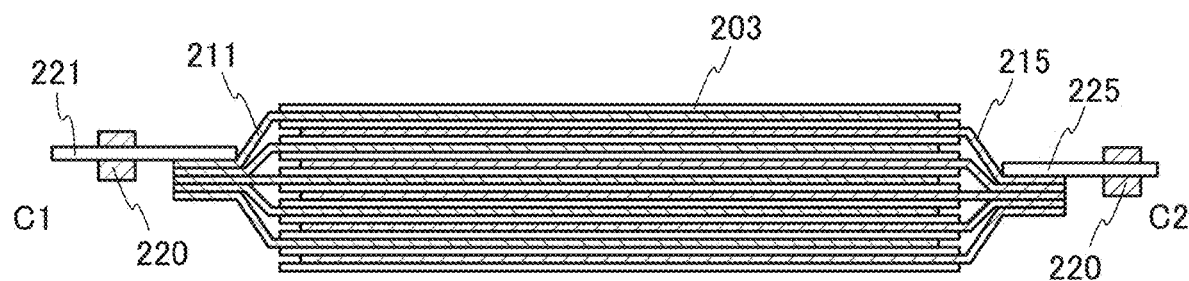
FIGS. 26A and 26B illustrate an example of a power storage device.
Figure 26B:
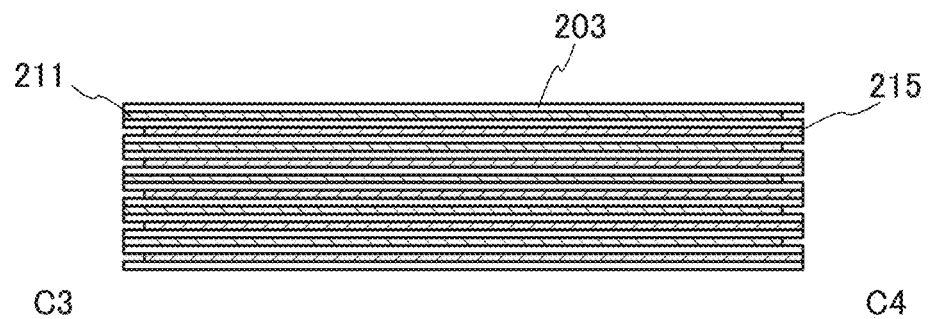

FIG. 26A is a cross-sectional view along dashed-dotted line C1-C2 in FIG. 25B, and FIG. 26B is a cross-sectional view along dashed-dotted line C3-C4 in FIG. 25B. Note that FIGS. 26A and 26B do not illustrate all components for clarity of the drawings.

The secondary battery 200 includes a positive electrode 211, a negative electrode 215, and a separator 203. The secondary battery 200 further includes a positive electrode lead 221, a negative electrode lead 225, and an exterior body 207.

The positive electrode 211 and the negative electrode 215 each include a current collector and an active material layer. The positive electrode 211 and the negative electrode 215 are provided such that the active material layers face each other with the separator 203 provided therebetween.

One of the electrodes (the positive electrode 211 and the negative electrode 215) of the secondary battery 200 that is positioned on the outer diameter side of a bent portion is preferably longer than the other electrode that is positioned on the inner diameter side of the bent portion, in the axis direction in which the electrode is bent. With such a structure, the end portions of the positive electrode 211 can be aligned with those of the negative electrode 215 when the secondary battery 200 is bent with a certain curvature. That is, the entire region of the positive electrode active material layer included in the positive electrode 211 can face the negative electrode active material layer included in the negative electrode 215, so that the positive electrode active material contained in the positive electrode 211 can efficiently contribute to a battery reaction. This increases the capacity of the secondary battery 200 per volume. Such a structure is particularly effective in the case where the secondary battery 200 is used with the curvature fixed.

The positive electrode lead 221 is electrically connected to a plurality of positive electrodes 211. The negative electrode lead 225 is electrically connected to a plurality of negative electrodes 215. The positive electrode lead 221 and the negative electrode lead 225 each include a sealing layer 220.

The exterior body 207 covers a plurality of positive electrodes 211, a plurality of negative electrodes 215, and a plurality of separators 203. The secondary battery 200 includes an electrolytic solution (not shown) in a region covered with the exterior body 207. Three sides of the exterior body 207 are bonded, whereby the secondary battery 200 is sealed.

In FIGS. 26A and 26B, each of the separators 203 having a strip-like shape is provided between each pair of the positive electrode 211 and the negative electrode 215; however, one embodiment of the present invention is not limited to this structure. One separator sheet may be folded in zigzag (or into an accordion shape) or wound so that the separator is positioned between the positive electrode and the negative electrode.

Figure 27:
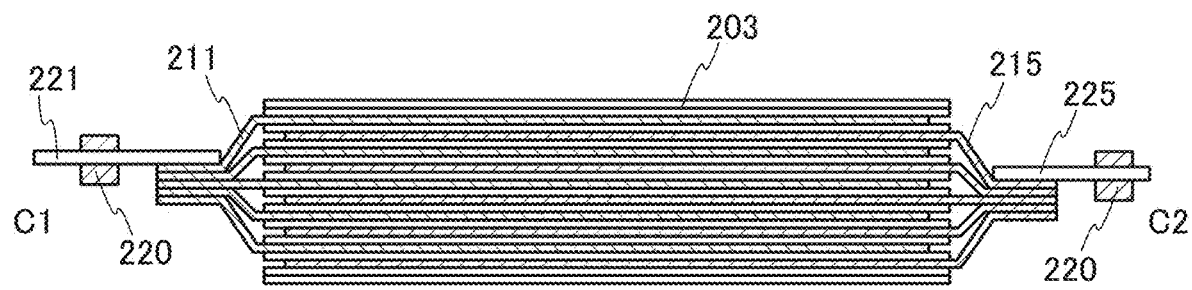
FIG. 27 illustrates an example of a power storage device.

An example of a method for manufacturing the secondary battery 200 is illustrated in FIGS. 28A to 28D. FIG. 27 is a cross-sectional view along dashed-dotted line C1-C2 in FIG. 25B of the case of employing this manufacturing method.

First, the negative electrode 215 is positioned over the separator 203 (FIG. 28A) such that the negative electrode active material layer of the negative electrode 215 overlaps with the separator 203.

Then, the separator 203 is folded to overlap with the negative electrode 215. Next, the positive electrode 211 overlaps with the separator 203 (FIG. 28B) such that the positive electrode active material layer of the positive electrode 211 overlaps with the separator 203 and the negative electrode active material layer. Note that in the case of using an electrode in which one surface of a current collector is provided with an active material layer, the positive electrode active material layer of the positive electrode 211 and the negative electrode active material layer of the negative electrode 215 are positioned to face each other with the separator 203 provided therebetween.

Figure 28A:
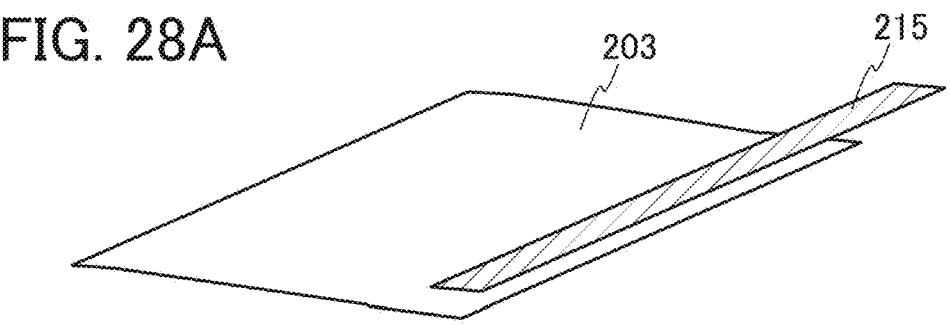
FIGS. 28A to 28D illustrate an example of a method for manufacturing a power storage device.
Figure 28B:
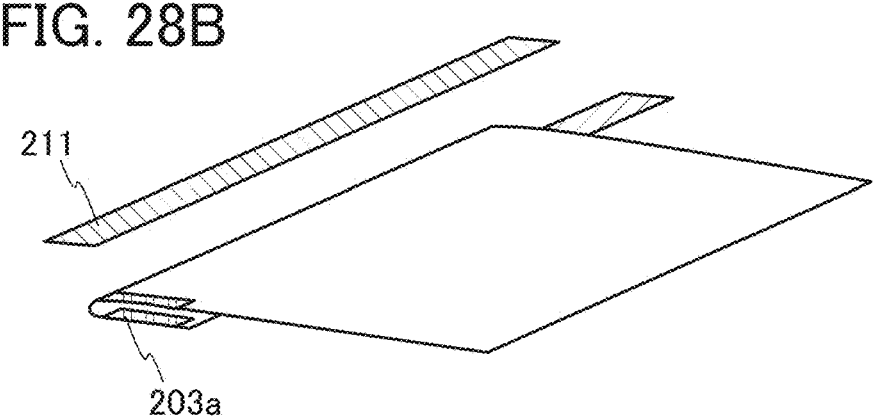

In the case where the separator 203 is formed using a material that can be thermally welded, such as polypropylene, a region where the separator 203 overlaps with itself is thermally welded and then another electrode overlaps with the separator 203, whereby the slippage of the electrode in the fabrication process can be suppressed. Specifically, a region which does not overlap with the negative electrode 215 or the positive electrode 211 and in which the separator 203 overlaps with itself, e.g., a region 203a in FIG. 28B, is preferably thermally welded.

Figure 28C:
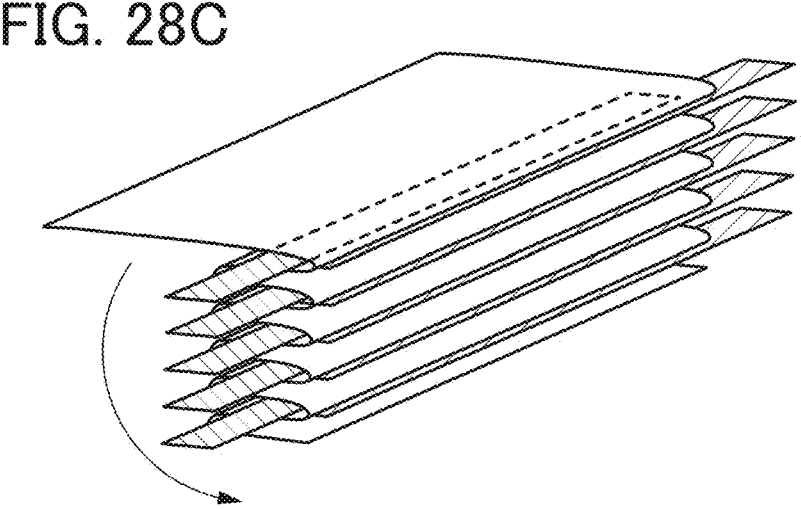

By repeating the above steps, the positive electrode 211 and the negative electrode 215 can overlap with each other with the separator 203 provided therebetween as illustrated in FIG. 28C.

Note that a plurality of positive electrodes 211 and a plurality of negative electrodes 215 may be placed to be alternately sandwiched by the separator 203 that is repeatedly folded in advance.

Then, as illustrated in FIG. 28C, a plurality of positive electrodes 211 and a plurality of negative electrodes 215 are covered with the separator 203.

Figure 28D:
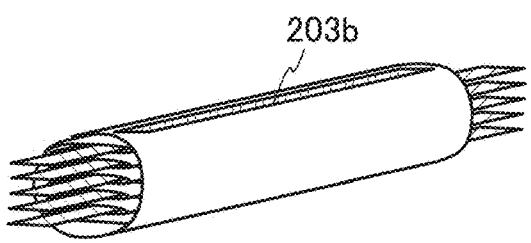

Furthermore, the region where the separator 203 overlaps with itself, e.g., a region 203b in FIG. 28D, is thermally welded as illustrated in FIG. 28D, whereby a plurality of positive electrodes 211 and a plurality of negative electrodes 215 are covered with and tied with the separator 203.

Note that a plurality of positive electrodes 211, a plurality of negative electrodes 215, and the separator 203 may be tied with a binding material.

Since the positive electrodes 211 and the negative electrodes 215 are stacked in the above process, one separator 203 has a region sandwiched between a plurality of positive electrodes 211 and a plurality of negative electrodes 215 and a region covering a plurality of positive electrodes 211 and a plurality of negative electrodes 215.

In other words, the separator 203 included in the secondary battery 200 in FIG. 27 and FIG. 28D is a single separator which is partly folded. In the folded regions of the separator 203, a plurality of positive electrodes 211 and a plurality of negative electrodes 215 are provided.

This embodiment can be implemented in appropriate combination with the other embodiments.

Embodiment 3

In this embodiment, a positive electrode and a negative electrode of a power storage device of one embodiment of the present invention will be described.

The positive electrode of one embodiment of the present invention preferably includes a positive electrode active material. The positive electrode of one embodiment of the present invention may include a binder. The positive electrode of one embodiment of the present invention may include a conductive additive.

The negative electrode of one embodiment of the present invention preferably includes a negative electrode active material. The negative electrode of one embodiment of the present invention may include a binder. The negative electrode of one embodiment of the present invention may include a conductive additive.

<Negative Electrode Active Material>

As a negative electrode active material, for example, a carbon-based material or an alloy-based material can be used.

As the carbon-based material, graphite, graphitizing carbon (soft carbon), non-graphitizing carbon (hard carbon), a carbon nanotube, graphene, carbon black, and the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a significantly high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. SiO can alternatively be expressed as SiOx. Here, x preferably has an approximate value of 1. For example, x is preferably 0.2 or more and 1.5 or less, more preferably 0.3 or more and 1.2 or less.

Furthermore, the negative electrode active material of one embodiment of the present invention may include silicon, lithium, and oxygen. For example, the negative electrode active material may include silicon and lithium silicon oxide positioned outside the silicon.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $FeP_2$, and $CoP_3$, and fluorides such as $FeF_3$ and $BiF_3$.

The reaction potential of the negative electrode active material is preferably as low as possible, in which case the voltage of the power storage device can be high. On the other hand, when the potential is low, power of reducing an electrolytic solution is increased, so that an organic solvent or the like in an electrolytic solution might be subjected to reductive decomposition. The range of potentials in which the electrolysis of an electrolytic solution does not occur is referred to as a potential window. The electrode potential of the negative electrode needs to be within a potential window of an electrolytic solution; however, the potentials of many active materials used for negative electrodes of lithium-ion secondary batteries and lithium-ion capacitors are out of the potential windows of almost all electrolytic solutions. Specifically, materials with low reaction potentials such as graphite and silicon can increase the voltage of power storage devices but are likely to cause the reductive decomposition of electrolytic solutions.

<Positive Electrode Active Material>

Examples of a positive electrode active material include a composite oxide with an olivine crystal structure, a composite oxide with a layered rock-salt crystal structure, and a composite oxide with a spinel crystal structure.

As the positive electrode active material, a compound such as $LiFeO_2$, $LiCoO_2$, $LiNiO_2$, $LiMn_2O_4$, $V_2O_5$, $Cr_2O_5$, or $MnO_2$ can be used. $LiCoO_2$ is particularly preferable because it has a high capacity, higher stability in the air than $LiNiO_2$, and higher thermal stability than $LiNiO_2$, for example. It is preferable to add a small amount of lithium nickel oxide ($LiNiO_2$ or $LiNi_{1-x}M_xO_2$ (M=Co, Al, and the like)) to a lithium-containing material with a spinel crystal structure which contains manganese such as $LiMn_2O_4$ because the characteristics of a secondary battery using such a material can be improved.

The average diameter of primary particles of the positive electrode active material is preferably, for example, greater than or equal to 5 nm and less than or equal to 50 μm, more preferably greater than or equal to 100 nm and less than or equal to 500 nm. Furthermore, the specific surface area is preferably greater than or equal to 5 m$^2$/g and less than or equal to 15 m$^2$/g. Furthermore, the average diameter of secondary particles is preferably greater than or equal to 5 μm and less than or equal to 50 μm. Note that the average particle diameter can be measured with a particle size distribution analyzer or the like using a laser diffraction and scattering method or by observation with a scanning electron microscope (SEM) or a TEM. The specific surface area can be measured by a gas adsorption method.

Another example of the positive electrode active material is a lithium-manganese composite oxide that is represented by a composition formula $Li_aMn_bM_cO_d$. Here, the element M is preferably a metal element other than lithium and manganese, or silicon or phosphorus, more preferably nickel. Furthermore, in the case where the whole particle of a lithium-manganese composite oxide is measured, it is preferable to satisfy the following at the time of discharging: $0<a/(b+c)<2$; $c>0$; and $0.26 \leq (b+c)/d<0.5$. To achieve a high capacity, the lithium-manganese composite oxide preferably includes a region where the surface portion and the middle portion are different in the crystal structure, the crystal orientation, or the oxygen content. To obtain such a lithium-manganese composite oxide, it is preferable that $1.6 \leq a \leq 1.848$, $0.19 \leq c/b \leq 0.935$, and $2.5 \leq d \leq 3$. Furthermore, it is particularly preferable to use a lithium-manganese composite oxide represented by a composition formula $Li_{1.68}Mn_{0.8062}Ni_{0.318}O_3$. In this specification and the like, a lithium-manganese composite oxide represented by a composition formula $Li_{1.68}Mn_{0.8062}Ni_{0.318}O_3$ refers to that formed at a ratio (molar ratio) of the amounts of raw materials of $Li_2CO_3$:$MnCO_3$:$NiO$=0.84:0.8062:0.318. Although this lithium-manganese composite oxide is represented by a composition formula $Li_{1.68}Mn_{0.8062}Ni_{0.318}O_3$, the composition might deviate from this.

Note that the ratios of metal, silicon, phosphorus, and other elements to the total composition in the whole particle of a lithium-manganese composite oxide can be measured with, for example, an inductively coupled plasma mass spectrometer (ICP-MS). The ratio of oxygen to the total composition in the whole particle of a lithium-manganese composite oxide can be measured by, for example, energy dispersive X-ray spectroscopy (EDX). Alternatively, the ratio of oxygen to the total composition in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

Figure 29A:
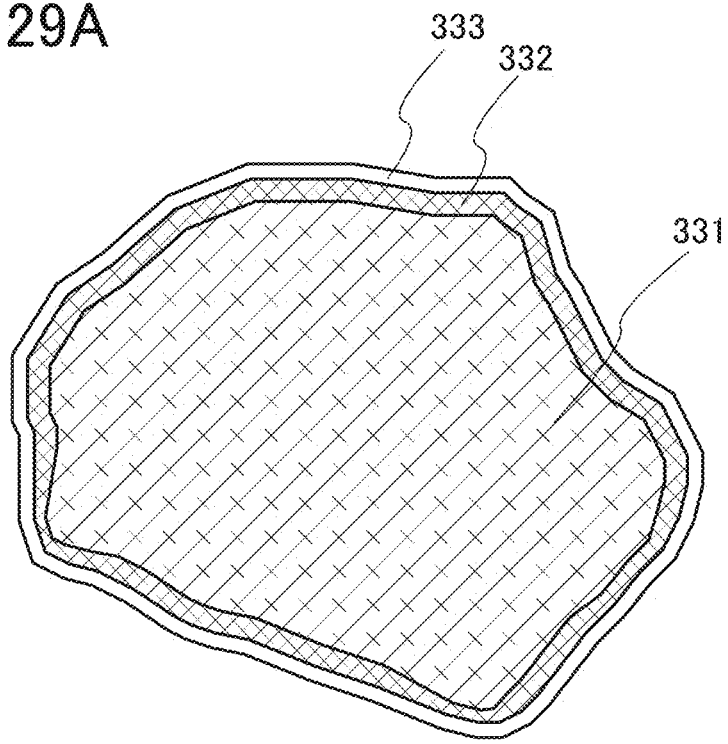
FIGS. 29A and 29B illustrate cross sections of a particle.
Figure 29B:
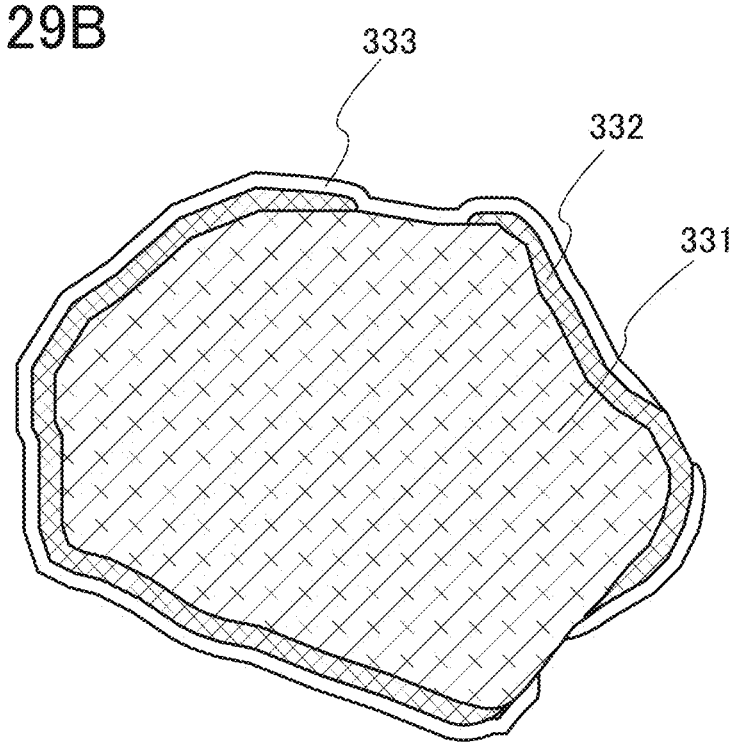

FIGS. 29A and 29B each illustrate an example of a cross-sectional view of a particle of a lithium-manganese composite oxide having regions with different crystal structures, crystal orientations, or oxygen contents.

As illustrated in FIG. 29A, the lithium-manganese composite oxide having regions with different crystal structures, crystal orientations, or oxygen contents preferably includes a region 331, a region 332, and a region 333. The region 332 is in contact with at least part of the outer side of the region 331. Here, the term "outer side" refers to the side closer to a surface of a particle. The region 333 preferably includes a region corresponding to a surface of a particle containing the lithium-manganese composite oxide.

As shown in FIG. 29B, the region 331 may include a region not covered with the region 332. The region 332 may include a region not covered with the region 333. Furthermore, the region 331 may include, for example, a region in contact with the region 333. Furthermore, the region 331 may include a region covered with neither the region 332 nor the region 333.

The composition of the region 332 is preferably different from that of the region 331.

For example, described is the case where the composition of the region 331 and that of the region 332 are separately measured and the region 331 and the region 332 each contain lithium, manganese, the element M, and oxygen; the atomic ratio of lithium to manganese, the element M, and oxygen in the region 331 is represented by a1:b1:c1:d1; and the atomic ratio of lithium to manganese, the element M, and oxygen in the region 332 is represented by a2:b2:c2:d2. Note that the composition of each of the region 331 and the region 332 can be measured by, for example, energy dispersive X-ray spectroscopy (EDX) using a transmission electron microscope (TEM). In measurement by EDX, the proportion of lithium is sometimes difficult to measure. Thus, a difference between the region 331 and the region 332 in composition except for lithium will be described below. Here, d1/(b1+c1) is preferably greater than or equal to 2.2, more preferably greater than or equal to 2.3, and still more preferably greater than or equal to 2.35 and less than or equal to 3. Furthermore, d2/(b2+c2) is preferably less than 2.2, more preferably less than 2.1, and still more preferably greater than or equal to 1.1 and less than or equal to 1.9. In this case, the composition of the whole particle of lithium-manganese composite oxide including the region 331 and the region 332 also preferably satisfies the above inequality: $0.26 \leq (b+c)/d<0.5$.

The valence of manganese in the region 332 may be different from that of manganese in the region 331. The valence of the element M in the region 332 may be different from that of the element M in the region 331.

Specifically, the region 331 is preferably a lithium-manganese composite oxide having a layered rock-salt crystal structure. The region 332 is preferably a lithium-manganese composite oxide having a spinel crystal structure.

Here, in the case where the compositions of the regions or valences of elements in the regions are spatially distributed, for example, the compositions or valences in a plurality of portions are obtained, the average values thereof are calculated, and the average values are regarded as the compositions or valences of the regions.

A transition layer may be provided between the region 332 and the region 331. The transition layer is a region where the composition, crystal structure, or crystal lattice constant changes continuously or gradually. A mixed layer may be provided between the region 332 and the region 331. The mixed layer is a layer in which, for example, two or more crystals having different crystal orientations are mixed, two or more crystals having different crystal structures are mixed, or two or more crystals having different compositions are mixed.

The region 333 may contain carbon or a metal compound. Examples of the metal include cobalt, aluminum, nickel, iron, manganese, titanium, zinc, and lithium. Examples of the metal compound include an oxide and a fluoride of the metal.

It is particularly preferable that the region 333 contain carbon. Since carbon has high conductivity, the particle covered with carbon in the electrode of the power storage device can reduce, for example, the resistance of the electrode. The region 333 preferably includes a graphene compound. The use of the graphene compound in the region 333 allows the lithium-manganese composite oxide particle to be efficiently coated. The graphene compound will be described later. More specifically, the region 333 may include, for example, graphene or graphene oxide. Furthermore, graphene formed by reducing graphene oxide is preferably used as graphene. Graphene has excellent electrical characteristics of high conductivity and excellent physical properties of high flexibility and high mechanical strength. When graphene oxide is used for the region 333 and is reduced, the region 332 in contact with the region 333 is oxidized in some cases.

When the region 333 includes a graphene compound, a secondary battery using the lithium-manganese composite oxide as a positive electrode material can have improved cycle performance.

The thickness of a layer containing carbon is preferably greater than or equal to 0.4 nm and less than or equal to 40 nm.

Furthermore, the average diameter of primary particles of the lithium-manganese composite oxide is preferably greater than or equal to 5 nm and less than or equal to 50 μm, more preferably greater than or equal to 100 nm and less than or equal to 500 nm, for example. Furthermore, the specific surface area is preferably greater than or equal to 5 m$^2$/g and less than or equal to 15 m$^2$/g. Furthermore, the average diameter of secondary particles is preferably greater than or equal to 5 μm and less than or equal to 50 μm.

Alternatively, a composite material (LiMPO$_4$ (general formula) (M is one or more of Fe(II), Mn(II), Co(II), and Ni(II))) can be used as the positive electrode active material. Typical examples of the general formula LiMPO$_4$ are lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

LiFePO$_4$ is particularly preferable because it properly has properties necessary for the positive electrode active material, such as safety, stability, a high capacity density, and the existence of lithium ions which can be extracted in initial oxidation (charge).

Alternatively, a composite material such as Li$_{(2-j)}$MSiO$_4$ (general formula) (M is one or more of Fe(II), Mn(II), Co(II), and Ni(II); 0≤j≤2) may be used as the positive electrode active material. Typical examples of the general formula Li$_{(2-j)}$MSiO$_4$ are lithium compounds such as Li$_{(2-j)}$FeSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Co$_l$SiO$_4$, Li$_{(2-j)}$Ni$_k$Mn$_l$SiO$_4$ (k+s≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a nasicon compound expressed by A$_x$M$_2$(XO$_4$)$_3$ (general formula) (A=Li, Na, or Mg, M=Fe, Mn, Ti, V, or Nb, X=S, P, Mo, W, As, or Si) can be used for the positive electrode active material. Examples of the nasicon compound are Fe$_2$(MnO$_4$)$_3$, Fe$_2$(SO$_4$)$_3$, and Li$_3$Fe$_2$(PO$_4$)$_3$. Further alternatively, a compound expressed by Li$_2$MPO$_4$F, Li$_2$MP$_2$O$_7$, or Li$_5$MO$_4$ (general formula) (M=Fe or Mn), a perovskite fluoride such as NaFeF$_3$ and FeF$_3$, a metal chalcogenide (a sulfide, a selenide, or a telluride) such as TiS$_2$ and MoS$_2$, an oxide with an inverse spinel structure such as LiMVO$_4$, a vanadium oxide (V$_2$O$_5$, V$_6$O$_{13}$, LiV$_3$O$_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material. For example, the positive electrode active material may be a layered oxide containing sodium, such as NaFeO$_2$ and Na$_{2/3}$[Fe$_{1/2}$Mn$_{1/2}$]O$_2$.

Further alternatively, any of the aforementioned materials may be combined to be used as the positive electrode active material. For example, a solid solution of two or more of the above materials can be used as the positive electrode active material. For example, a solid solution of LiCo$_{1/3}$Mn$_{1/3}$Ni$_{1/3}$O$_2$ and Li$_2$MnO$_3$ can be used as the positive electrode active material.

Note that although not illustrated, a conductive material such as a carbon layer may be provided on the surface of the positive electrode active material. Providing a conductive material such as a carbon layer leads to an increase in the conductivity of an electrode. For example, the positive electrode active material can be coated with a carbon layer by mixing a carbohydrate such as glucose at the time of baking the positive electrode active material.

The average diameter of primary particles of the positive electrode active material is preferably greater than or equal to 50 nm and less than or equal to 100 μm.

<Binder>

As the binder, a rubber material such as styrene-butadiene rubber (SBR), styrene-isoprene-styrene rubber, acrylonitrile-butadiene rubber, butadiene rubber, or ethylene-propylene-diene copolymer can be used. Alternatively, fluororubber can be used as the binder.

For the binder, for example, water-soluble polymers are preferably used. As the water-soluble polymers, a polysaccharide and the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVdF), polyacrylonitrile (PAN), ethylene-propylene-diene polymer, polyvinyl acetate, or nitrocellulose is preferably used.

Two or more of the above materials may be used in combination for the binder.

The content of the binder in the active material layer is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the active material layer is preferably greater than or equal to 1 wt % and less than or equal to 10 wt %, more preferably greater than or equal to 1 wt % and less than or equal to 5 wt %.

<Conductive Additive>

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

As the conductive additive, a graphene compound may be used.

A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. For this reason, it is preferable to use a graphene compound as the conductive additive because the area where the active material and the conductive additive are in contact with each other can be increased. In addition, it is preferable to use a graphene compound as the conductive additive because the electrical resistance can be reduced in some cases. Here, it is particularly preferable to use, for example, graphene, multilayer graphene, or RGO as a graphene compound.

In the case where an active material with a small particle diameter (e.g., 1 μm or less) is used, the specific surface area of the active material is large and thus more conductive paths for the active material particles are needed. In such a case, a graphene compound that can efficiently form a conductive path even in a small amount is particularly preferably used.

A cross-sectional structure example of the active material layer including a graphene compound as a conductive additive is described below.

Figure 30A:
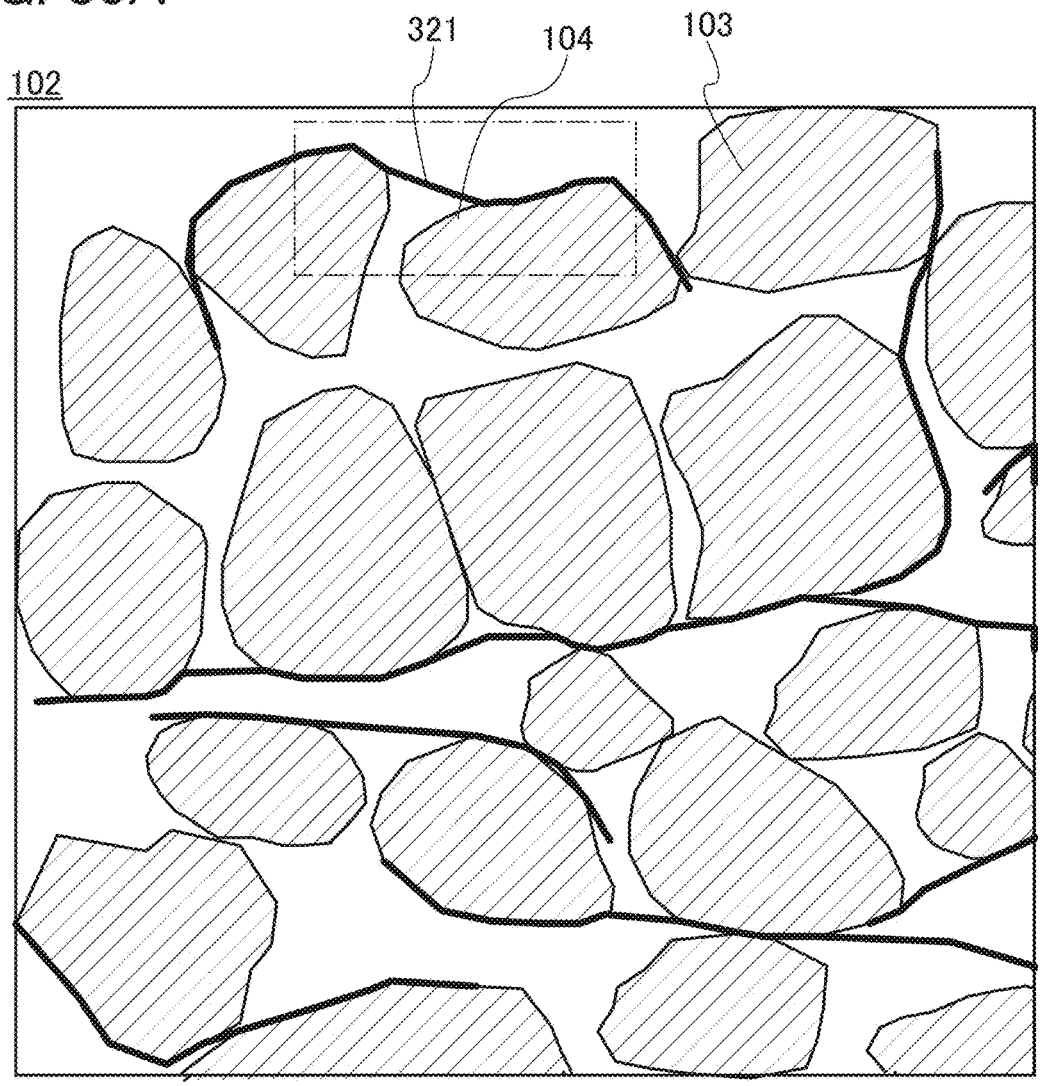
FIGS. 30A and 30B illustrate cross sections of an electrode.

FIG. 30A shows a longitudinal sectional view of the active material layer 102. The active material layer 102 includes active material particles 103, a graphene compound 321 serving as a conductive additive, and a binder 104. Here, graphene or multilayer graphene may be used as the graphene compound 321, for example. The graphene compound 321 preferably has a sheet-like shape. The graphene compound 321 may have a sheet-like shape formed of a plurality of sheets of multilayer graphene and/or a plurality of sheets of graphene that partly overlap with each other.

The longitudinal section of the active material layer 102 in FIG. 30A shows substantially uniform dispersion of the sheet-like graphene compounds 321 in the active material layer 102. The graphene compounds 321 are schematically shown by thick lines in FIG. 30A but are actually thin films each having a thickness corresponding to the thickness of a single layer or a multi-layer of carbon molecules. The plurality of graphene compounds 321 are formed in such a way as to wrap, coat, or adhere to the surfaces of the plurality of active material particles 103, so that the graphene compounds 321 make surface contact with the active material particles 103.

Here, the plurality of graphene compounds are bonded to each other to form a net-like graphene compound sheet (hereinafter referred to as a graphene compound net or a graphene net). The graphene net covering the active material can function as a binder for bonding active materials. The amount of a binder can thus be reduced, or the binder does not have to be used. This can increase the proportion of the active material in the electrode volume or weight. That is to say, the capacity of the power storage device can be increased.

Here, it is preferable to perform reduction after a layer to be the active material layer 102 is formed in such a manner that graphene oxide is used as the graphene compound 321 and mixed with an active material. When graphene oxide with extremely high dispersibility in a polar solvent is used for the formation of the graphene compounds 321, the graphene compounds 321 can be substantially uniformly dispersed in the active material layer 102. The solvent is removed by volatilization from a dispersion medium in which graphene oxide is uniformly dispersed, and the graphene oxide is reduced; hence, the graphene compounds 321 remaining in the active material layer 102 partly overlap with each other and are dispersed such that surface contact is made, thereby forming a three-dimensional conduction path. Note that graphene oxide can be reduced either by heat treatment or with the use of a reducing agent, for example.

Unlike a conductive additive in the form of particles, such as acetylene black, which makes point contact with an active material, the graphene compound 321 is capable of making low-resistance surface contact; accordingly, the electrical conduction between the active material particles 103 and the graphene compounds 321 can be improved with a smaller amount of the graphene compound 321 than that of a normal conductive additive. This increases the proportion of the active material particles 103 in the active material layer 102, resulting in increased discharge capacity of the power storage device.

Figure 30B:
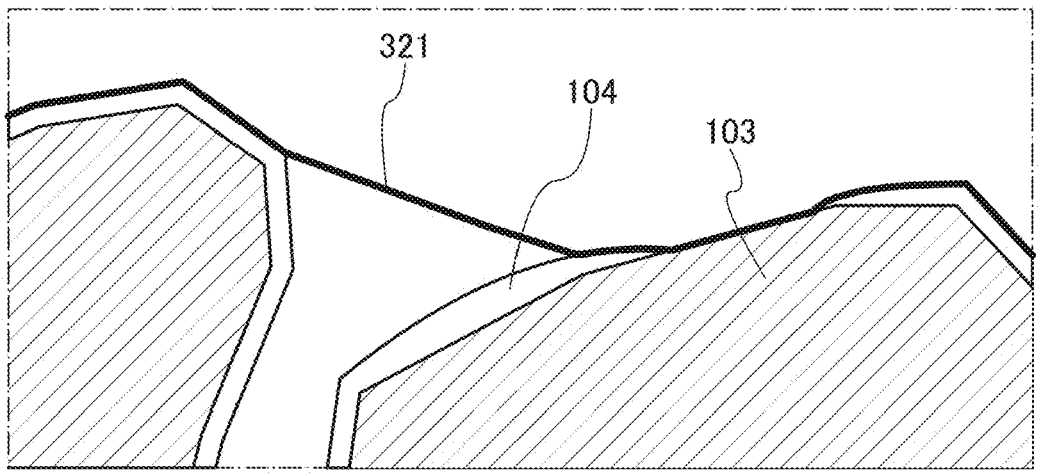

FIG. 30B is an enlarged view of a region surrounded by a dashed dotted line in FIG. 30A. The binder 104 may exist in the shape of a layer on a surface of the active material particle 103. The graphene compound 321 preferably includes a region in contact with a surface of the binder 104. The binder 104 is positioned, for example, between the active material particle 103 and the graphene compound 321. Preferably, the binder 104 is provided on the active material particle 103 and the graphene compound 321 is provided on the binder 104.

<Current Collector>

The current collector can be formed using a material that has high conductivity, such as a metal like stainless steel, gold, platinum, aluminum, or titanium, or an alloy thereof. In the case where the current collector is used in the positive electrode, it is preferred that it not dissolve at the potential of the positive electrode. In the case where the current collector is used in the negative electrode, it is preferred that it not be alloyed with carrier ions such as lithium ions. Alternatively, the current collector can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of 5 µm to 30 µm.

This embodiment can be implemented in appropriate combination with the other embodiments.

Embodiment 4

In this embodiment, application examples of the power storage device of one embodiment of the present invention will be described with reference to FIGS. 31A to 35B.

The power storage device of one embodiment of the present invention can be used, for example, for an electronic device and a lighting device. The power storage device of one embodiment of the present invention has excellent charge and discharge characteristics. Therefore, the electronic device and the lighting device can be used for a long time by a single charge. Moreover, since a decrease in capacity with an increasing number of charge and discharge cycles is inhibited, the time between charges is unlikely to be reduced by repetitive charge. Furthermore, the power storage device of one embodiment of the present invention exhibits excellent charge and discharge characteristics and high long-term reliability and safety at a wide range of temperature including high temperatures, so that the safety and reliability of the electronic device and the lighting device can be improved.

Examples of the electronic device include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, and a large game machine such as a pinball machine.

Since the power storage device of one embodiment of the present invention has flexibility, the power storage device or an electronic device or a lighting device using the power storage device can be incorporated along a curved inside/outside wall surface of a house or a building or a curved interior/exterior surface of a motor vehicle.

Figure 31A:
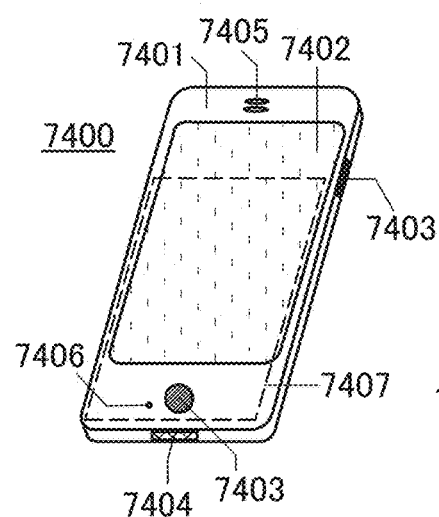
FIGS. 31A to 31F illustrate examples of an electronic device.

FIG. 31A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a power storage device 7407.

Figure 31B:
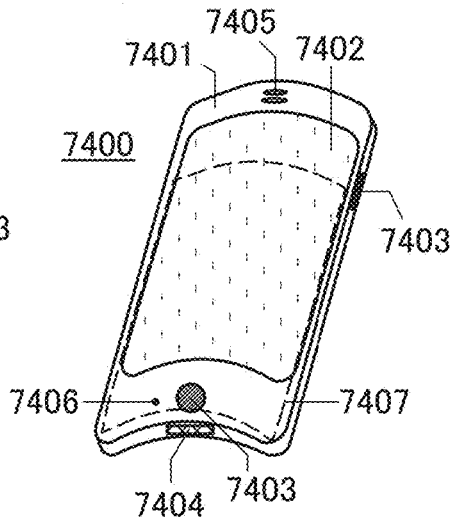
Figure 31C:
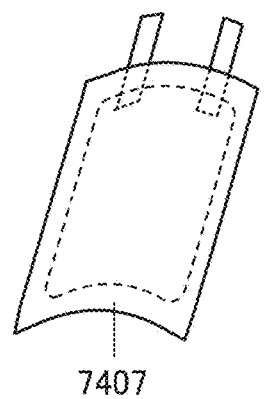
Figure 31D:
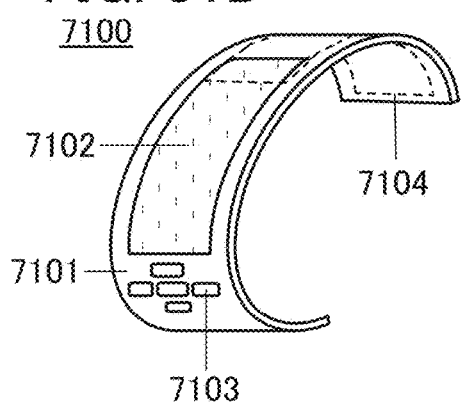
Figure 31E:
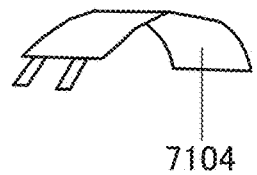

FIG. 31B illustrates the mobile phone 7400 that is bent. When the whole mobile phone 7400 is bent by external force, the power storage device 7407 included in the mobile phone 7400 is also bent. The power storage device 7407 is a thin storage battery. The power storage device 7407 is fixed in a state of being bent. FIG. 31C illustrates the power storage device 7407 that is bent FIG. 31D illustrates an example of a bangle display device. A portable display device 7100 includes a housing 7101, a display portion 7102, an operation button 7103, and a power storage device 7104. FIG. 31E illustrates the power storage device 7104 that is bent.

Figure 31F:
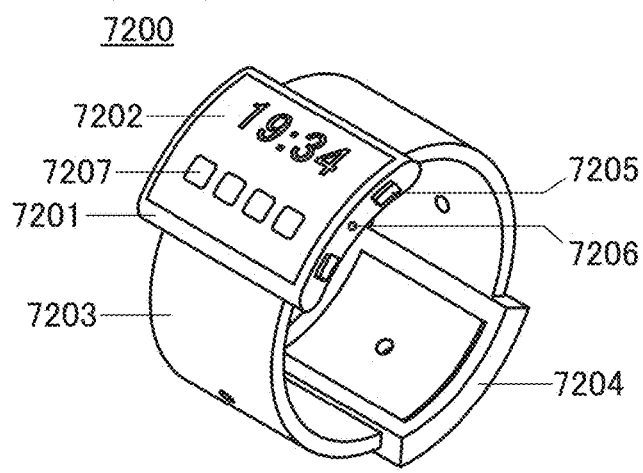

FIG. 31F illustrates an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing text, music reproduction, Internet communication, and a computer game.

The display surface of the display portion 7202 is bent, and images can be displayed on the bent display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power ON/OFF, ON/OFF of wireless communication, setting and cancellation of silent mode, and setting and cancellation of power saving mode can be performed. For example, the functions of the operation button 7205 can be set freely by setting the operation system incorporated in the portable information terminal 7200.

Furthermore, the portable information terminal 7200 can employ near field communication, which is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input/output terminal 7206, and data can be directly transmitted to and received from another information terminal via a connector. In addition, charging via the input/output terminal 7206 is possible. Note that the charging operation may be performed by wireless power feeding without using the input/output terminal 7206.

The display portion 7202 of the portable information terminal 7200 is provided with the power storage device of one embodiment of the present invention. For example, the power storage device 7104 illustrated in FIG. 31E that is in the state of being bent can be provided in the housing 7201. Alternatively, the power storage device 7104 illustrated in FIG. 31E can be provided in the band 7203 such that it can be bent.

Figure 32A:
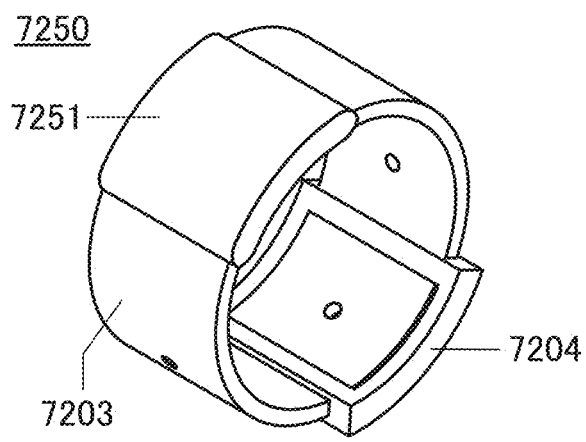
FIGS. 32A to 32D illustrate examples of an electronic device.

FIG. 32A illustrates an example of a wrist-worn activity meter. An activity meter 7250 includes a housing 7251, the band 7203, the buckle 7204, and the like. Furthermore, the housing 7251 incorporates a wireless communication device, a pulse sensor, an acceleration sensor, a temperature sensor, and the like. The activity meter 7250 has a function of acquiring data such as pulse variation and the amount of activity of the user with the pulse sensor and the acceleration sensor and sending the data to an external portable information terminal by the wireless communication device. Furthermore, the activity meter 7250 may have a function of measuring calorie consumption and calorie intake of the user, a function of measuring the number of steps taken, a function of measuring a sleeping condition, or the like. Note that the activity meter 7250 may be provided with a display portion for displaying data acquired by the above function.

The activity meter 7250 includes the power storage device of one embodiment of the present invention. For example, the power storage device 7104 illustrated in FIG. 31E that is in the state of being bent can be provided in the housing 7251. Alternatively, the power storage device 7104 illustrated in FIG. 31E can be provided in the band 7203 such that it can be bent.

Figure 32B:
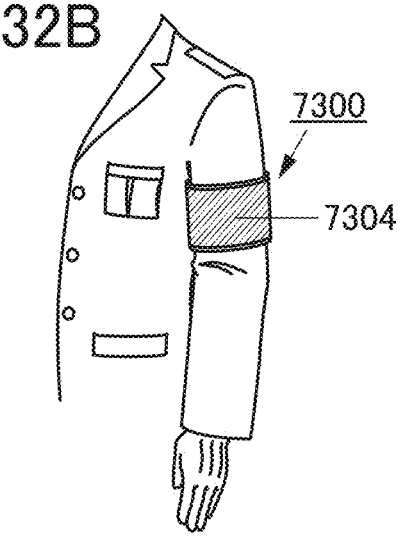

FIG. 32B illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. The display state of the display device 7300 can be changed by, for example, near field communication, which is a communication method based on an existing communication standard.

Moreover, the display device 7300 includes an input/output terminal, and data can be directly transmitted to and received from another information terminal via a connector. In addition, charging via the input/output terminal is possible. Note that the charging operation may be performed by wireless power feeding without using the input/output terminal.

Figure 32C:
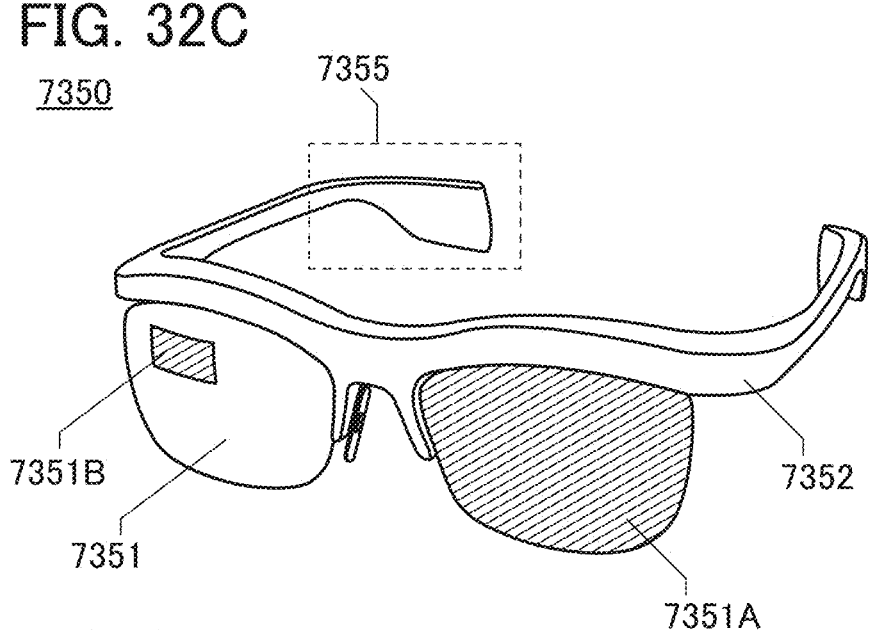

FIG. 32C illustrates an example of a glasses-type display device. A display device 7350 includes lenses 7351, a frame 7352, and the like. Furthermore, a projection portion (not illustrated) that projects an image or video on the lenses 7351 is provided in the frame 7352 or in contact with the frame 7352. The display device 7350 has a function of displaying an image 7351A on the entire lenses 7351 in the direction in which the user can see the image 7351A. Alternatively, the display device 7350 has a function of displaying an image 7351B on part of the lenses 7351 in the direction in which the user can see the image 7351B.

Figure 32D:
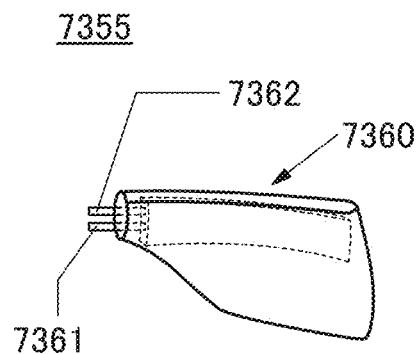

The display device 7350 includes the power storage device of one embodiment of the present invention. FIG. 32D is an enlarged view of an edge portion 7355 of the frame 7352. The edge portion 7355 can be formed using a rubber material such as fluorine rubber or silicone rubber. The power storage device 7360 of one embodiment of the present invention is embedded in the edge portion 7355, and the positive electrode lead 7361 and the negative electrode lead 7362 protrude from the edge portion 7355. The positive electrode lead 7361 and the negative electrode lead 7362 are electrically connected to a wiring provided in the frame 7352 and connected to a projection portion or the like. Note that the edge portion 7355 can be formed so as to incorporate the power storage device 7360 as in Embodiment 2.

The edge portion 7355 and the power storage device 7360 have flexibility. Thus, the display device 7350 can be worn so as to be in close contact with the head of the user.

Figure 33A:
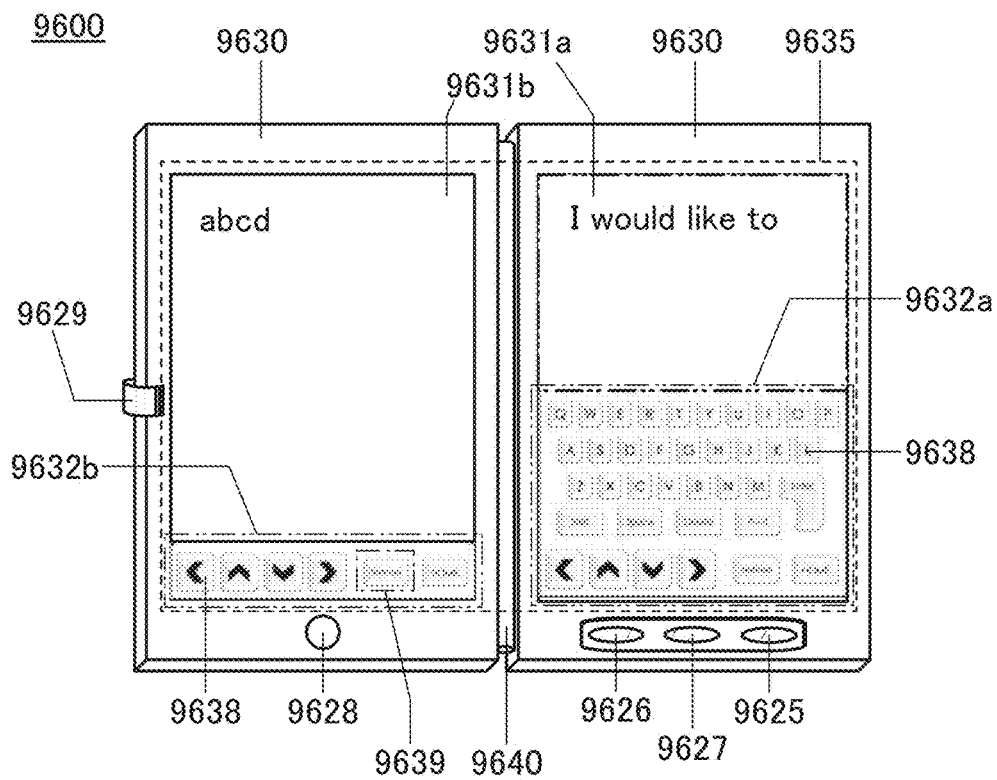
FIGS. 33A to 33C illustrate examples of an electronic device.
Figure 33B:
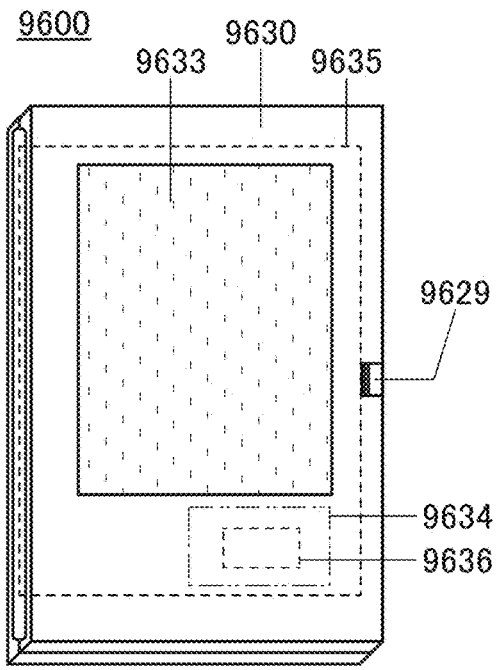

FIGS. 33A and 33B illustrate an example of a tablet terminal that can be folded in half. A tablet terminal 9600 illustrated in FIGS. 33A and 33B includes a pair of housings 9630, a movable portion 9640 connecting the pair of housings 9630, a display portion 9631a, a display portion 9631b, a display mode changing switch 9626, a power switch 9627, a power saving mode changing switch 9625, a fastener 9629, and an operation switch 9628. FIG. 33A illustrates the tablet terminal 9600 that is opened, and FIG. 33B illustrates the tablet terminal 9600 that is closed.

The tablet terminal 9600 includes a power storage unit 9635 inside the housings 9630. The power storage unit 9635 is provided across the housings 9630, passing through the movable portion 9640.

Part of the display portion 9631a can be a touch panel region 9632a, and data can be input by touching operation keys 9638 that are displayed. Note that in FIG. 33A, as an example, half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, keyboard buttons can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control the display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 33A, one embodiment of the present invention is not limited to this example. The display portion 9631a and the display portion 9631b may have different areas or different display quality. For example, one of the display portions 9631a and 9631b may display higher-definition images than the other.

The tablet terminal is closed in FIG. 33B. The tablet terminal includes the housings 9630, a solar cell 9633, and a charge and discharge control circuit 9634 including a DCDC converter 9636. The power storage device of one embodiment of the present invention is used as the power storage unit 9635.

The tablet terminal 9600 can be folded such that the housings 9630 overlap with each other when not in use. Thus, the display portions 9631a and 9631b can be protected, which increases the durability of the tablet terminal 9600. In addition, the power storage unit 9635 using the power storage device of one embodiment of the present invention has flexibility and can be repeatedly bent without a significant decrease in charge and discharge capacity. Thus, a highly reliable tablet terminal can be provided.

The tablet terminal illustrated in FIGS. 33A and 33B can also have a function of displaying various kinds of data (e.g., a still image, a moving image, and a text image) on the display portion, a function of displaying a calendar, a date, the time, and the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 33C:
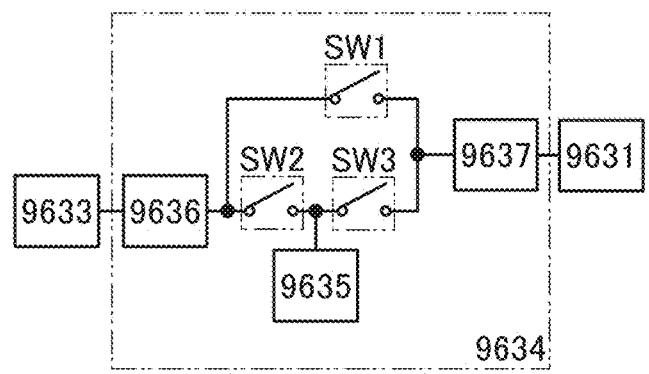

The structure and operation of the charge and discharge control circuit 9634 illustrated in FIG. 33B will be described with reference to a block diagram in FIG. 33C. FIG. 33C illustrates the solar cell 9633, the power storage unit 9635, the DCDC converter 9636, a converter 9637, switches SW1 to SW3, and the display portion 9631, and the power storage unit 9635, the DCDC converter 9636, the converter 9637, and the switches SW1 to SW3 correspond to the charge and discharge control circuit 9634 in FIG. 33B.

Described first is an example of operation when electric power is generated by the solar cell 9633 using external light. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or other charge means used in combination.

Figure 34:
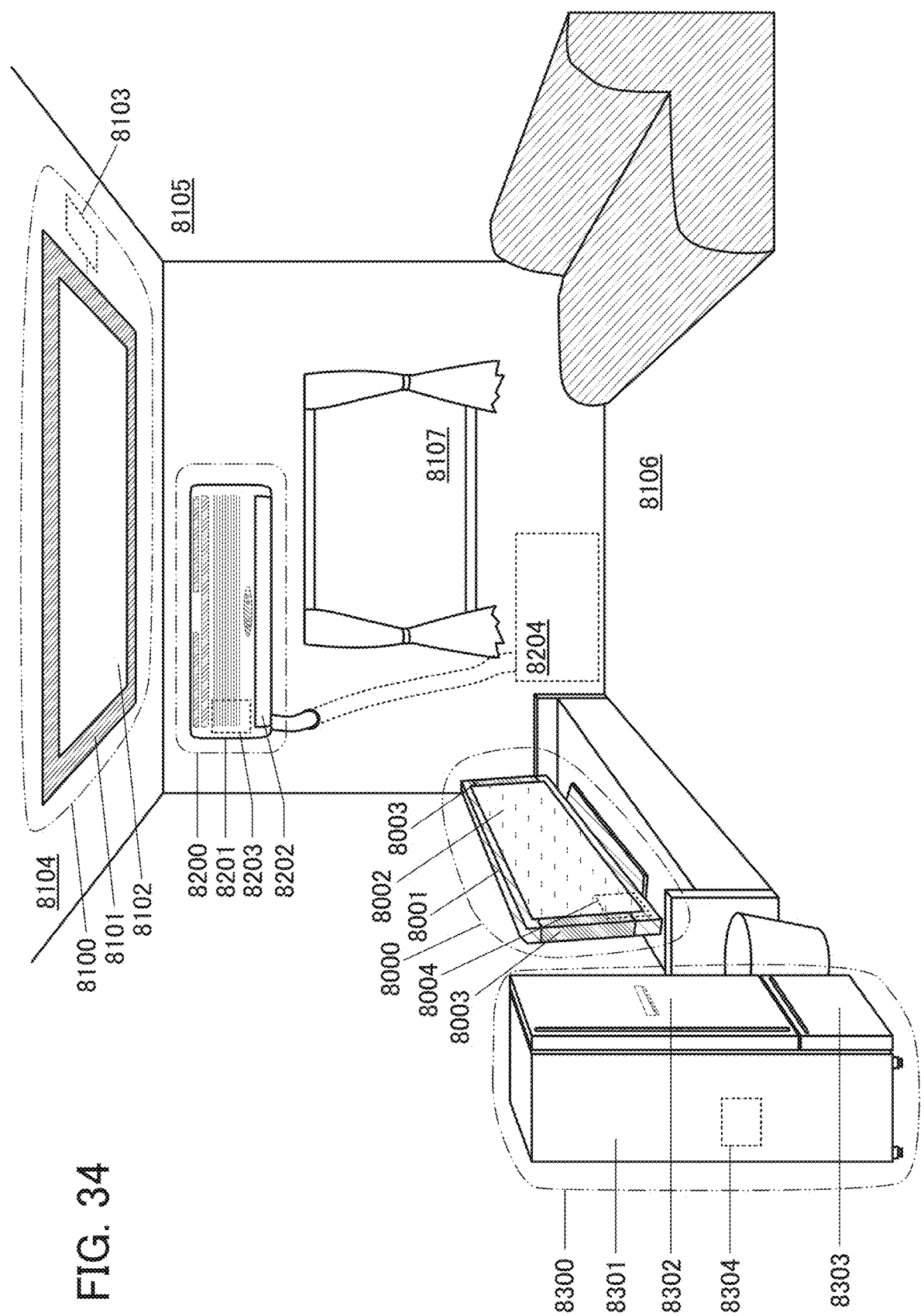
FIG. 34 illustrates examples of an electronic device.

FIG. 34 illustrates other examples of electronic devices. In FIG. 34, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 34, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 34 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 34 as an example, the power storage device of one embodiment of the present invention can be used in an installation lighting device provided in, for example, a wall 8105, a floor 8106, a window 8107, or the like besides the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 34, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 34 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 34 as an example, the power storage device of one embodiment of the present invention can be used in an air conditioner in which the functions of an indoor unit and an outdoor unit are integrated in one housing.

In FIG. 34, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, the power storage device 8304, and the like. The power storage device 8304 is provided in the housing 8301 in FIG. 34. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion is referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

The power storage device of one embodiment of the present invention can be provided in a vehicle.

The use of power storage devices in vehicles enables production of next-generation clean energy vehicles such as hybrid electric vehicles (HEVs), electric vehicles (EVs), and plug-in hybrid electric vehicles (PHEVs).

Figure 35A:
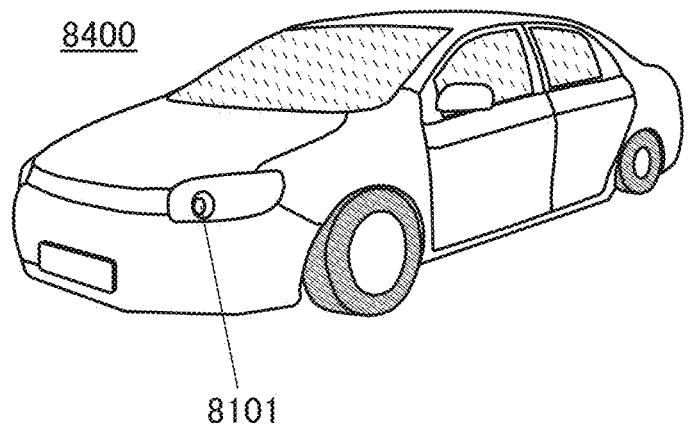
FIGS. 35A and 35B illustrate examples of an electronic device.
Figure 35B:
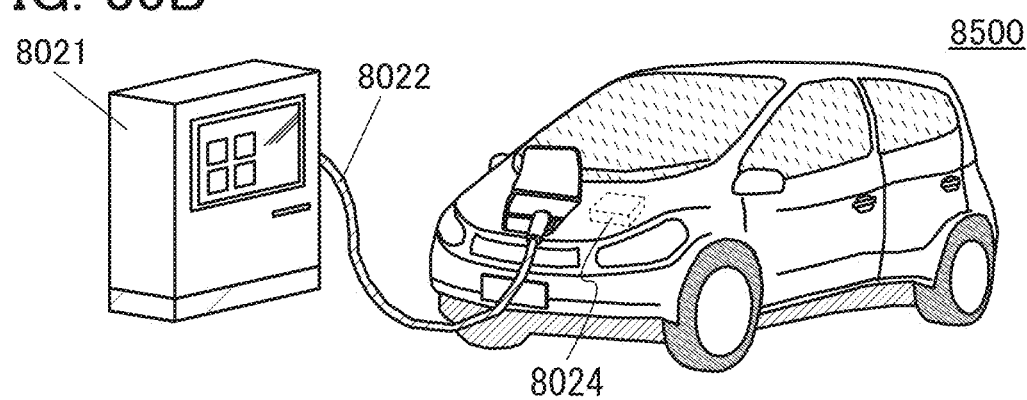

FIGS. 35A and 35B each illustrate an example of a vehicle using the power storage device of one embodiment of the present invention. An automobile 8400 illustrated in FIG. 35A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 35B illustrates an automobile 8500 including the power storage device. The automobile 8500 can be charged when the power storage device is supplied with electric power through external charging equipment by a plug-in system, a contactless power feeding system, or the like. In FIG. 35B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an ACDC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle stops but also when moves. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be combined with the other embodiments as appropriate.

Embodiment 5

A battery management unit (BMU), which can be used in combination with battery cells including the materials described in the above embodiments, and transistors that are suitable for a circuit included in the battery management unit will be described with reference to FIGS. 36 to 42. In this embodiment, in particular, a battery management unit of a power storage device including battery cells connected in series will be described.

When a plurality of battery cells connected in series are repeatedly charged and discharged, each battery cell has a different capacity (output voltage) because of different charge and discharge characteristics. The discharge capacity of all the plurality of battery cells connected in series depends on a low-capacity battery cell.

The variations in capacity among the battery cells reduce the discharge capacity of all the battery cells. Furthermore, when charge is performed based on the voltage of a low-capacity battery cell, the battery cells might be undercharged. In contrast, when charge is performed based on the voltage of a high-capacity battery cell, the battery cells might be overcharged.

Thus, the battery management unit of the power storage device including the battery cells connected in series has a function of reducing variations in capacity among the battery cells, which cause an undercharge and an overcharge. Examples of a circuit configuration for reducing variations in capacity among battery cells include a resistive type, a capacitive type, and an inductive type. Described here is a circuit configuration example that can reduce variations in capacity by using transistors with a low off-state current.

A transistor including an oxide semiconductor in its channel formation region (an OS transistor) is preferably used as the transistor with a low off-state current. When an OS transistor with a low off-state current is used in the circuit of the battery management unit of the power storage device, the amount of charge that leaks from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, more preferably greater than or equal to 1 and less than or equal to 6, and $z_1/y_1$ is preferably greater than or equal to ⅓ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the CAAC-OS film is described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS film including an $InGaZnO_4$ crystal is analyzed by an out-of-plane method using an X-ray diffraction (XRD) apparatus, a peak may appear at a diffraction angle (2θ) of around 31°. This peak is derived from the (009) plane of the $InGaZnO_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film including an $InGaZnO_4$ crystal by an out-of-plane method, another peak may appear when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Therefore, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has a small variation in electrical characteristics and high reliability. Charge trapped by the carrier traps in the oxide semiconductor film takes a long time to be released and might behave like fixed charge. Thus, the transistor including the oxide semiconductor film having high impurity concentration and a high density of defect states has unstable electrical characteristics in some cases.

A transistor using the CAAC-OS film has a small variation in electrical characteristics due to irradiation with visible light or ultraviolet light.

Since the OS transistor has a wider band gap than a transistor including silicon in its channel formation region (a Si transistor), dielectric breakdown is unlikely to occur even when a high voltage is applied. A voltage of several hundreds of volts is generated in battery cells connected in series in the power storage device. A battery management unit for such battery cells suitably has a circuit configuration with the OS transistor.

Figure 36:
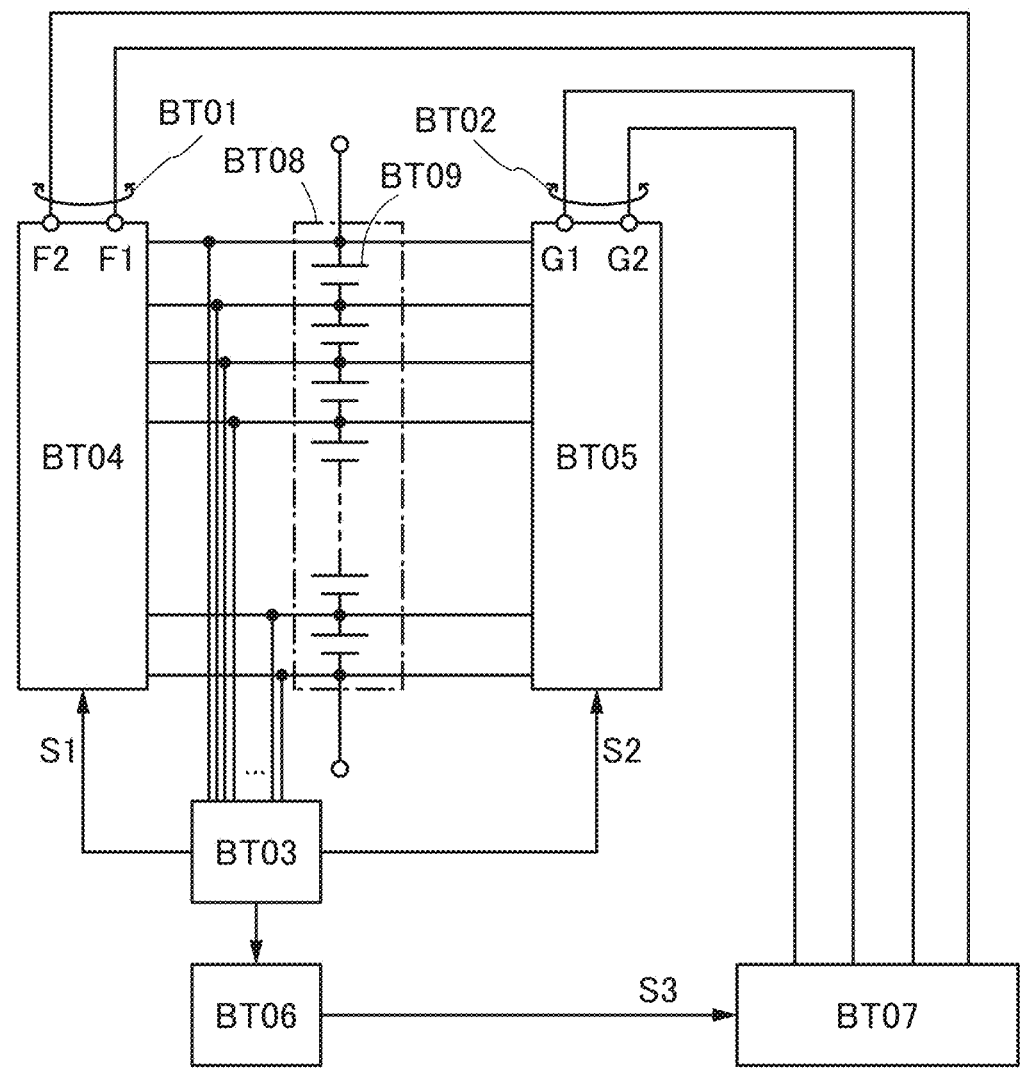
FIG. 36 is a block diagram illustrating one embodiment of the present invention.

FIG. 36 is an example of a block diagram of the power storage device. A power storage device BT00 illustrated in FIG. 36 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 36, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls the operations of the switching circuits BT04 and BT05. Specifically, the switching control circuit BT03 selects battery cells to be discharged (a discharge battery cell group) and battery cells to be charged (a charge battery cell group) in accordance with a voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operation of the switching control circuit BT03 will be described in detail.

First, the switching control circuit BT03 measures the voltage of each of the plurality of battery cells BT09. Then, the switching control circuit BT03 determines, for example, that the battery cell BT09 having a voltage higher than or equal to a predetermined threshold value is a high-voltage battery cell (high-voltage cell) and that the battery cell BT09 having a voltage lower than the predetermined threshold value is a low-voltage battery cell (low-voltage cell).

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select the battery cells BT09 which are almost overcharged or over-discharged as the discharge battery cell group or the charge battery cell group.

Figure 37A:
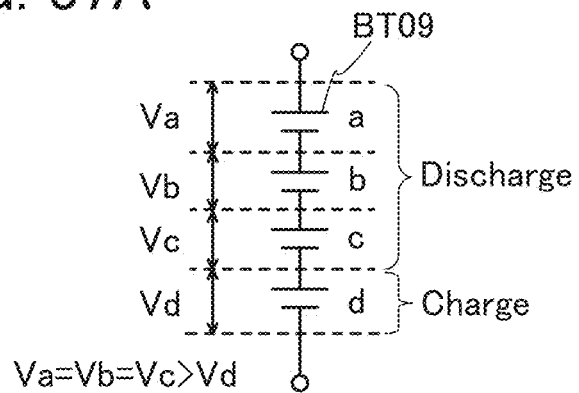
FIGS. 37A to 37C are schematic views each illustrating one embodiment of the present invention.
Figure 37B:
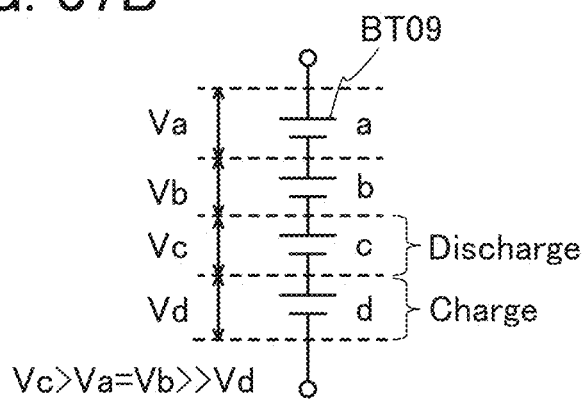
Figure 37C:
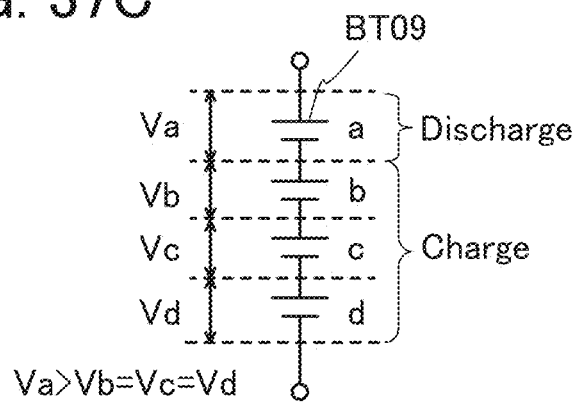

Here, operation examples of the switching control circuit BT03 in this embodiment will be described with reference to FIGS. 37A to 37C. FIGS. 37A to 37C illustrate the operation examples of the switching control circuit BT03. Note that for convenience of explanation, FIGS. 37A to 37C each illustrate an example where four battery cells BT09 are connected in series.

First, in the example of FIG. 37A, Va=Vb=Vc>Vd is satisfied where Va, Vb, Vc, and Vd are the voltages of a battery cell a, a battery cell b, a battery cell c, and a battery cell d, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low-voltage cell d as the charge battery cell group.

Next, in the example of FIG. 37B, Vc>Va=Vb>>Vd is satisfied. That is, a series of two low-voltage cells a and b, one high-voltage cell c, and one low-voltage cell d which is almost over-discharged are connected in series. In this case, the switching control circuit BT03 selects the high-voltage cell c as the discharge battery cell group. Since the low-voltage cell d is almost over-discharged, the switching control circuit BT03 preferentially selects the low-voltage cell d as the charge battery cell group instead of the series of two low-voltage cells a and b.

Lastly, in the example of FIG. 37C, Va>Vb=Vc=Vd is satisfied. That is, one high-voltage cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 37A to 37C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05, is set in the control signal S2.

The above is the detailed description of the operation of the switching control circuit BT03.

The switching circuit BT04 sets the connection destination of the terminal pair BT01 at the discharge battery cell group selected by the switching control circuit BT03, in response to the control signal S1 output from the switching control circuit BT03.

The terminal pair BT01 includes a pair of terminals F1 and F2. The switching circuit BT04 connects one of the pair of terminals F1 and F2 to a positive electrode terminal of the battery cell BT09 positioned on the most upstream side (on the high potential side) of the discharge battery cell group, and the other to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the connection destination of the terminal pair BT02 at the charge battery cell group selected by the switching control circuit BT03, in response to the control signal S2 output from the switching control circuit BT03.

The terminal pair BT02 includes a pair of terminals G1 and G2. The switching circuit BT05 sets the connection destination of the terminal pair BT02 by connecting one of the pair of terminals G1 and G2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 38:
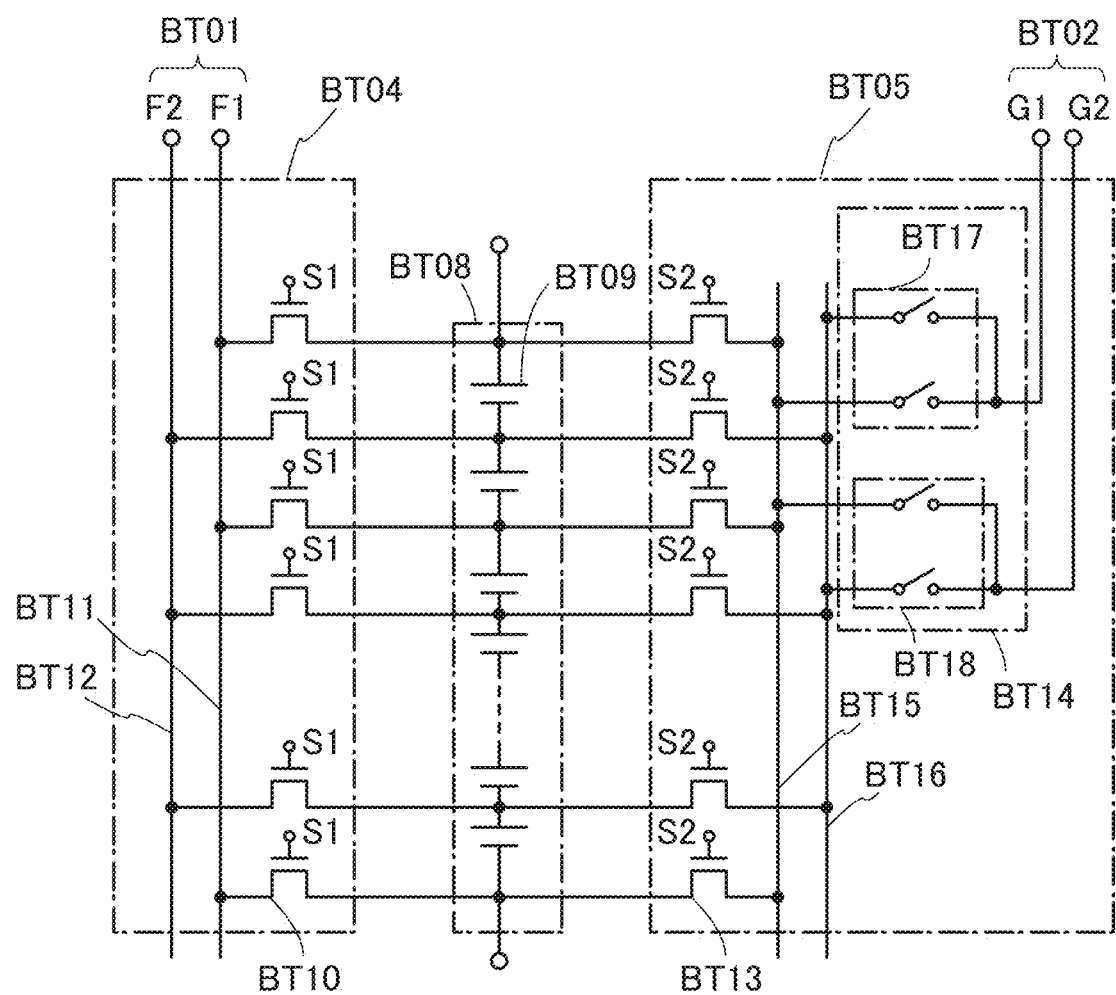
FIG. 38 is a circuit diagram illustrating one embodiment of the present invention.
Figure 39:
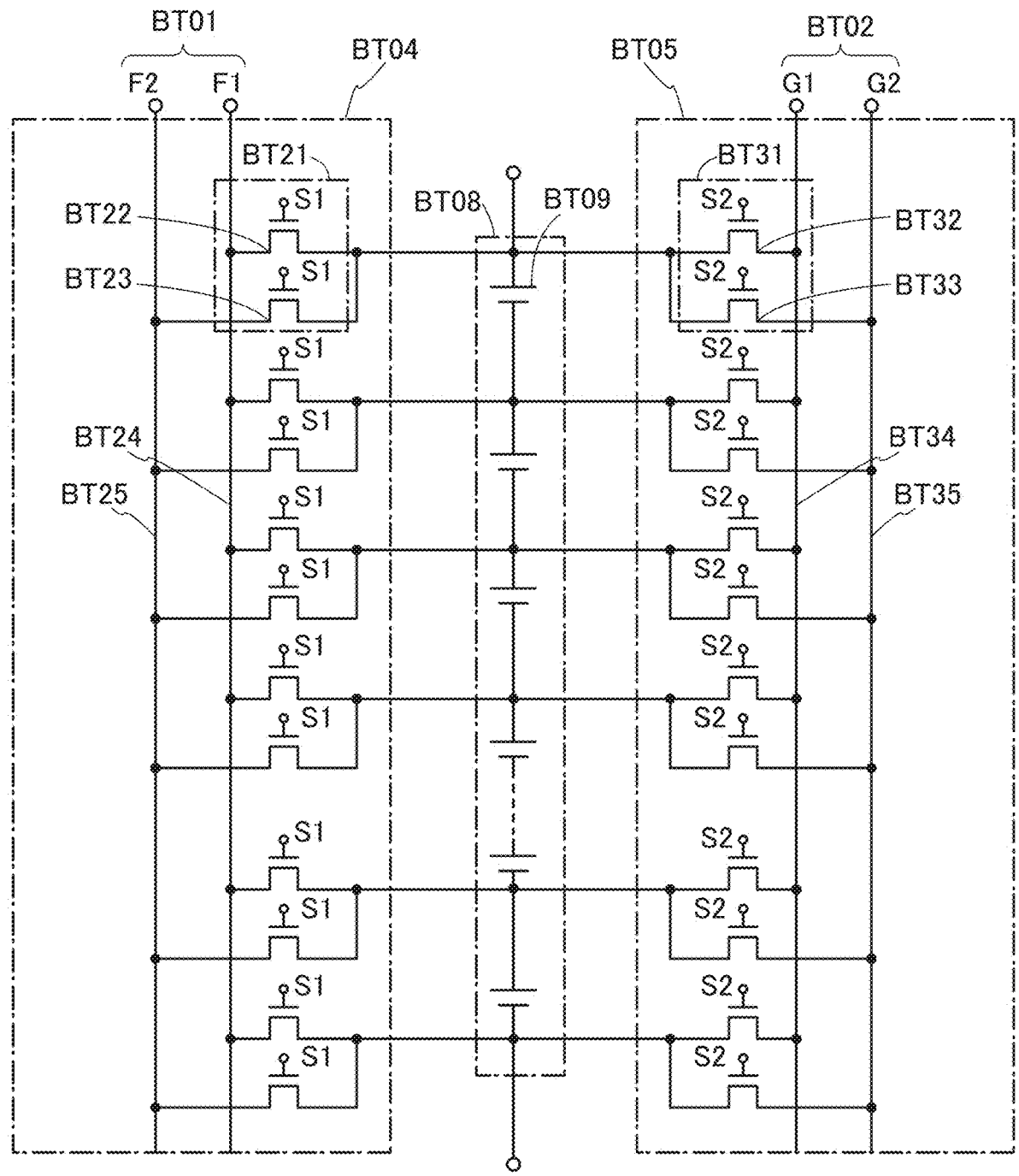
FIG. 39 is a circuit diagram illustrating one embodiment of the present invention.

FIG. 38 and FIG. 39 are circuit diagrams showing configuration examples of the switching circuits BT04 and BT05.

In FIG. 38, the switching circuit BT04 includes a plurality of transistors BT10, a bus BT11, and a bus BT12. The bus BT11 is connected to the terminal F1. The bus BT12 is connected to the terminal F2. Sources or drains of the plurality of transistors BT10 are connected alternately to the bus BT11 and the bus BT12. The sources or drains that are not connected to the bus BT11 and the bus BT12 of the plurality of transistors BT10 are each connected between two adjacent battery cells BT09.

The source or drain of the transistor BT10 on the most upstream side of the plurality of transistors BT10 is connected to the positive electrode terminal of the battery cell BT09 on the most upstream side of the battery portion BT08. The source or drain of the transistor BT10 on the most downstream side of the plurality of transistors BT10 is connected to the negative electrode terminal of the battery cell BT09 on the most downstream side of the battery portion BT08.

In the switching circuit BT04, one of the plurality of transistors BT10 connected to the bus BT11 and one of the plurality of transistors BT10 connected to the bus BT12 are brought into an on state in response to the control signal S1 supplied to gates of the plurality of transistors BT10, so that the discharge battery cell group is connected to the terminal pair BT01. Accordingly, the positive electrode terminal of the battery cell BT09 on the most upstream side of the discharge battery cell group is connected to one of the pair of terminals F1 and F2. In addition, the negative electrode terminal of the battery cell BT09 on the most downstream side of the discharge battery cell group is connected to the other of the pair of terminals F1 and F2 (i.e., a terminal not connected to the positive electrode terminal).

An OS transistor is preferably used as the transistor BT10. Since the off-state current of the OS transistor is low, the amount of charge that leaks from the battery cell which does not belong to the discharge battery cell group can be reduced, and a reduction in capacity with the lapse of time can be suppressed. In addition, dielectric breakdown is unlikely to occur in the OS transistor even when a high voltage is applied. Therefore, the battery cell BT09 and the terminal pair BT01, which are connected to the transistor BT10 in an off state, can be insulated from each other even when the discharge battery cell group outputs a high voltage.

In FIG. 38, the switching circuit BT05 includes a plurality of transistors BT13, a current control switch BT14, a bus BT15, and a bus BT16. The bus BT15 and the bus BT16 are positioned between the plurality of transistors BT13 and the current control switch BT14. Sources or drains of the plurality of transistors BT13 are connected alternately to the bus BT15 and the bus BT16. The sources or drains that are not connected to the bus BT15 and the bus BT16 of the plurality of transistors BT13 are each connected between two adjacent battery cells BT09.

The source or drain of the transistor BT13 on the most upstream side of the plurality of transistors BT13 is connected to the positive electrode terminal of the battery cell BT09 on the most upstream side of the battery portion BT08. The source or drain of the transistor BT13 on the most downstream side of the plurality of transistors BT13 is connected to the negative electrode terminal of the battery cell BT09 on the most downstream side of the battery portion BT08.

An OS transistor is preferably used as the transistor BT13 like the transistor BT10. Since the off-state current of the OS transistor is low, the amount of charge that leaks from the battery cells which do not belong to the charge battery cell group can be reduced, and a reduction in capacity with the lapse of time can be suppressed. In addition, dielectric breakdown is unlikely to occur in the OS transistor even when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. Terminals on one end of the switch pair BT17 are connected to the terminal G1. Terminals on the other end of the switch pair BT17 branch off from two switches. One switch is connected to the bus BT15, and the other switch is connected to the bus BT16. Terminals on one end of the switch pair BT18 are connected to the terminal G2. Terminals on the other end of the switch pair BT18 branch off from two switches. One switch is connected to the bus BT15, and the other switch is connected to the bus BT16.

OS transistors are preferably used for the switches included in the switch pair BT17 and the switch pair BT18 like the transistors BT10 and BT13.

In the switching circuit BT05, the combination of on and off states of the transistors BT13 and the current control switch BT14 is controlled in response to the control signal S2, so that the charge battery cell group is connected to the terminal pair BT02.

For example, the switching circuit BT05 connects the charge battery cell group and the terminal pair BT02 in the following manner.

In the switching circuit BT05, a transistor BT13 connected to the positive electrode terminal of the battery cell BT09 on the most upstream side of the charge battery cell group is brought into an on state in response to the control signal S2 supplied to gates of the plurality of transistors BT13. Furthermore, in the switching circuit BT05, a transistor BT13 connected to the negative electrode terminal of the battery cell BT09 on the most downstream side of the charge battery cell group is brought into an on state in response to the control signal S2 supplied to the gates of the plurality of transistors BT13.

The polarities of voltages applied to the terminal pair BT02 can vary in accordance with the configurations of the voltage transformer circuit BT07 and the discharge battery cell group connected to the terminal pair BT01. In order to supply a current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

As an example, described is the state where voltages are applied to the terminal pair BT02 so as to make the terminal G1 a positive electrode and the terminal G2 a negative electrode. Here, in the case where the battery cell BT09 on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on whereas the switch of the switch pair BT17 connected to the bus BT15 is turned off. In contrast, the switch pair BT18 is controlled to be connected to the negative electrode terminal of the battery cell BT09 on the most downstream side of the battery portion BT08 in response to the control signal S2. That is, the switch of the switch pair BT18 connected to the bus BT15 is turned on whereas the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction for charging the charge battery cell group.

In addition, not the switching circuit BT05 but the switching circuit BT04 may include the current control switch BT14.

FIG. 39 is a circuit diagram illustrating configuration examples of the switching circuit BT04 and the switching circuit BT05, which are different from those of FIG. 38.

In FIG. 39, the switching circuit BT04 includes a plurality of transistor pairs BT21, a bus BT24, and a bus BT25. The bus BT24 is connected to the terminal F1. The bus BT25 is connected to the terminal F2. Terminals on one end of each of the plurality of transistor pairs BT21 branch off from a transistor BT22 and a transistor BT23. Sources or drains of the transistors BT22 are connected to the bus BT24. Sources or drains of the transistors BT23 are connected to the bus BT25. In addition, terminals on the other end of each of the plurality of transistor pairs BT21 are connected between two adjacent battery cells BT09. The terminals on the other end of the transistor pair BT21 on the most upstream side of the plurality of transistor pairs BT21 are connected to the positive electrode terminal of the battery cell BT09 on the most upstream side of the battery portion BT08. The terminals on the other end of the transistor pair BT21 on the most downstream side of the plurality of transistor pairs BT21 are connected to a negative electrode terminal of the battery cell BT09 on the most downstream side of the battery portion BT08.

In the switching circuit BT04, the transistors BT22 and BT23 are turned on or off in response to the control signal S1, so that the connection destination of the transistor pair BT21 is switched to one of the terminal F1 and the terminal F2. Specifically, when the transistor BT22 is turned on, the transistor BT23 is turned off, so that the connection destination of the transistor pair BT21 is the terminal F1. On the other hand, when the transistor BT23 is turned on, the transistor BT22 is turned off, so that the connection destination of the transistor pair BT21 is the terminal F2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal Si, and the discharge battery cell group and the terminal pair BT01 are connected. The connection destinations of the two transistor pairs BT21 are controlled by the control signal S1 so that one of the connection destinations is the terminal F1 and the other is the terminal F2.

The switching circuit BT05 includes a plurality of transistor pairs BT31, a bus BT34, and a bus BT35. The bus BT34 is connected to the terminal G1. The bus BT35 is connected to the terminal G2. Terminals on one end of each of the plurality of transistor pairs BT31 branch off from a transistor BT32 and a transistor BT33. One terminal extending from the transistor BT32 is connected to the bus BT34. The other terminal extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of the plurality of transistor pairs BT31 is connected to the negative electrode terminal of the battery cell BT09 on the most downstream side of the battery portion BT08.

In the switching circuit BT05, the transistors BT32 and BT33 are turned on or off in response to the control signal S2, so that the connection destination of the transistor pair BT31 is switched to one of the terminal G1 and the terminal G2. Specifically, when the transistor BT32 is turned on, the transistor BT33 is turned off, so that the connection destination of the transistor pair BT31 is the terminal G1. On the other hand, when the transistor BT33 is turned on, the transistor BT32 is turned off, so that the connection destination of the transistor pair BT31 is the terminal G2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal G1 and the other is the terminal G2.

The connection destinations of the two transistor pairs BT31 are determined by the polarities of the voltages applied to the terminal pair BT02. Specifically, in the case where voltages which make the terminal G1 a positive electrode and the terminal G2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal G1 a negative electrode and the terminal G2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in a direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than the number of those included in the charge battery cell group, it is necessary to prevent a too high charging voltage from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to the number of those included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a too high charging voltage is not applied to the charge battery cell group.

The voltage value of the too high charging voltage can be determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 40A:
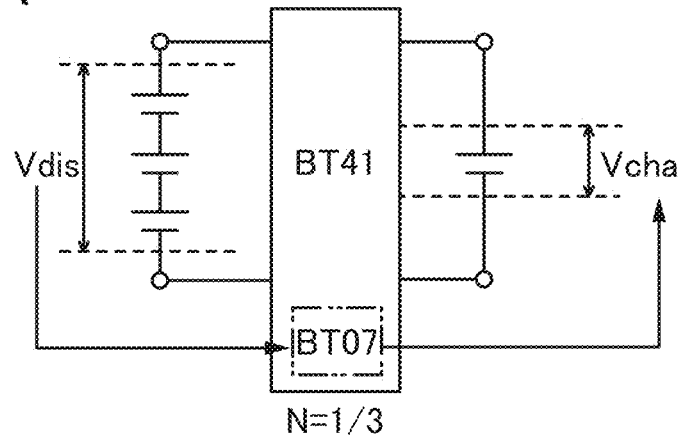
FIGS. 40A to 40C are schematic views each illustrating one embodiment of the present invention.
Figure 40B:
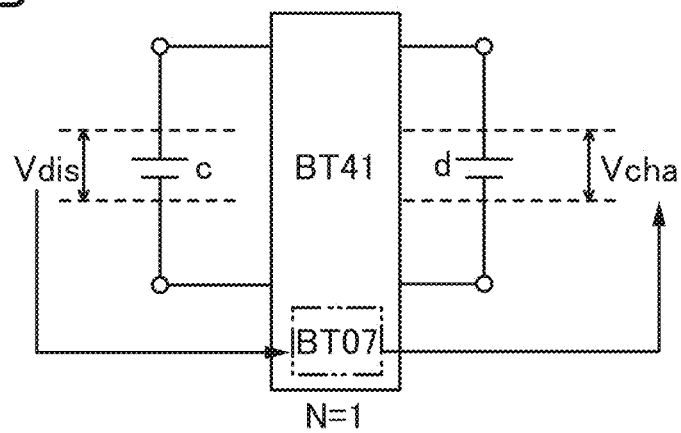
Figure 40C:
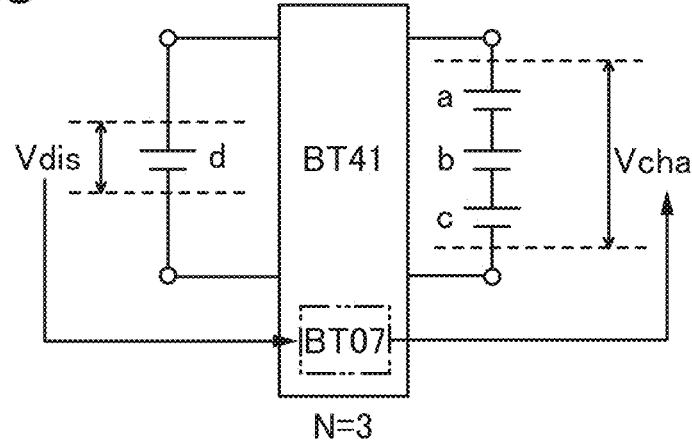

Here, operation examples of the voltage transformation control circuit BT06 in this embodiment will be described with reference to FIGS. 40A to 40C. FIGS. 40A to 40C are conceptual diagrams for explaining the operation examples of the voltage transformation control circuits BT06 for the discharge battery cell groups and the charge battery cell groups described in FIGS. 37A to 37C. FIGS. 40A to 40C each illustrate a battery control unit BT41. The battery control unit BT41 includes, as described above, the terminal pair BT01, the terminal pair BT02, the switching control circuit BT03, the switching circuit BT04, the switching circuit BT05, the voltage transformation control circuit BT06, and the voltage transformer circuit BT07.

In the example illustrated in FIG. 40A, the series of three high-voltage cells a to c and one low-voltage cell d are connected in series as described in FIG. 37A. In this case, as described using FIG. 37A, the switching control circuit BT03 determines the high-voltage cells a to c as the discharge battery cell group, and determines the low-voltage cell d as the charge battery cell group. The voltage transformation control circuit BT06 calculates a conversion ratio N for converting the discharging voltage (Vdis) into the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than the number of those included in the charge battery cell group, when a discharging voltage is applied to the terminal pair BT02 without being transformed, an overvoltage may be applied to the battery cells BT09 included in the charge battery cell group through the terminal pair BT02. Thus, in the case of FIG. 40A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 40A, the number of the battery cells BT09 included in the discharge battery cell group is three and the number of the battery cells BT09 included in the charge battery cell group is one; hence, the voltage transformation control circuit BT06 calculates a value slightly larger than $1/3$ as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In the examples illustrated in FIGS. 40B and 40C, the conversion ratio N is calculated in a manner similar to that of FIG. 40A. In the examples illustrated in FIGS. 40B and 40C, the number of the battery cells BT09 included in the discharge battery cell group is less than or equal to the number of the battery cells BT09 included in the charge battery cell group; hence, the conversion ratio N is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the converted charging voltage to the terminal pair BT02. Here, the voltage transformer circuit BT07 electrically insulates the terminal pair BT01 from the terminal pair BT02.

Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DCDC converter as the voltage transformation signal S3.

Examples of the insulated DCDC converter include a flyback converter, a forward converter, a ringing choke converter (RCC), a push-pull converter, a half-bridge converter, and a full-bridge converter, and a suitable converter is selected in accordance with the value of the intended output voltage.

Figure 41:
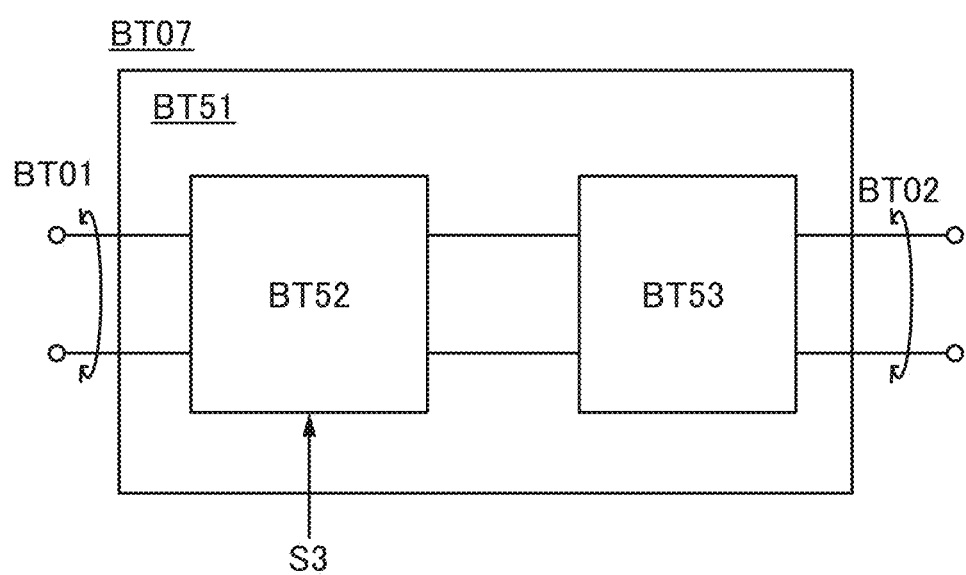
FIG. 41 is a block diagram illustrating one embodiment of the present invention.

FIG. 41 illustrates the configuration of the voltage transformer circuit BT07 including the insulated DCDC converter. An insulated DCDC converter BT51 includes a switch portion BT52 and a transformer BT53. The switch portion BT52 is a switch for switching on/off of the insulated DCDC converter, and a metal oxide semiconductor field-effect transistor (MOSFET), a bipolar transistor, or the like is used as the switch portion BT52. The switch portion BT52 periodically turns on and off the insulated DCDC converter BT51 in response to the voltage transformation signal S3 for controlling the on/off ratio which is output from the voltage transformation control circuit BT06. The switch portion BT52 can have any of various structures in accordance with the type of the insulated DCDC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DCDC converter is used, the terminal pair BT01 and the terminal pair BT02 can be insulated from each other inside the transformer BT53.

Figure 42:
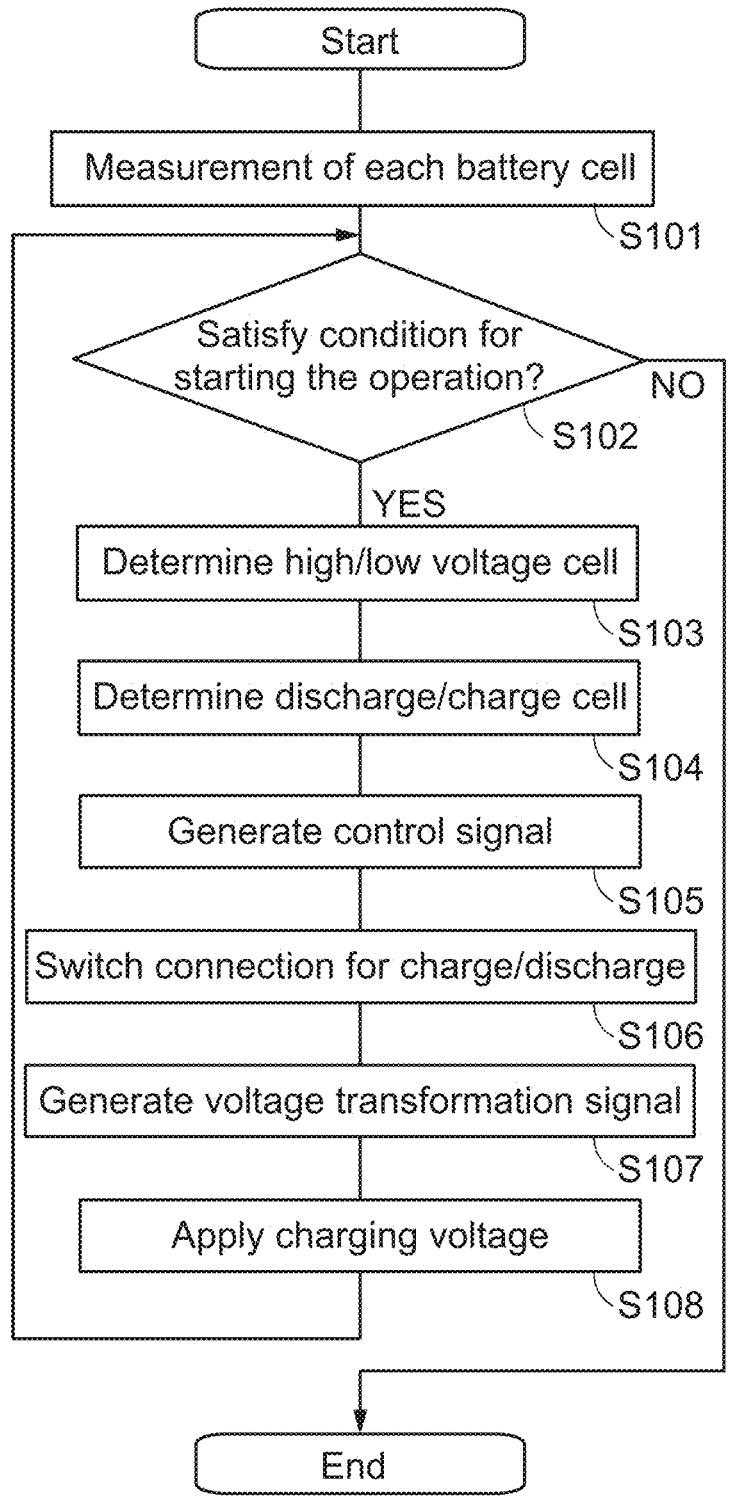
FIG. 42 is a flow chart illustrating one embodiment of the present invention.

The operation flow of the power storage device BT00 in this embodiment will be described with reference to FIG. 42. FIG. 42 is a flow chart showing the operation flow of the power storage device BT00.

First, the power storage device BT00 obtains a voltage measured for each of the plurality of battery cells BT09 (step S101). Then, the power storage device BT00 determines whether or not the condition for starting the operation of reducing variations in voltage of the plurality of battery cells BT09 is satisfied (step S102). This conditions can be as follows for example: the difference between the maximum value and the minimum value of the voltage measured for each of the plurality of battery cells BT09 is higher than or equal to the predetermined threshold value. In the case where the condition is not satisfied (step S102: NO), the power storage device BT00 does not perform the subsequent operation because voltages of the battery cells BT09 are well balanced. In contrast, in the case where the condition is satisfied (step S102: YES), the power storage device BT00 performs the operation of reducing variations in the voltage of the battery cells BT09. In this operation, the power storage device BT00 determines whether each battery cell BT09 is a high-voltage cell or a low-voltage cell on the basis of the measured voltage of each cell (step S103). Then, the power storage device BT00 determines a discharge battery cell group and a charge battery cell group on the basis of the determination result (step S104). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S105). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S106). The power storage device BT00 generates the voltage transformation signal S3 based on the number of the battery cells BT09 included in the discharge battery cell group and the number of the battery cells BT09 included in the charge battery cell group (step S107). Then, the power storage device BT00 converts, in response to the voltage transformation signal S3, the discharging voltage applied to the terminal pair BT01 into a charging voltage and applies the charging voltage to the terminal pair BT02 (step S108). In this way, charge of the discharge battery cell group is transferred to the charge battery cell group.

Although the plurality of steps are shown in order in the flow chart of FIG. 42, the order of performing the steps is not limited to the order.

According to this embodiment, unlike in a capacitive type circuit, charge can be transferred from the discharge battery cell group to the charge battery cell group without the charge from the discharge battery cell group being temporarily stored before sent to the charge battery cell group. This increases the charge transfer efficiency per unit time. In addition, battery cells in the discharge battery cell group and the charge battery cell group to be connected to the voltage transformer circuit can be individually switched with the switching circuit BT04 and the switching circuit BT05.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistors BT10 and BT13 can reduce the amount of charge that leaks from the battery cells BT09 not belonging to the charge battery cell group or the discharge battery cell group. Accordingly, a decrease in the capacity of the battery cells BT09 which do not contribute to charging or discharging can be suppressed. In addition, the variations in characteristics of the OS transistor due to heat are smaller than those of an S1 transistor. Accordingly, even when the temperature of the battery cells BT09 increases, an operation such as switching between the conductive and non-conductive states in response to the control signals S1 and S2 can be performed correctly.

This embodiment can be implemented in appropriate combination with the other embodiments.

Example 1

Described in this example are the results of measuring the amount of moisture in exterior bodies of power storage devices that were repeatedly bent.

As the power storage devices, the thin storage batteries shown in Embodiment 1 were fabricated. Exterior bodies of the power storage devices were each formed using a sheet in which a 80-μm-thick resin layer covers one surface of a 40-μm-thick aluminum layer and an approximately 30-μm-thick resin layer covers the other surface. The sheets were fabricated under the two conditions with embossing and without embossing. Seen from above, the exterior body has a horizontal length of 60 mm and a vertical length of 75 mm, seal portions on the left and right each have a width of 5 mm to 6 mm (seal width W) in a first condition, and a width of approximately 3 mm (seal width N) in a second condition. The seal portion on the top, from which the lead electrode is taken out, has a width of 5 mm to 5.5 mm.

As a positive electrode, an 80-μm-thick positive electrode active material layer was formed on one surface of a 20-μm-thick aluminum current collector. As a negative electrode, an 82-μm-thick negative electrode active material layer was formed on one surface of an 18-μm-thick copper current collector. As a separator, 25-μm-thick polypropylene was used. Lithium cobaltate and graphite were used as the positive electrode active material and the negative electrode active material, respectively.

A stack in which positive electrodes and negative electrodes are alternately stacked and separated by separators was fabricated. Six pairs of the positive electrode active material layers and the negative electrode active material layers face each other with the separators positioned therebetween.

Next, a tab region of the stacked positive electrode and a tab region of the stacked negative electrode were welded to a positive electrode lead and a negative electrode lead, respectively, by ultrasonic welding. After that, the stack in which the positive electrodes and the negative electrodes are alternately stacked and separated by separators was sandwiched by the film serving as the exterior body, two sides of which were sealed by heat. The positive electrode lead and the negative electrode lead were taken out from the same side of the exterior body.

Then, 1800 μL of PC was injected and the remaining side was sealed.

Next, slits were provided in the seal region of the exterior body with scissors like in the example shown in FIGS. 43A and 43B and FIG. 44. The slits are substantially perpendicular to the side of the exterior body, have a distance of approximately 3 mm, and each extend approximately 2 mm from the end portion.

Through the above steps, the power storage devices were fabricated. Table 1 shows the conditions of seal widths on the left and right, and whether or not slits are provided and the sheet used as the exterior body is embossed.

TABLE 1

|    | slit | seal width | embossing |
|----|------|------------|-----------|
| A1 | yes  | W          | no        |
| A2 | yes  | W          | no        |
| A3 | yes  | W          | no        |
| C1 | no   | W          | no        |
| C2 | no   | W          | no        |
| A4 | yes  | W          | yes       |
| A5 | yes  | W          | yes       |
| A6 | yes  | W          | yes       |
| B1 | no   | N          | yes       |
| B2 | no   | N          | yes       |
| B3 | no   | N          | yes       |
| C3 | no   | W          | yes       |
| C4 | no   | W          | yes       |
| C5 | no   | W          | yes       |

In this example, the power storage devices are not functioning because a supporting electrolyte such as a lithium salt was not added; however, if an electrolytic solution is injected instead of PC, the power storage device can be charged and discharged.

Next, the power storage devices were subjected to a bending test. A tester for bending has a cylindrical support body with a radius of curvature of 40 mm that extends in depth. The center of the power storage device was located directly above the support body. The tester also includes an arm extending in the right direction and an arm extending in the left direction. End portions of the arms are mechanically connected to holding plates. By moving the end portions of the arms up or down, the holding plates can be bent along the support body. The bending test of the power storage device was performed with the power storage device sandwiched between the two holding plates. Thus, moving the end portions of the arms up or down allows the power storage device to be bent along the cylindrical support body. Specifically, lowering the end portions of the arms permits the power storage device to be bent with a radius of curvature of 40 mm. Since the power storage device is bent while being sandwiched between the two holding plates, force except bending force can be prevented from being applied to the power storage device. Furthermore, bending force can be uniformly applied to the whole power storage device.

In the bending test, bending was performed 10000 times at intervals of 10 seconds in the range of radius of curvature from 40 mm to 150 mm.

First, power storage devices A1, A2, A3, C1, and C2 were subjected to the bending test. Here, a region including the tab region of the positive electrode 503, the tab region of the negative electrode 506, the positive electrode lead 510, and the negative electrode lead 511, e.g., a region 522 in FIG. 1A was not moved, and a region below the region 522 in the top view of FIG. 1A, e.g., a region 521 was repeatedly bent with a radius of curvature of 40 mm to 150 mm.

Then, power storage devices A4, A5, A6, B1, B2, B3, C3, C4, and C5 were subjected to the bending test. Here, almost all the region of the power storage device sandwiched between metal plates was repeatedly bent with a radius of curvature of 40 mm to 150 mm.

Next, a preservation test was performed on the power storage devices that had been subjected to the bending test. Specifically, each power storage device was held at 120° C. for 24 hours together with water in a container having a pressure regulation mechanism.

Then, each of the power storage devices subjected to the preservation test was opened by cutting a side thereof, and 1800 μL, of PC was injected. After that, the added PC was spread throughout the region surrounded by the exterior body, and then the solvent was squeezed out of the region surrounded by the exterior body to be collected.

Then, the amount of moisture in the collected solvent was measured with a coulometric Karl Fischer moisture titrator MKC-610-DT (produced by Kyoto Electronics Manufacturing Co., Ltd.).

Figure 45A:
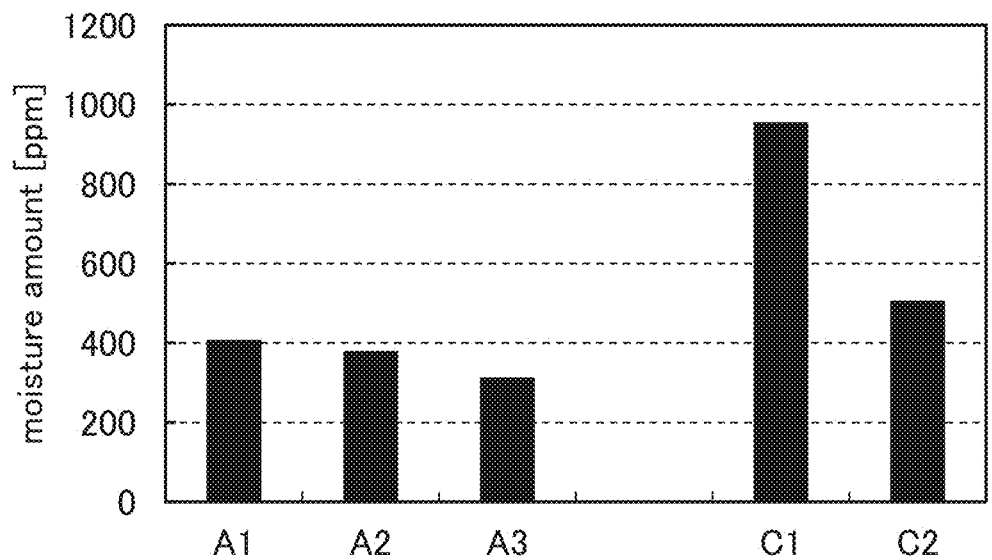
FIGS. 45A and 45B each show the amount of moisture in a power storage device.

FIG. 45A shows the results of the power storage devices A1, A2, A3, C1, and C2. The power storage devices C1 and C2 have an amount of moisture exceeding 500 ppm, and exceeding 900 ppm in C1. This is probably because the exterior body of the power storage device repeatedly bent had lowered airtightness due to a crack or the like, allowing moisture to penetrate therein. In contrast, the amount of moisture in the power storage devices A1 to A3 was less than 500 ppm, and approximately 300 ppm in A3.

Figure 45B:
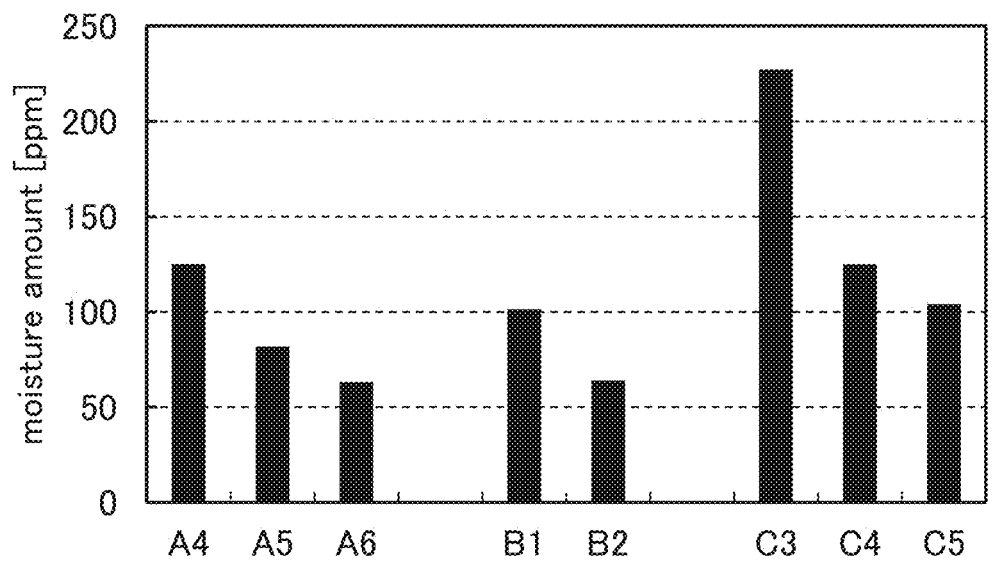

FIG. 45B shows the results of the power storage devices A4, A5, A6, B1, B2, C3, C4, and C5. The results suggest that compared with the power storage devices C3 to C5 including no slits, the power storage devices A4 to A6 with slits had a decreased amount of moisture entering therein. The results also suggest that the entering of moisture was prevented also in the conditions with the narrow seal width.

This application is based on Japanese Patent Application serial No. 2016-035832 filed with Japan Patent Office on Feb. 26, 2016, the entire contents of which are hereby incorporated by reference.

What is claimed is:

1. A power storage device comprising:
a positive electrode;
a negative electrode; and
an exterior body wrapping the positive electrode and the negative electrode,
wherein the exterior body includes an outer edge comprising a first slit and a second slit,
wherein an angle between a major axis of the first slit and a major axis of the outer edge is represented as a°,
wherein an angle between a major axis of the second slit and the major axis of the outer edge is represented as b°, and
wherein a is larger than b.

2. The power storage device according to claim 1,
wherein the exterior body includes a first film-form region and a second film-form region, and
wherein the first film-form region is in contact with the second film-form region in the outer edge.

3. The power storage device according to claim 1, wherein the exterior body comprises a resin layer.

4. The power storage device according to claim 1, wherein the exterior body comprises a metal layer.

5. The power storage device according to claim 1, wherein the exterior body is sealed in the outer edge.

6. The power storage device according to claim 1, wherein the power storage device is configured to be repeatedly bent.

7. A battery management unit comprising:
the power storage device according to claim 1; and
a transistor.

8. The battery management unit according to claim 7, wherein the transistor comprises an oxide semiconductor.

9. An electronic device comprising the power storage device according to claim 1.

10. A power storage device comprising:
a positive electrode;
a negative electrode; and
an exterior body wrapping the positive electrode and the negative electrode,
wherein the exterior body includes an outer edge,
wherein the outer edge has a band-like shape,
wherein the outer edge comprises:
a first slit comprising a first edge on an edge side of the exterior body; and
a second slit comprising a second edge on the edge side of the exterior body,
wherein the second edge is closer to a center of the power storage device than the first edge,
wherein an angle between a major axis of the first slit and a major axis of the outer edge is represented as a°,
wherein an angle between a major axis of the second slit and the major axis of the outer edge is represented as b°, and
wherein a is larger than b.

11. The power storage device according to claim 10,
wherein the exterior body includes a first film-form region and a second film-form region,
wherein each of the first film-form region and the second film-form region comprises a resin layer, and
wherein the first film-form region is in contact with the second film-form region in the outer edge.

12. The power storage device according to claim 10, wherein the exterior body further comprises a metal layer.

13. A battery management unit comprising:
the power storage device according to claim 10; and
a transistor.

14. An electronic device comprising the power storage device according to claim 10.

15. A power storage device comprising:
a positive electrode;
a negative electrode; and
an exterior body wrapping the positive electrode and the negative electrode,
wherein the exterior body includes an outer edge,
wherein the outer edge comprises a first plurality of holes arranged linearly, and
wherein the exterior body comprises a resin layer,
wherein the outer edge comprises a second plurality of holes arranged linearly, and
wherein a linear line on which the first plurality of holes are arranged is different from a linear line on which the second plurality of holes are arranged.

16. The power storage device according to claim 15,
wherein the exterior body includes a first film-form region and a second film-form region, and
wherein the first film-form region is in contact with the second film-form region in the outer edge.

17. The power storage device according to claim 15, wherein the exterior body comprises a metal layer.

18. The power storage device according to claim 15, wherein a major diameter of each of the first plurality of holes is greater than or equal to 0.1 mm and less than or equal to 3 mm.

19. A battery management unit comprising:
the power storage device according to claim 15; and
a transistor.

20. An electronic device comprising the power storage device according to claim 15.

* * * * *